US009323797B2

(12) United States Patent
Acree

(10) Patent No.: US 9,323,797 B2
(45) Date of Patent: *Apr. 26, 2016

(54) SYSTEM AND METHOD OF PENALTY DATA COMPILATION, ANALYSIS AND REPORT GENERATION

(71) Applicant: Rusty Acree LLC, Sharps, VA (US)

(72) Inventor: Russell Acree, Sharps, VA (US)

(73) Assignee: RUSTY ACREE, LLC, Sharps, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/269,896

(22) Filed: May 5, 2014

(65) Prior Publication Data

US 2014/0244696 A1 Aug. 28, 2014

Related U.S. Application Data

(63) Continuation of application No. 13/328,037, filed on Dec. 16, 2011, now Pat. No. 8,715,086, which is a continuation of application No. 12/334,439, filed on Dec. 12, 2008, now Pat. No. 8,079,910.

(60) Provisional application No. 60/996,962, filed on Dec. 12, 2007.

(51) Int. Cl.

| | |
|---|---|
| ***G06F 17/00*** | (2006.01) |
| ***G06F 17/30*** | (2006.01) |
| ***G06Q 10/06*** | (2012.01) |
| ***G06Q 10/10*** | (2012.01) |

(52) U.S. Cl.
CPC .... *G06F 17/30342* (2013.01); *G06Q 10/06398* (2013.01); *G06Q 10/10* (2013.01)

(58) Field of Classification Search
None
See application file for complete search history.

(56) References Cited

U.S. PATENT DOCUMENTS

| | | | | |
|---|---|---|---|---|
| 6,015,345 A | | 1/2000 | Kail | |
| 6,135,881 A | * | 10/2000 | Abbott | A63F 13/12 273/108.3 |
| 6,311,041 B1 | | 10/2001 | Goodyear | |
| 6,431,985 B1 | * | 8/2002 | Kim | A63B 27/0003 463/1 |
| 8,204,750 B2 | | 6/2012 | DeWitt | |
| 2002/0086731 A1 | * | 7/2002 | Kim | A63B 24/0003 463/42 |
| 2005/0132257 A1 | * | 6/2005 | Gold | G06F 11/3495 714/47.2 |
| 2005/0132401 A1 | | 6/2005 | Boccon-Gibod | |
| 2005/0162257 A1 | | 7/2005 | Gonzalez | |
| 2006/0217027 A1 | * | 9/2006 | Martuccio | A41D 13/0015 446/46 |
| 2007/0250920 A1 | | 10/2007 | Lindsay | |
| 2008/0126172 A1 | * | 5/2008 | Melamed | G06Q 10/00 705/7.21 |

(Continued)

OTHER PUBLICATIONS

Non-final Office Action dated May 8, 2013 for U.S. Appl. No. 13/328,037, filed Dec. 16, 2011.

(Continued)

*Primary Examiner* — Hung Le
(74) *Attorney, Agent, or Firm* — Miles & Stockbridge P.C.; David R. Schaffer

(57) ABSTRACT

The present invention relates generally to a system and method for reviewing and evaluating performance. In particular, the present invention relates to a system and method for reviewing and evaluating performances of an official or group of officials at an event or events. Even more specifically, according to embodiments of the present invention, the system and method can involve reviewing and evaluating a referee's performance during a football game or games.

20 Claims, 73 Drawing Sheets

(56) References Cited

U.S. PATENT DOCUMENTS

| | | | |
|---|---|---|---|
| 2009/0037414 | A1 | 2/2009 | Olivier et al. |
| 2009/0082110 | A1 | 3/2009 | Relyea |
| 2009/0189982 | A1 | 7/2009 | Tawiah |

OTHER PUBLICATIONS

Non-final Office Action dated Feb. 7, 2011 for U.S. Appl. No. 12/334,439, filed Dec. 12, 2008.

Non-final Office Action dated Aug. 25, 2015 for U.S. Appl. No. 13/328,195, filed Dec. 16, 2011.

Final Office Action dated Sep. 4, 2015 for U.S. Appl. No. 13/843,027, filed Mar. 15, 2013.

Non-final Office Action dated Sep. 27, 2013 for U.S. Appl. No. 13/843,027, filed Mar. 15, 2013.

Non-final Office Action dated Sep. 24, 2013 for U.S. Appl. No. 13/328,195, filed Dec. 16, 2011.

Non-final Office Action dated Nov. 21, 2012 for U.S. Appl. No. 13/328,195, filed Dec. 16, 2011.

* cited by examiner

Login Page With All Regions Displayed

Supervisor Permission, CFO West, Welcome Screen:

Big 12 tab Welcome Page with All Roles Displayed:

Supervisor Permission Navigation Page:

Supervisor Permission, Find Games, Menu Page:

Supervisor Permission, Find Games, Schedule Games:

Supervisor Permission, Find Games,
View Game Summaries / Grade Tape Game Info tab:

Supervisor Permission, Find Games,
View Game Summaries / Game Fouls & Grading tab:

Supervisor Permission, Find Games, View Replay Reports / Grade Stoppages

Supervisor Permission, Find Games,
View Replay Reports / Grade Stoppages

Supervisor Permission, Find Games, View Coach's Plays for Review

Supervisor Permission, Find Games, View Coach's Plays for Review

Supervisor Permission, View Reports, Menu Page

Supervisor Permission, View Reports, Supervisor's Report Weekly Summary tab

Supervisor Permission, View Reports, Supervisor's Report Qwik Look tab

Supervisor Permission, View Reports, Supervisor's Report Fouls per Quarter tab;

Supervisor Permission, View Reports, Position Foul Report:

Supervisor Permission, View Reports,
Officials Foul Summary;

Supervisor Permission, View Reports, Officials Foul Summary, Bobby Ables Checked;

Supervisor Permission,
View Reports, Foul Grade Report.

Supervisor Permission, View Reports, Foul Grade Report, Fouls Checked

Supervisor Permission, View Reports, Foul Grade Report, Fouls Checked, View Details Supervisor Permission, View Reports,
Foul Position Report Supervisor Permission, View Reports, Crew Grade Summary:

Supervisor Permission, View Reports, Crew Grade Summary, Referee

Supervisor Permission, View Report,
Weekly TA Report

Supervisor Permission, View Reports,
View Replay Grades:

Supervisor Permission, View Reports,
View Replay Grades, Replay 1

Grader Permission, Find Games, View Game Summaries / Grade Tape;

Replay Permission, Find Games, Submit Replay Report

Replay Permission, View Reports,
Replay Official Grade Summary;

Referee Permission, Game Report,
View Game Summaries / Submit Game Report, Game Information Tab Referee Permission, Game Report,
View Game Summaries / Submit Game Report, Game Foul Summary Tab Referee Permission, View Reports, View Crew Report, Game Duration tab:

Referee Permission, View Reports,
View Crew Report, Crew Foul Summary tab:

Referee Permission, View Reports,
View Graders Comments

Officials Permission, View Reports, Officials Foul Summary;

Officials Permission, View Reports, Officials Grade Summary:

Coach Permission, View Reports, Coach's Report, Quick Look:

Coach Permission, View Reports, Coach's Report, Game Summary:

Coach Permission, View Reports, Coach's Report, Game Report:

Coach Permission, View Reports, Coach's Report, Season Foul Summary;

Coach Permission, View Reports, Coach's Report, Season Foul Detail:

Coach Permission, View Reports,
Coach's Report, Season Fouls per Week:

Coach Permission, View Reports,
Coach's Report, Fouls by Player

Coach Permission, View Reports, Coach's Report, Foul per Quarter:

Coach Permission, View Reports, Submit Plays For Review.

Coach Permission, View Reports, Submit Officials Evaluation.

Coach Permission, View Reports,
Submit Officials Evaluation.

Login Page for National Coordinator

National Coordinator Welcome Screen:

National Coordinator tab Welcome Page with National Coordinator role highlighted:

National Coordinator Navigation Page:

National Coordinator Menu Page:

National Coordinator's Report, Weekly Summary tab:

National Coordinator's Report,
Weekly Summary tab:

| | Totals | Home Points Scored | Visitor Points Scored | Home Team Wins | Visitor Team Wins | Home Team Fouls | Visitor Team Fouls | Total Fouls |
|---|---|---|---|---|---|---|---|---|
| Points Scored | 18806 | 10998 | 7808 | 213 | 110 | 2314 | 2504 | 4818 |
| Number of Games | 323 | 323 | 323 | 323 | 323 | 323 | 323 | 323 |
| Average Points Per Game | 58.22 | 34.05 | 24.17 | | | | | |
| % Wins | | | | 65.94% | 34.06% | | | |
| Fouls Per Game | 14.92 | | | | | 7.16 | 7.75 | 14.92 |

National Coordinator's Report, Game Duration tab:

National Coordinator's Report,
Season Foul Summary tab;

National Coordinator's Report,
Foul Description tab:

National Coordinator's Report,
Fouls Per Week tab.

National Coordinator's Report,
Crew Foul Summary tab:

National Coordinator's Report, NCAA End of Season Report

National Coordinator's Report,
Home Visitor TriConference Summary:

National Coordinator's Report, Home Visitor TriConference Summary, Click to View Official Detail:

National Coordinator's Report, Position Foul Report, Line Judges:

FIG. 68

National Coordinator's Report,
View NCAA Replay Report Summary:

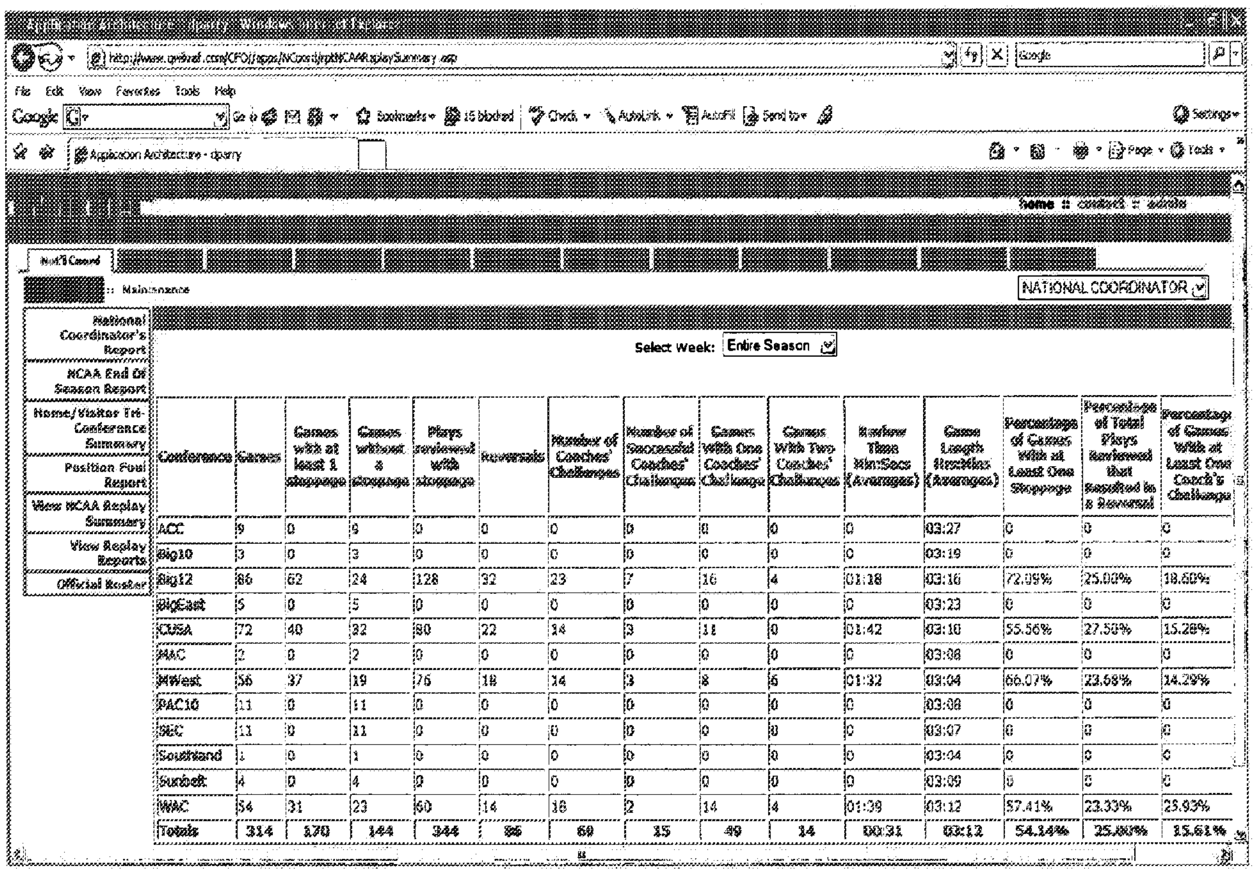

| Conference | Games | Games with at least 1 stoppage | Games without a stoppage | Plays reviewed with stoppage | Reversals | Number of Coaches' Challenges | Number of Successful Coaches' Challenges | Games With One Coaches' Challenge | Games With Two Coaches' Challenges | Review Time Min:Secs (Averages) | Game Length Hrs:Mins (Averages) | Percentage of Games With at Least One Stoppage | Percentage of Total Plays Reviewed that Resulted in a Reversal | Percentage of Games With at Least One Coach's Challenge |
|---|---|---|---|---|---|---|---|---|---|---|---|---|---|---|
| ACC | 9 | 0 | 9 | 0 | 0 | 0 | 0 | 0 | 0 | 0 | 03:27 | 0 | 0 | 0 |
| Big10 | 3 | 0 | 3 | 0 | 0 | 0 | 0 | 0 | 0 | 0 | 03:19 | 0 | 0 | 0 |
| Big12 | 86 | 62 | 24 | 128 | 32 | 23 | 7 | 16 | 4 | 01:18 | 03:16 | 72.09% | 25.00% | 18.60% |
| BigEast | 5 | 0 | 5 | 0 | 0 | 0 | 0 | 0 | 0 | 0 | 03:23 | 0 | 0 | 0 |
| CUSA | 72 | 40 | 32 | 80 | 22 | 14 | 3 | 11 | 0 | 01:42 | 03:10 | 55.56% | 27.50% | 15.28% |
| MAC | 2 | 0 | 2 | 0 | 0 | 0 | 0 | 0 | 0 | 0 | 03:08 | 0 | 0 | 0 |
| MWest | 56 | 37 | 19 | 76 | 18 | 14 | 3 | 8 | 6 | 01:32 | 03:04 | 66.07% | 23.68% | 14.29% |
| PAC10 | 11 | 0 | 11 | 0 | 0 | 0 | 0 | 0 | 0 | 0 | 03:08 | 0 | 0 | 0 |
| SEC | 11 | 0 | 11 | 0 | 0 | 0 | 0 | 0 | 0 | 0 | 03:07 | 0 | 0 | 0 |
| Southland | 1 | 0 | 1 | 0 | 0 | 0 | 0 | 0 | 0 | 0 | 03:04 | 0 | 0 | 0 |
| Sunbelt | 4 | 0 | 4 | 0 | 0 | 0 | 0 | 0 | 0 | 0 | 03:09 | 0 | 0 | 0 |
| WAC | 54 | 31 | 23 | 60 | 14 | 18 | 2 | 14 | 4 | 01:39 | 03:12 | 57.41% | 23.33% | 25.93% |
| Totals | 314 | 170 | 144 | 344 | 86 | 69 | 15 | 49 | 14 | 00:31 | 03:12 | 54.14% | 25.00% | 15.61% |

National Coordinator's Report,
View Replay Reports:

National Coordinator's Report, View Replay Reports, View Replay Positions Reviewed, Field Judge;

FIG. 71

National Coordinator's Report, View Replay Reports, View Coach's Challenges Summary:

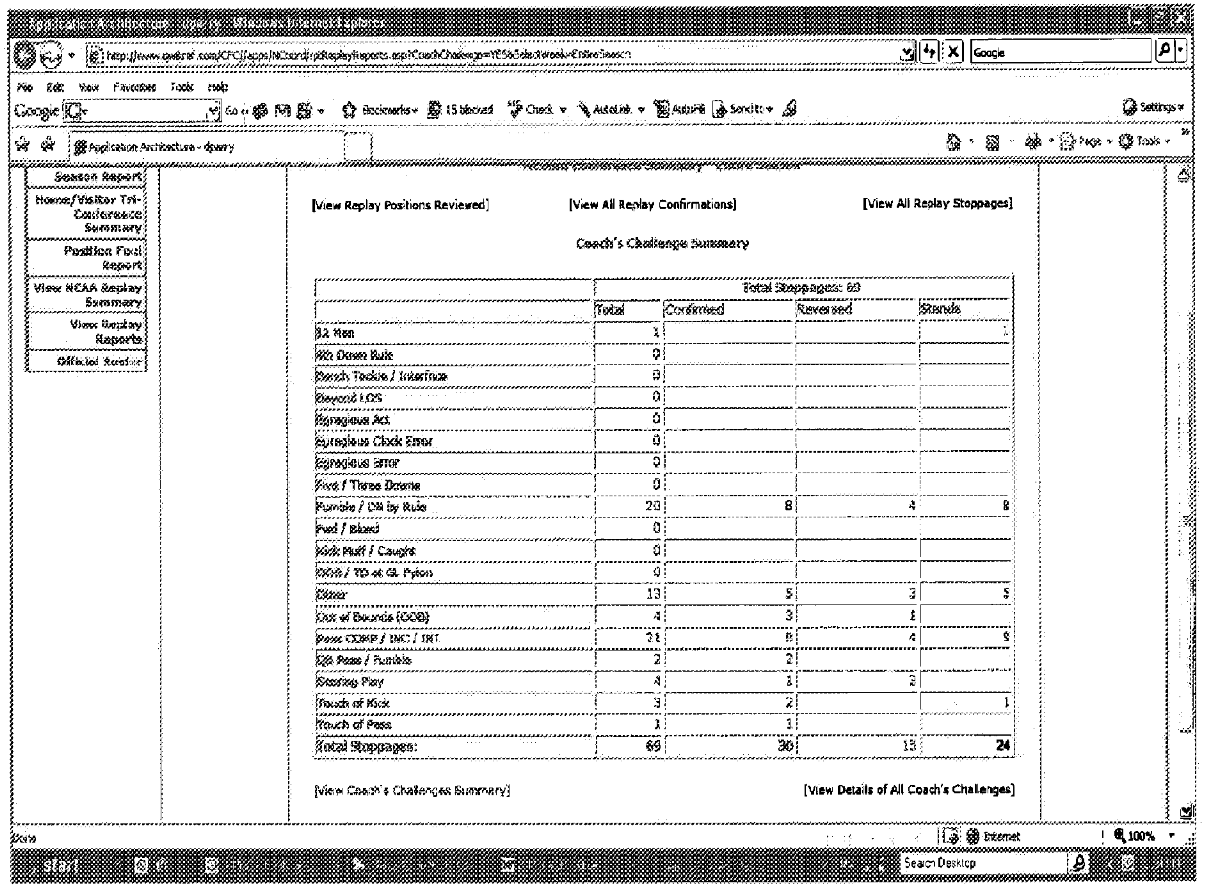

| | Total Stoppages: 69 | | | |
|---|---|---|---|---|
| | Total | Confirmed | Reversed | Stands |
| 12 Men | 1 | | | 1 |
| 4th Down Rule | 0 | | | |
| Bench Tackle / Interfere | 0 | | | |
| Beyond LOS | 0 | | | |
| Egregious Act | 0 | | | |
| Egregious Clock Error | 0 | | | |
| Egregious Error | 0 | | | |
| First / Three Downs | 0 | | | |
| Fumble / DB by Rule | 20 | 8 | 4 | 8 |
| Foul / Blood | 0 | | | |
| Kick Muff / Caught | 0 | | | |
| OOB / TD at GL Pylon | 0 | | | |
| Other | 13 | 5 | 3 | 5 |
| Out of Bounds (OOB) | 4 | 3 | 1 | |
| Pass COMP / INC / INT | 21 | 8 | 4 | 9 |
| QB Pass / Fumble | 2 | 2 | | |
| Scoring Play | 4 | 1 | 3 | |
| Touch of Kick | 3 | 2 | | 1 |
| Touch of Pass | 1 | 1 | | |
| Total Stoppages: | 69 | 30 | 13 | 24 |

National Coordinator's Login, ACC tab, Commissioner tab, Menu page:

National Coordinator's Login, ACC tab, Commissioner tab, Commissioner's Report:

SYSTEM AND METHOD OF PENALTY DATA COMPILATION, ANALYSIS AND REPORT GENERATION

CROSS-REFERENCE TO RELATED APPLICATION

This application claims benefit of priority to U.S. Provisional Patent Application No. 60/996,962, filed Dec. 12, 2007 and which is incorporated herein in its entirety by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention relates generally to a system and method for reviewing and evaluating performance. In particular, the present invention relates to a system and method for reviewing and evaluating performances of an official or group of officials at an event or events. Even more specifically, according to embodiments of the present invention, the system and method can involve reviewing and evaluating a referee's performance during a football game or games.

SUMMARY

According to embodiments of the present invention, a method for reviewing and evaluating performance can include (i.e., comprise) the steps of receiving data from various sources; storing the received data; accessing the stored data; and submitting grades and comments for a performance. The method may also include submitting a performance to be reviewed and evaluated. The data that is received and stored can include, for example, game information, rosters of officials for associated games, and assignments for each official in each roster. Further, game information, rosters of officials for associated games, and assignments for each person in each roster may be received in advance of the game. The data that is received and stored can also include, but is not limited to, penalty data, replay stoppage data, grader/evaluator data, and technical advisor (TA) data. A TA may be a person who attends a game and evaluates a crew of officials from onsite at the game and/or later during video reviews of the game. In various embodiments, a performance and/or conduct to be reviewed and evaluated may be with respect to a play or set of plays officiated by a crew of officials or an individual official. For example, the data can relate to penalties assessed during a football game by a referee or group of referees. The data can be accessed to evaluate the performances of the referees. Based on the evaluation, grades and/or comments associated with the performance can be submitted. Thus, the system may facilitate on-field performance evaluation and assessment of crews and individual officials by a grader, evaluator, a coordinator, or a supervisor.

The system for reviewing and evaluating performance according to embodiments of the present invention can include means for storing data, means for processing, and means for accessing and inputting data. The system may also include means for transmitting data to and from the means for storing data. The means for accessing and inputting data can receive various types of data from various sources. The received data can then be stored in the means for storing data. The means for accessing and inputting data can also receive inputs to access data stored in the means for storing data. Further, the means for accessing and inputting data can both receive a submission for a performance to be reviewed and evaluated and receive a submission of grades and comments relating to performance.

While the disclosure and drawings show the system and method being implemented with college football games and referees, such disclosure should not be construed as limiting the implementation of the system and method solely to the college football realm. The exemplification of college football is merely for illustrative purposes, and is in no way meant to limit the implementation of the system and method to college football or a particular division, conference, or team within college football. Rather, the system and method can be used at least with the following football levels: professional, college, high school, club football, and flag football. Moreover, the system and method can be used in any suitable sport and/or contest where it may be necessary or desirable to review and evaluate an official's performance and/or enter and store data pertaining to the game. For example, the system and method can be used with, but not limited to, the following sports and their respective officials: football, soccer, field and ice hockey, basketball, baseball, lacrosse, etc. Also note that while the term "referee" is used generically to denote a football official, the term is intended to encompass all football officials, including, but not limited to, referees, umpires, head linesman, line judges, side judges, back judges, replay officials, replay communicators, chain persons, etc. Furthermore, the term "penalty," which may be used in the realm of football, is intended to encompass fouls, infractions, and any calls in other realms (e.g., a "strike" or "ball" call or "out" determination in baseball), and any other suitable nomenclature.

BRIEF DESCRIPTION OF THE DRAWINGS

The accompanying drawings, which are incorporated in and constitute a part of this specification, illustrate embodiments of the invention. The invention will be best understood by reading the ensuing specification in conjunction with the drawings.

FIG. 68 is a screen shot of a national coordinator's report, view NCAA replay report summary display, in accordance with an embodiment of the present invention.

FIG. 71 is a screen shot of a national coordinator's report, view replay reports, view coach's challenges summary display, in accordance with an embodiment of the present invention.

DETAILED DESCRIPTION

Embodiments of the present invention are directed generally to a system and method for reviewing and evaluating performance. In particular, embodiments of the present invention relate to a system and method for reviewing and evaluating performances of an official or group of officials at an event or events. As used herein, the phrase "various embodiments" is intended to mean an embodiment, at least one embodiment, some embodiments, and/or all embodiments without limitation.

Figure 1:
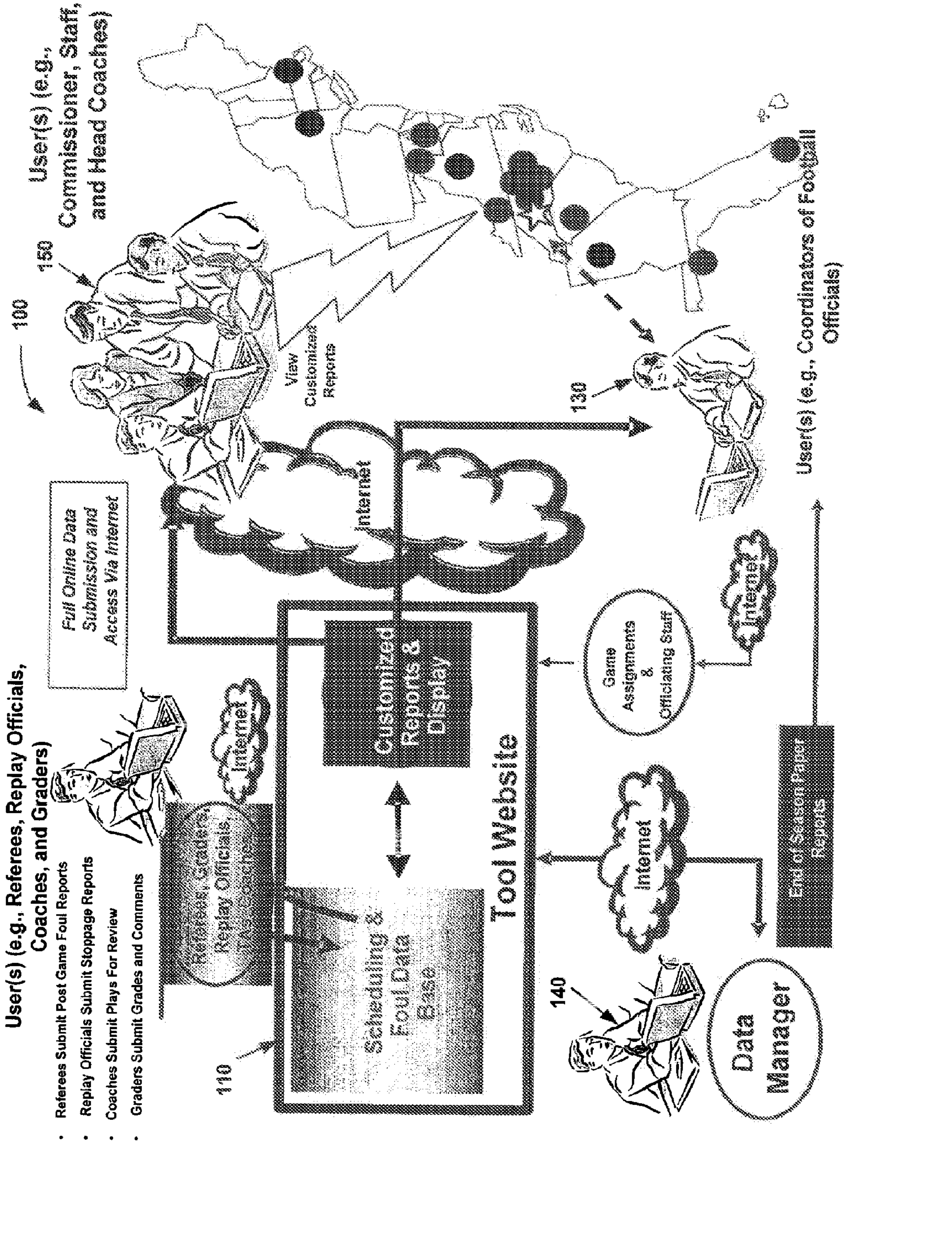
FIG. 1 is system diagram showing the Web-based computer software tool program for evaluating and reviewing a referee's performance during a football game or games implemented as a website, in accordance with an embodiment of the present invention.

FIG. 1 is a system diagram showing the Web-based computer software tool program/database for evaluating and reviewing a referee's performance during a football game or games implemented as a website, in accordance with an embodiment of the present invention. In FIG. 1 a website 110 having implemented therein a computer software tool program, including a database 112 for storing all of the game and official grading information and a reporting component/module 114 to prepare and display customized reports based on the data in database 112. Website 110 is shown as having a variety of users being able to connect thereto. For example, a first user 120 may be a referee, a replay official, a coach and/or a grader, each of whom will have their own separate access to the website 110; and a second user 130 may be a coordinator of football officials, with the appropriate access to the website 110 to be able to review the data, grades and evaluation entered into the database 112 and the reports that can be generated by the reporting component/module 114. Similarly, a third user 140 may be a data manager/supervisor who is responsible for, but not limited to, maintaining the website 110 and preparing and providing end of season paper reports; and a fourth user 150 who may be a League Commissioner, Commissioner's Staff, and Head Coaches who are responsible for their respective organizations and can view a variety of customized reports from the website 110.

The system and method implemented in the website 110 can be used for collecting and reporting data relating to an official's (e.g, a referee's) performance and/or conduct for a specified event or events. In various embodiments, the data may relate to penalties called and enforced by an official in a football game. Further, the data may include replay information from a replay official. The system and method may also allow for review, evaluation, and grading of an official's performance and/or conduct based on the collected data. The system and method may also allow for a submission indicating a specific performance and/or conduct to be reviewed. For example, the system and method may provide for a request to review a specific play or call which is submitted by a specific team or head coach.

Figure 2:
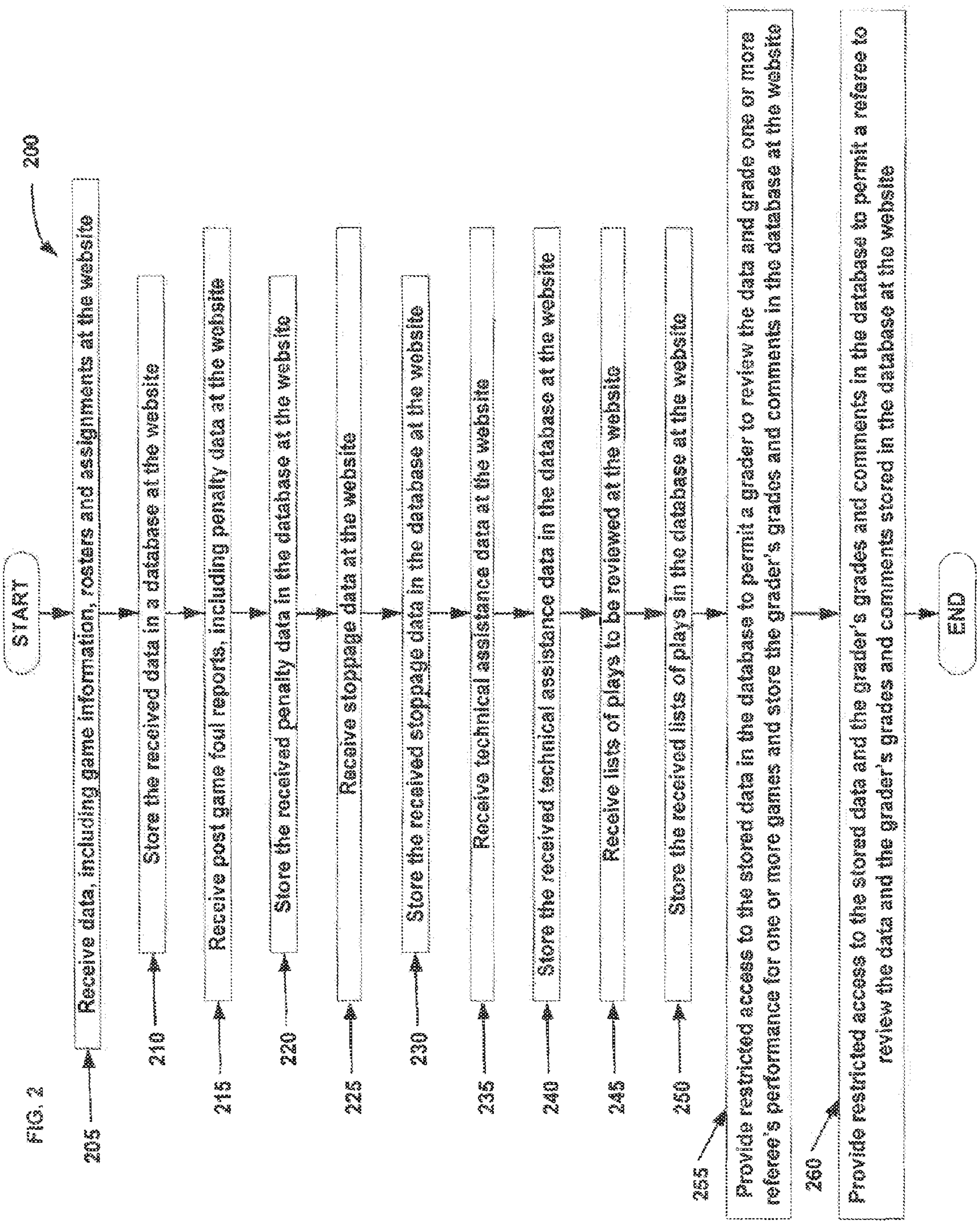
FIG. 2 is a flow diagram of how various users can use the program shown in FIG. 1, in accordance with an embodiment of the present invention.
Figure 3:
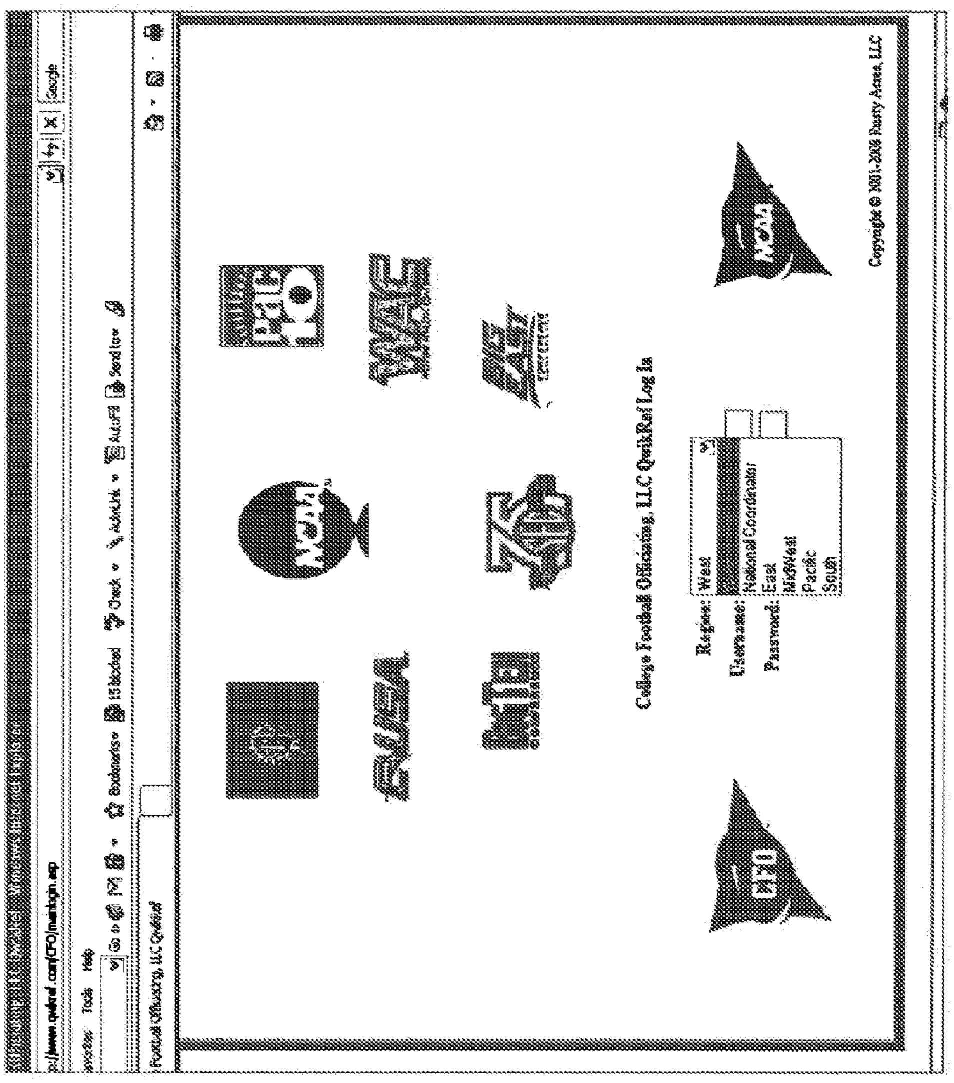
FIG. 3 is a screen shot of a general login page with a variety of different regions displayed, in accordance with an embodiment of the present invention.
Figure 4:
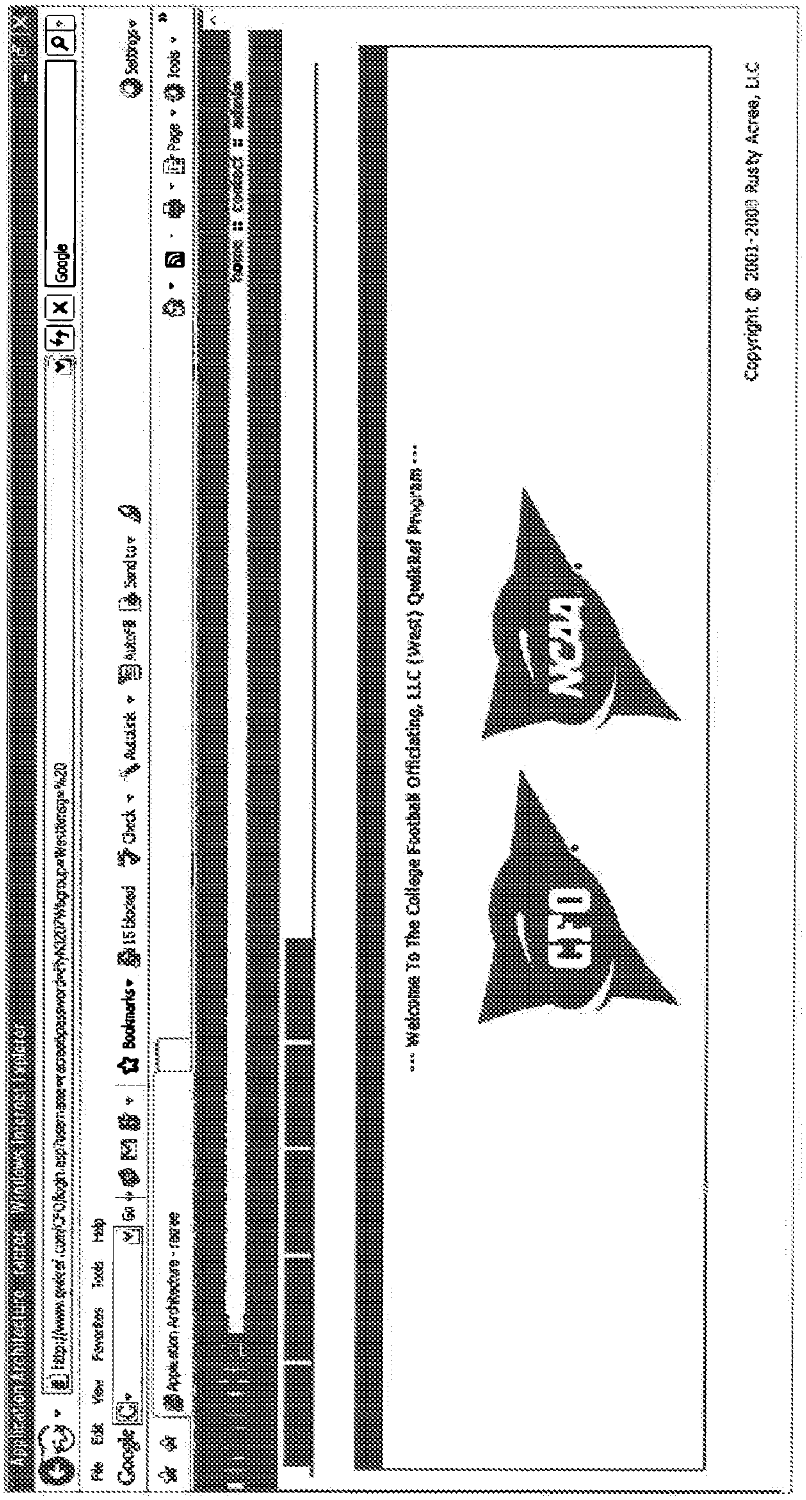
FIG. 4 is a screen shot of a supervisor permission welcome screen that is displayed after a supervisor logins in to the system, in accordance with an embodiment of the present invention.
Figure 5:
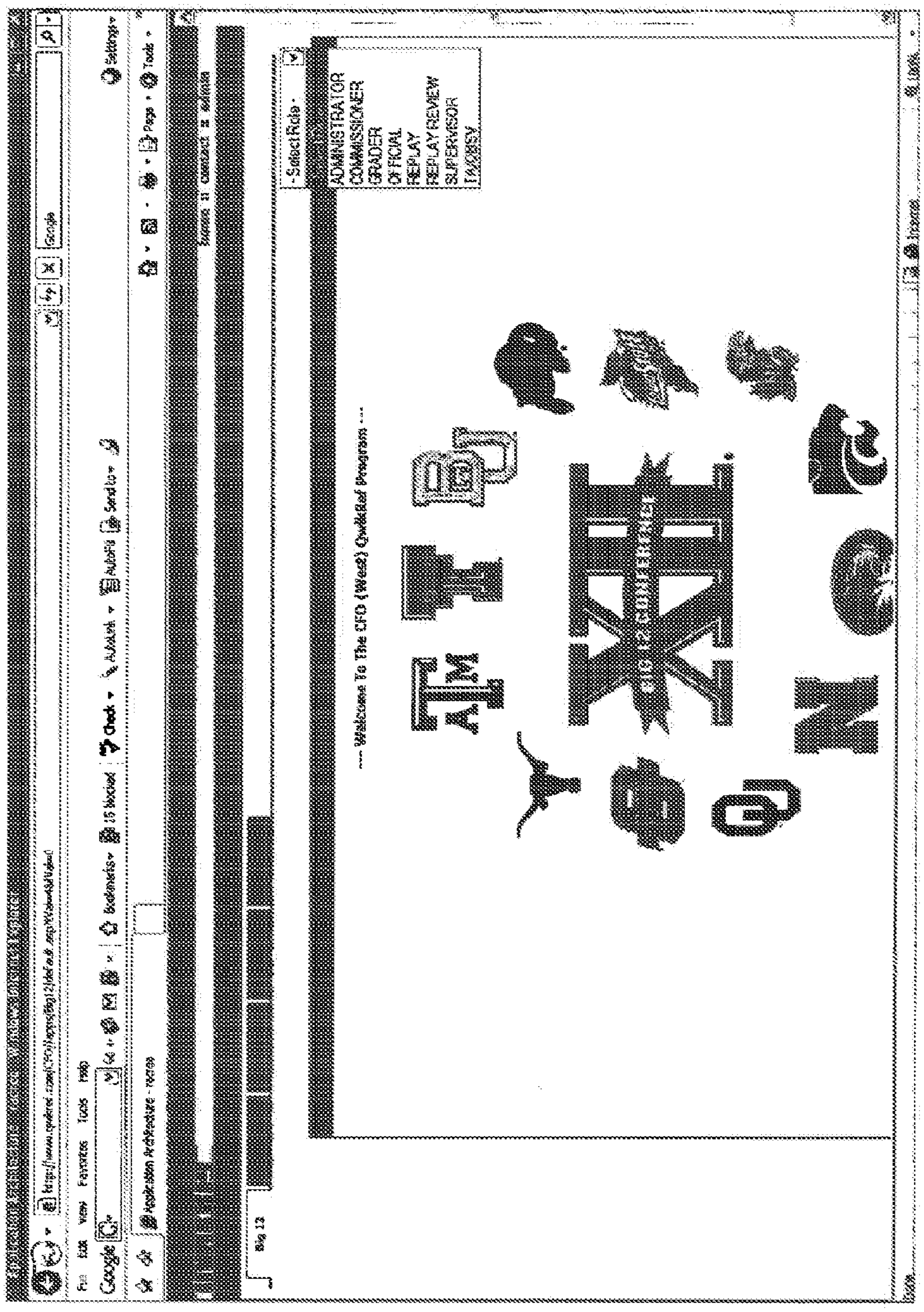
FIG. 5 is a screen shot of a Big 12 tab welcome page showing a list of the roles/people that can login to the system displayed, in accordance with an embodiment of the present invention.
Figure 6:
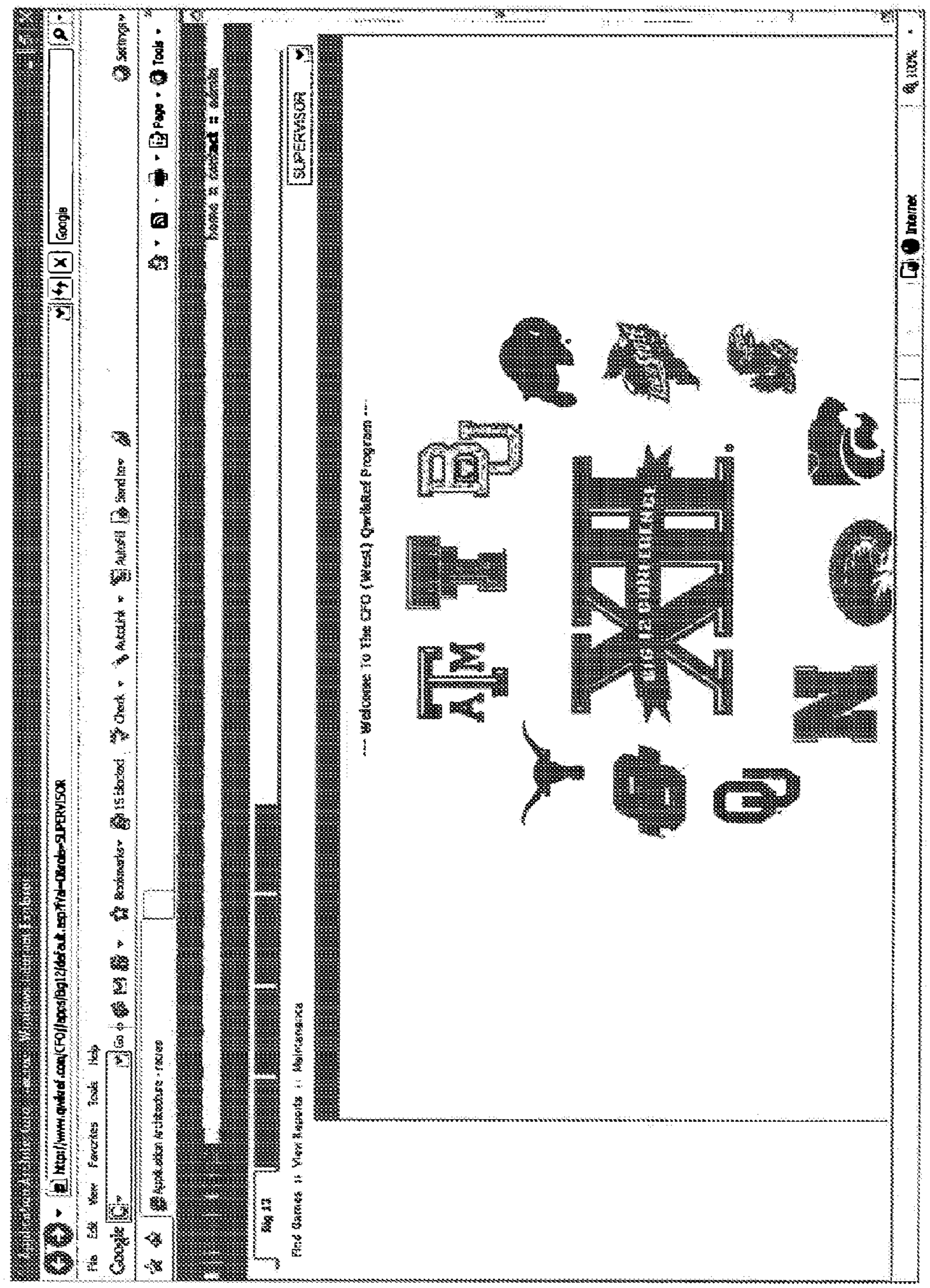
FIG. 6 is a screen shot of a supervisor permission navigation page that is displayed after selecting the supervisor role in FIG. 5, in accordance with an embodiment of the present invention.
Figure 7:
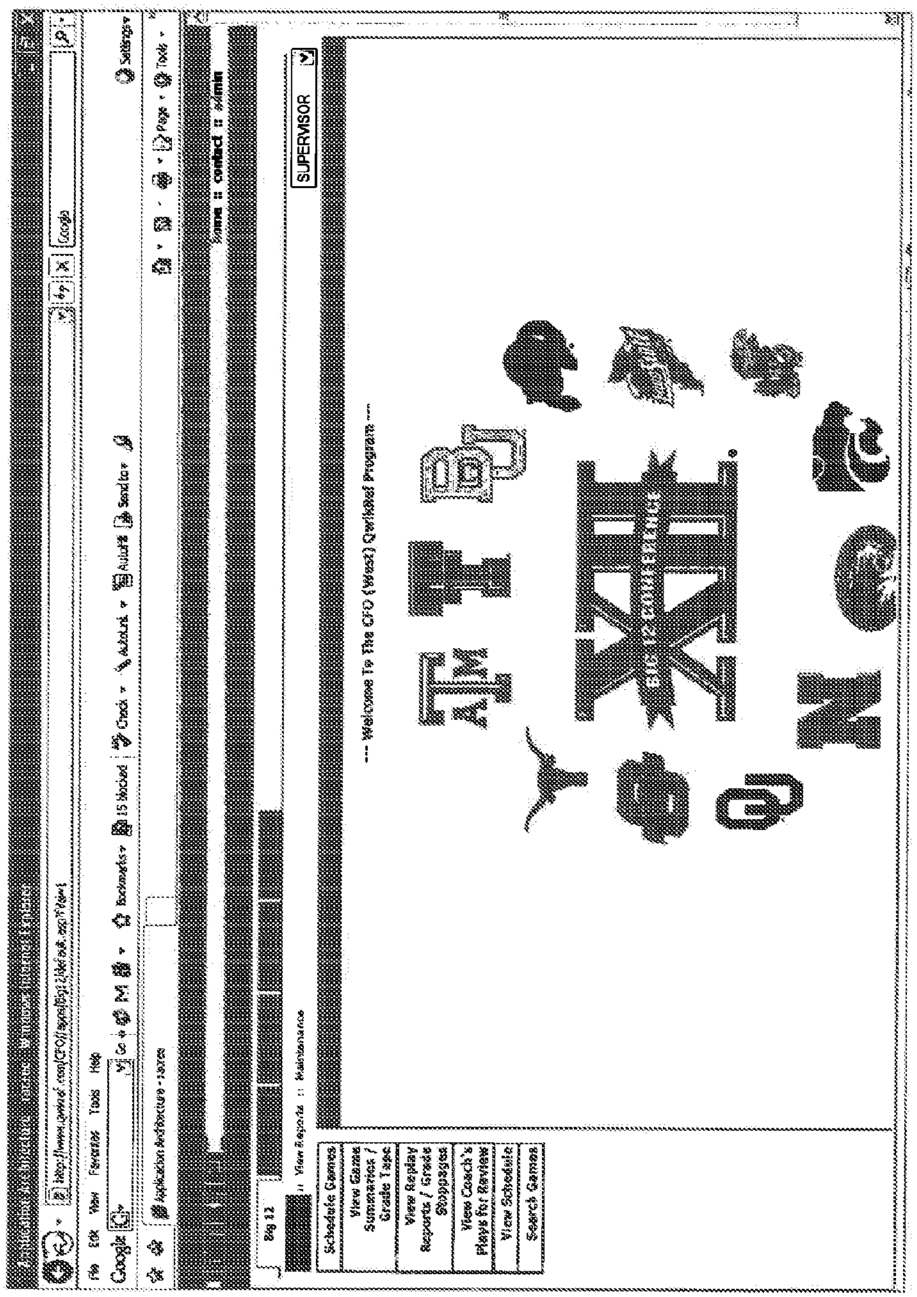
FIG. 7 is a screen shot of a supervisor permission, find games, menu page that is displayed after selecting the find games option directly under the Big 12 tab displayed, in accordance with an embodiment of the present invention.
Figure 8:
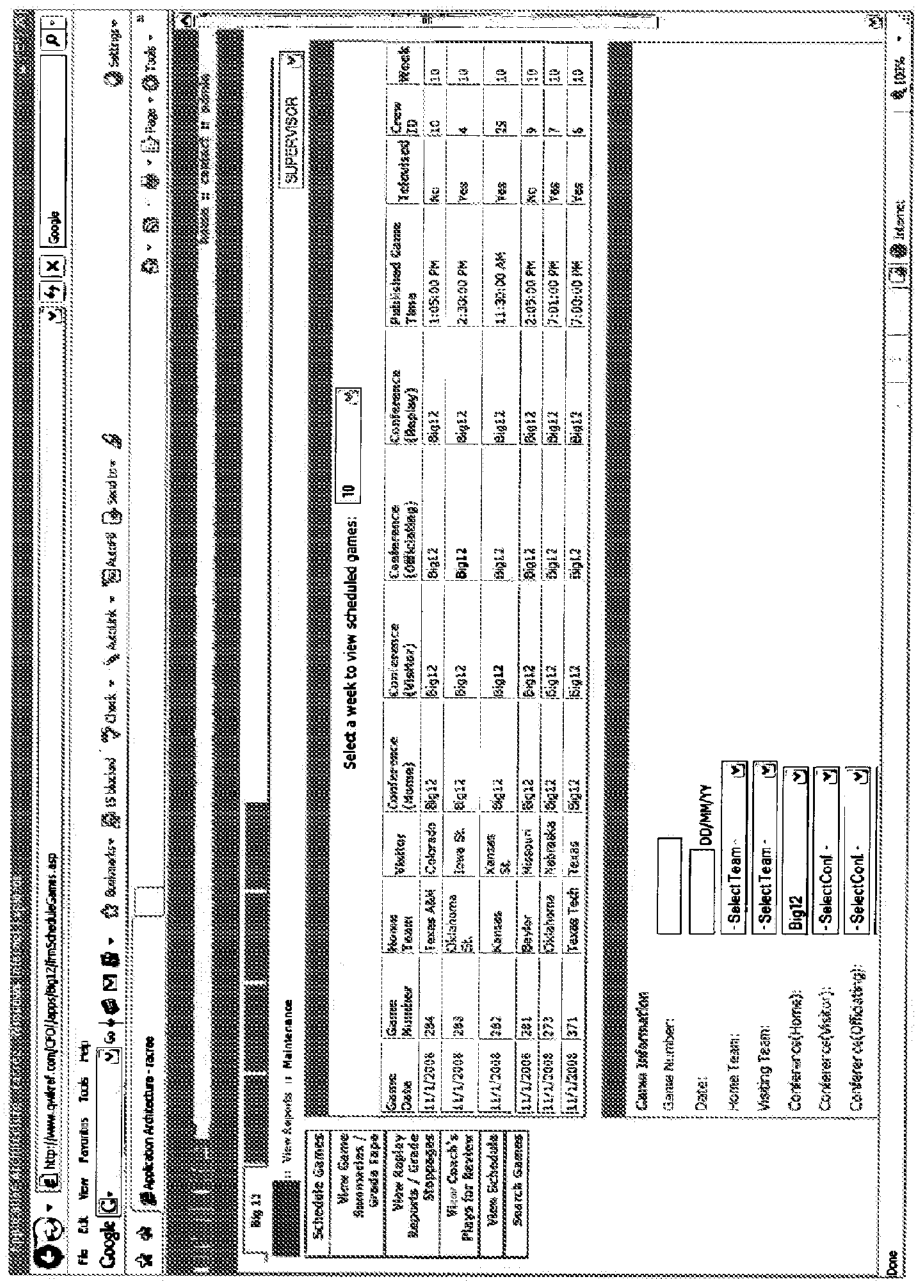
FIG. 8 is a screen shot of a supervisor permission, find games, schedule games page that is displayed after selecting the schedule games option directly under the find games option, in accordance with an embodiment of the present invention.
Figure 9:
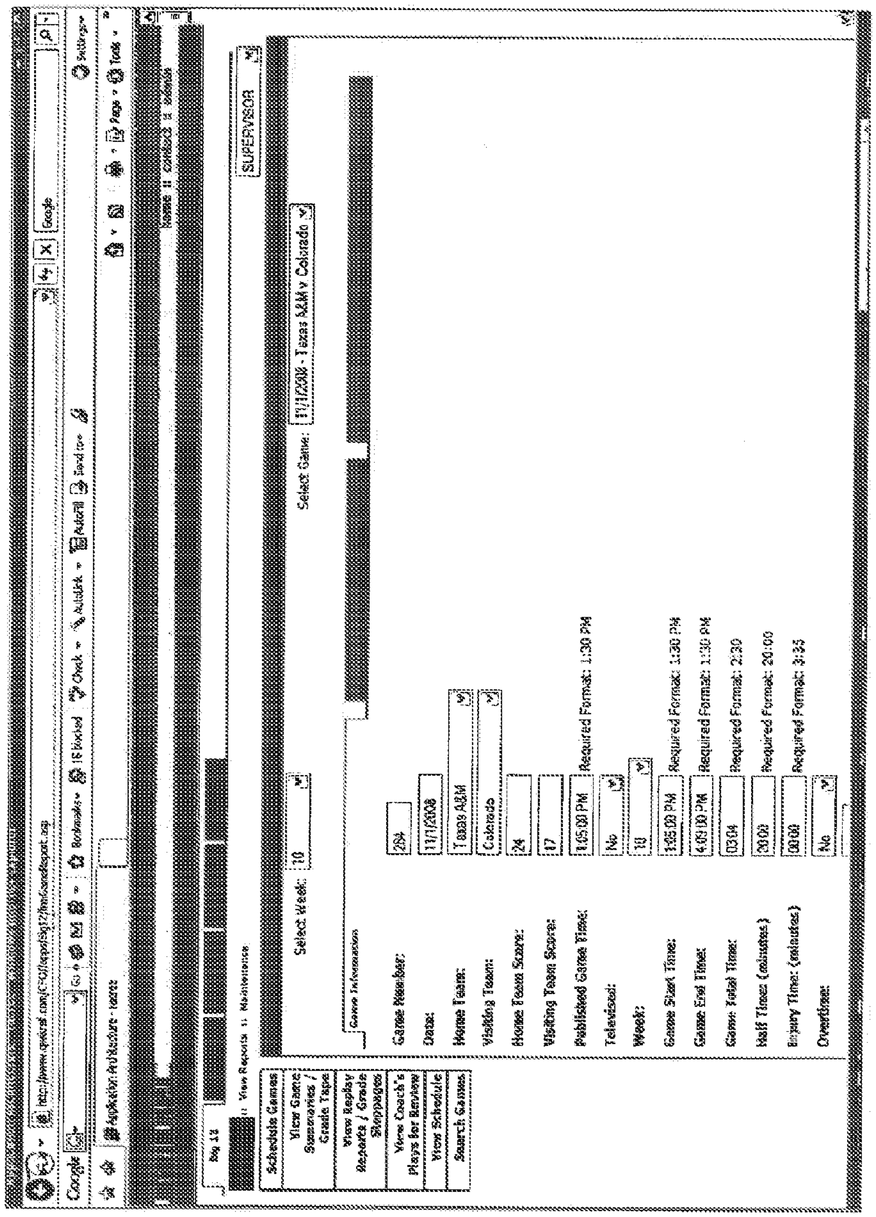
FIG. 9 is a screen shot of a supervisor permission, find games, view game summaries/grade tape game information page that is displayed after selecting the view game information tab directly under a select week selection box, in accordance with an embodiment of the present invention.
Figure 10:
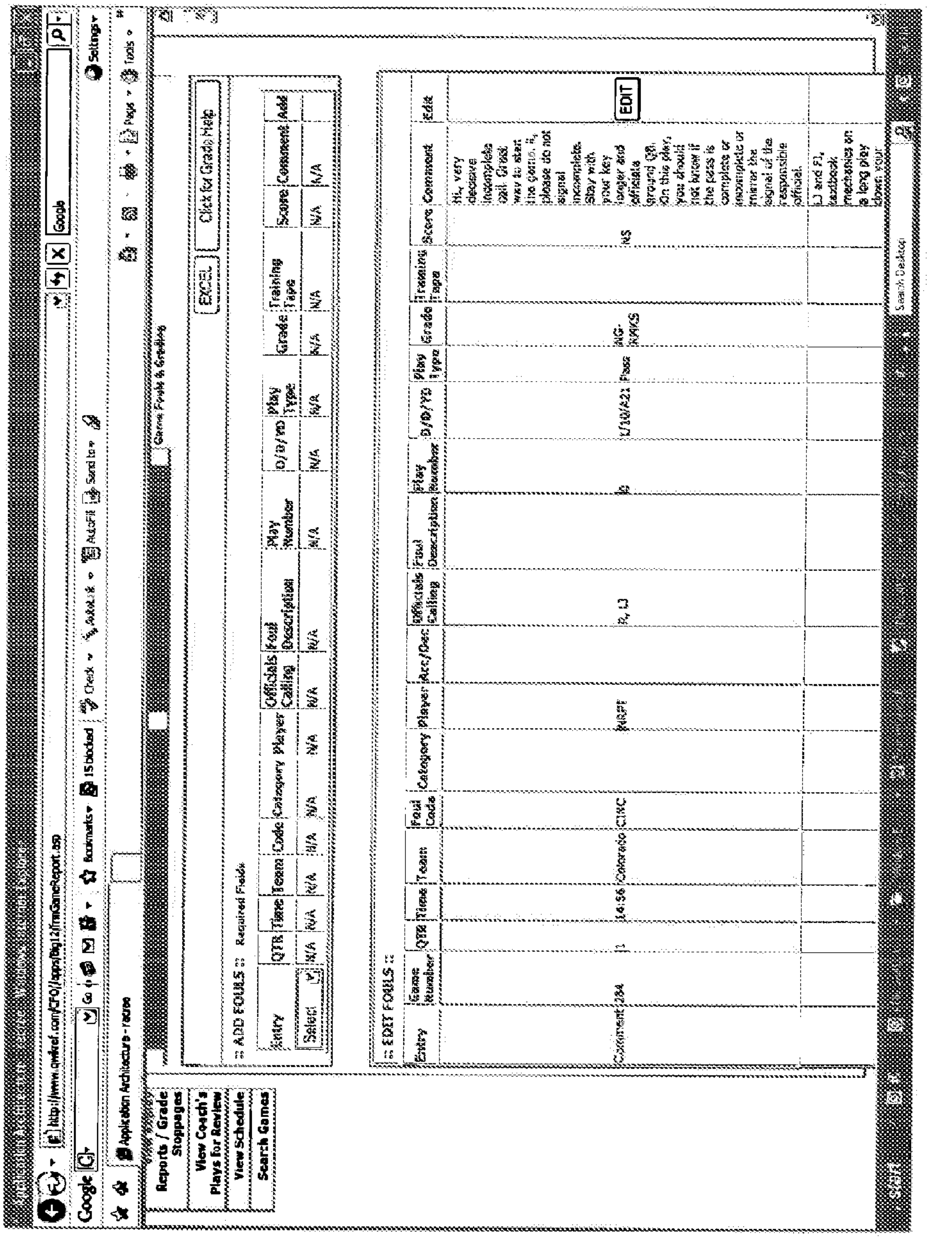
FIG. 10 is a screen shot of a supervisor permission, find games, view game summaries/game fouls & grading tab that is displayed after selecting the view game fouls & grading tab on the far right, in accordance with an embodiment of the present invention.
Figure 11:
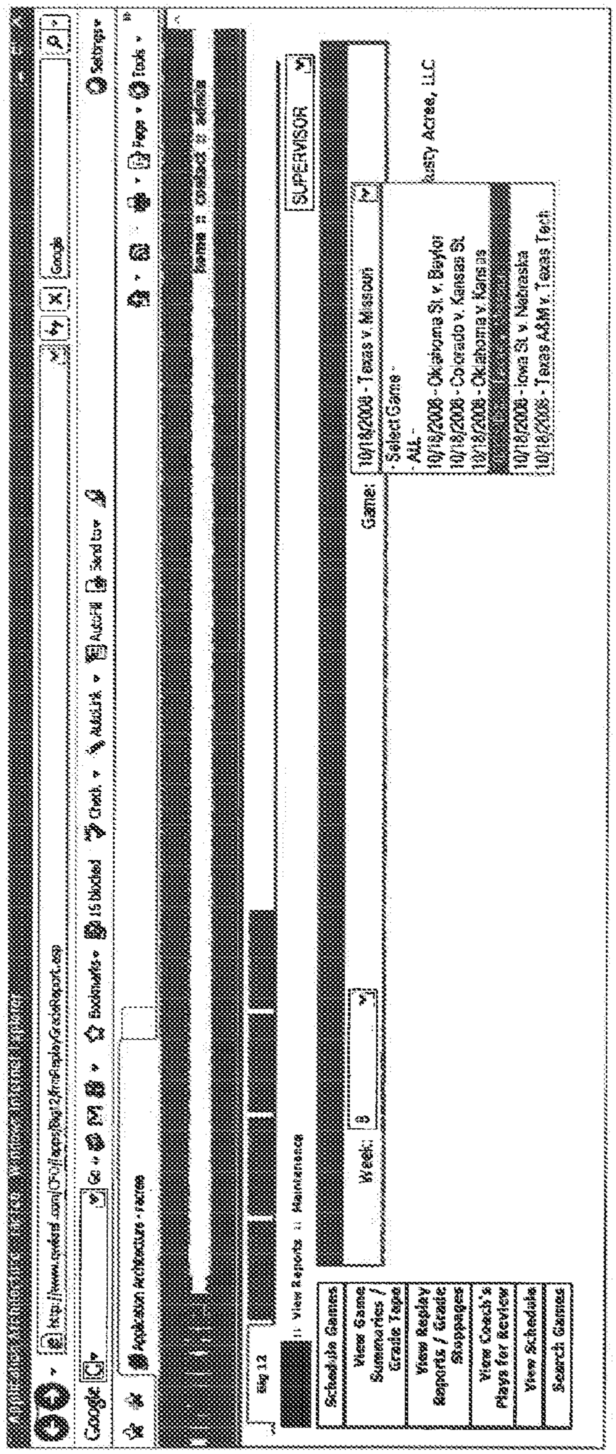
FIG. 11 is a screen shot of a supervisor permission, find games, view replay reports/grade stoppages that is displayed after selecting the view replay reports/grade stoppages option directly under the view game summaries/grade tape option, in accordance with an embodiment of the present invention.
Figure 12:
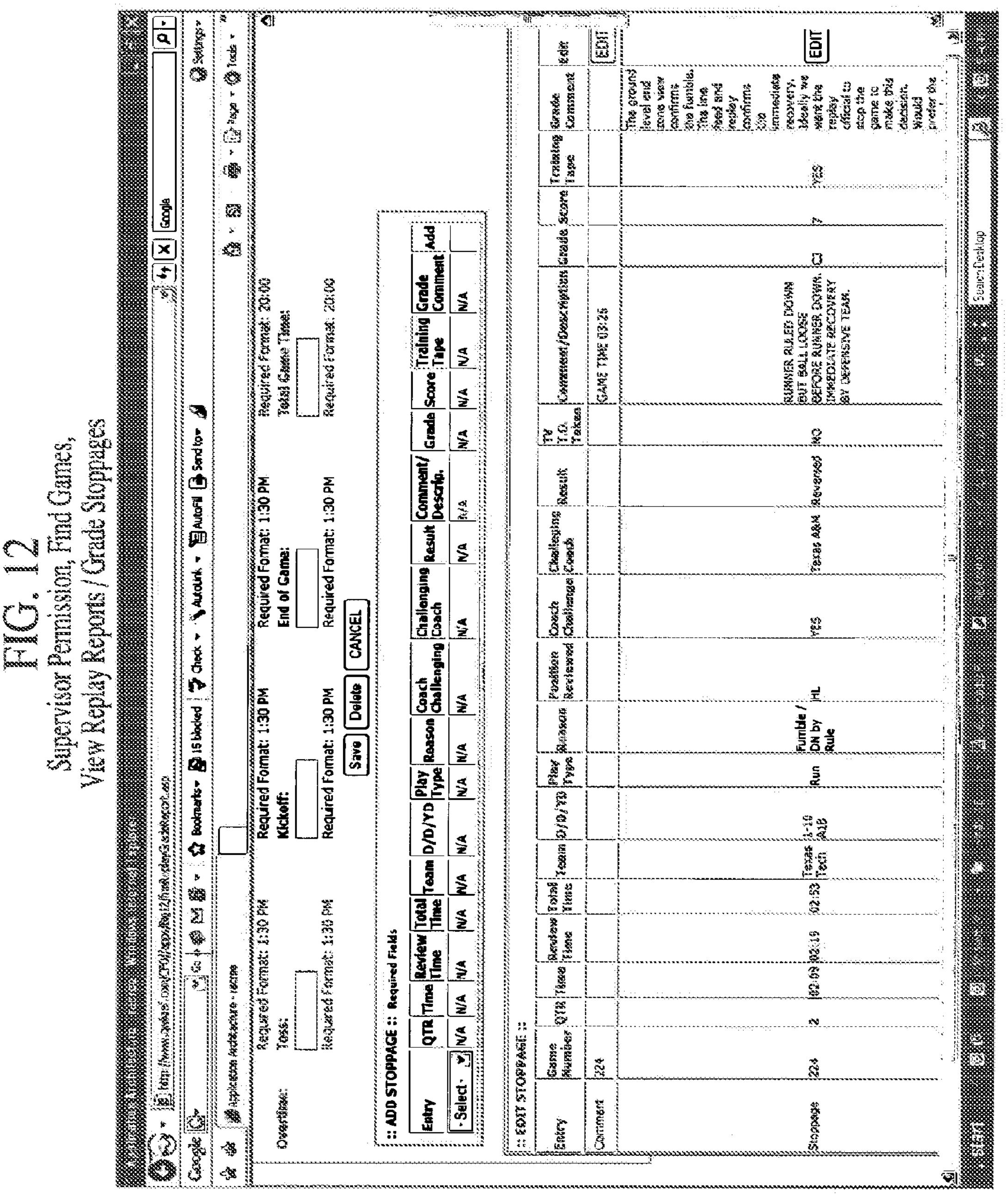
FIG. 12 is a screen shot of the supervisor permission, find games, view replay reports/grade stoppages from FIG. 11 that is displayed after selecting the Oct. 18, 2008 Texas v. Missouri game from the drop down menu in FIG. 11, in accordance with an embodiment of the present invention.
Figure 13:
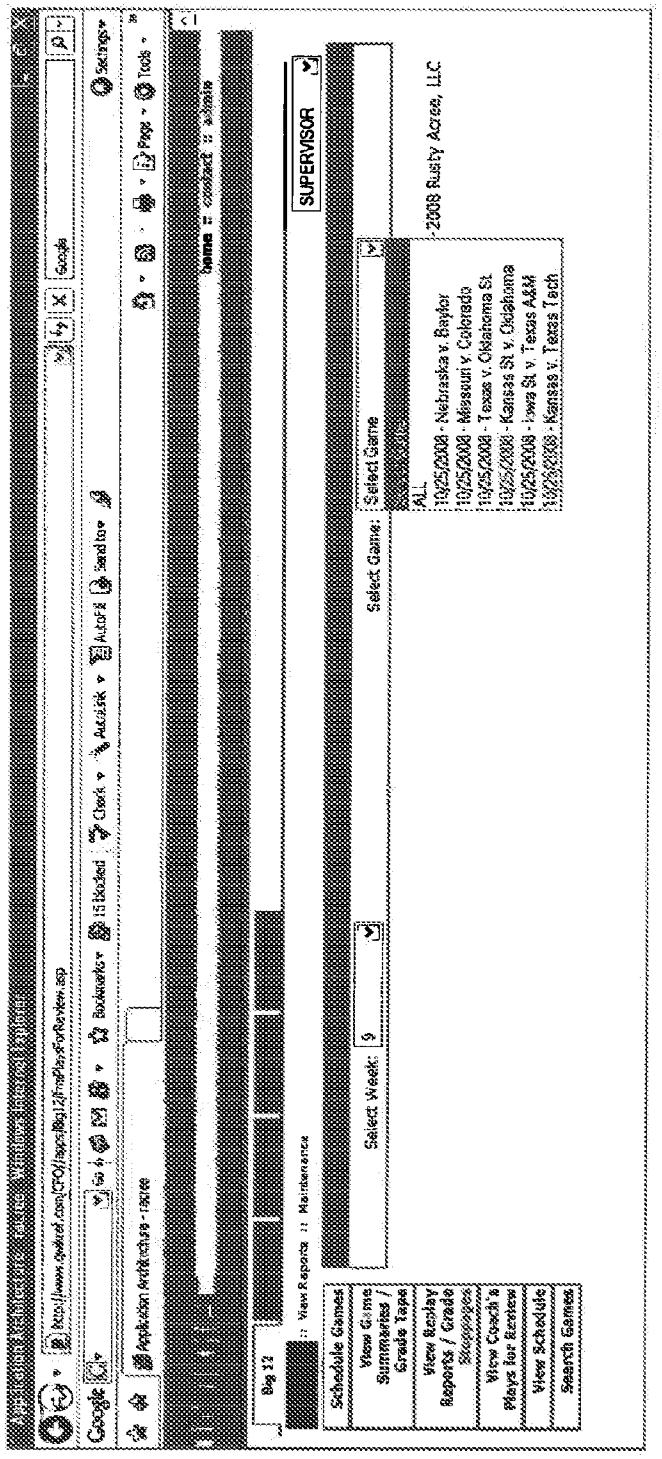
FIG. 13 is a screen shot of a supervisor permission, find games, view coach's plays for review that is displayed after selecting the view coach's plays for review option directly under the view replay reports/grade stoppages option, in accordance with an embodiment of the present invention.
Figure 14:
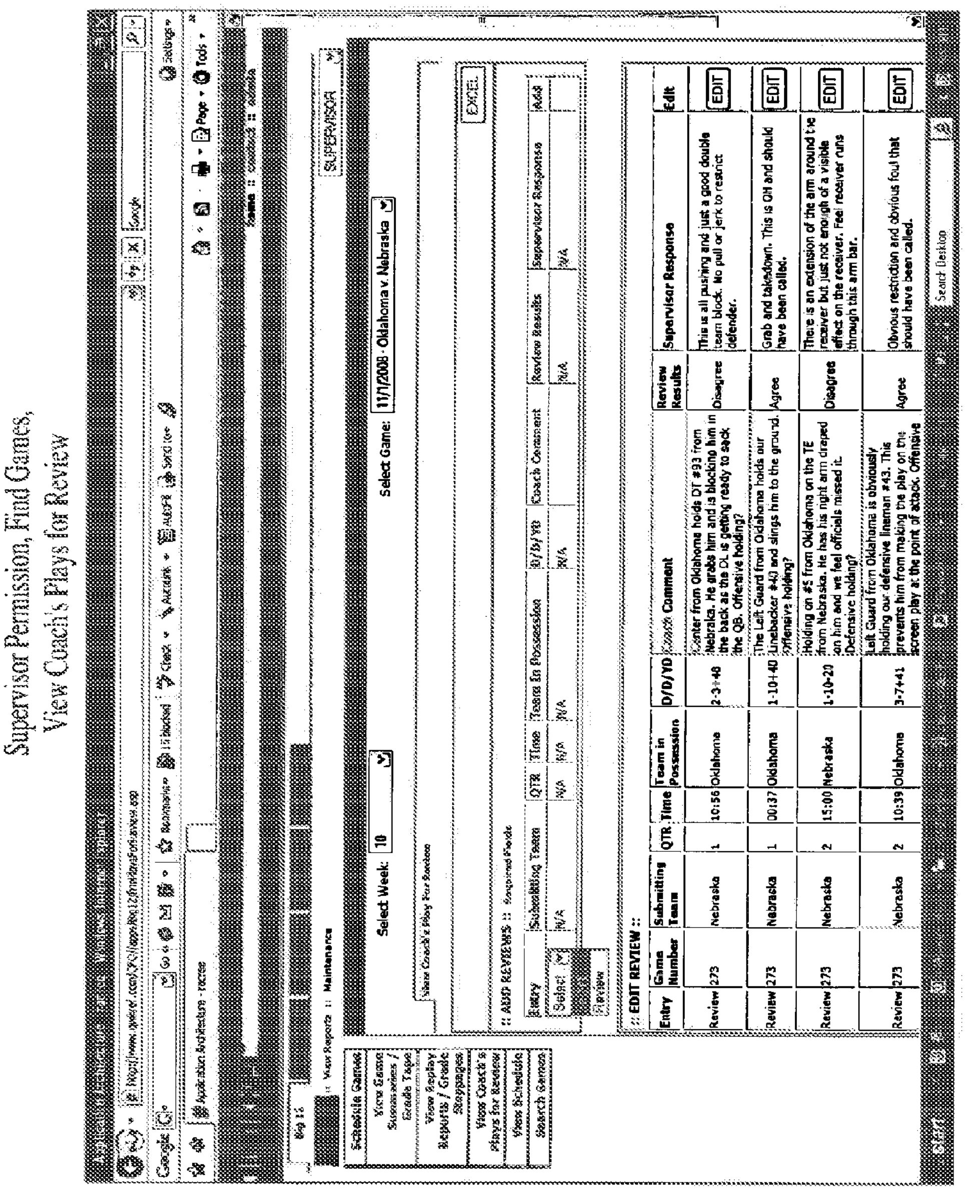
FIG. 14 is a screen shot of a supervisor permission, find games, view coach's plays for review from FIG. 12 that is displayed after selecting the Nov. 1, 2008 Oklahoma v. Nebraska game from the drop down menu in FIG. 12, in accordance with an embodiment of the present invention.
Figure 15:
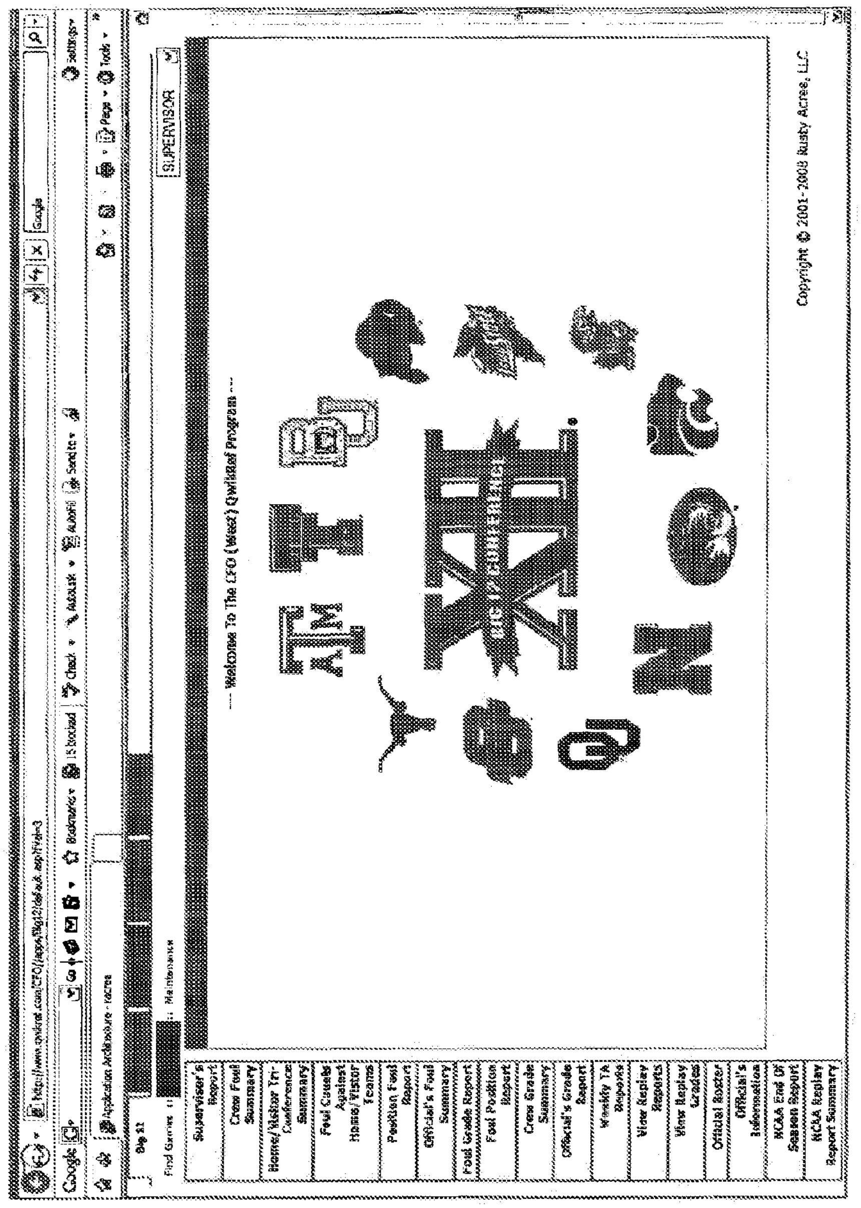
FIG. 15 is a screen shot of a supervisor permission, view reports, menu page after selecting the view reports option to the right of the find games option, in accordance with an embodiment of the present invention.
Figure 16:
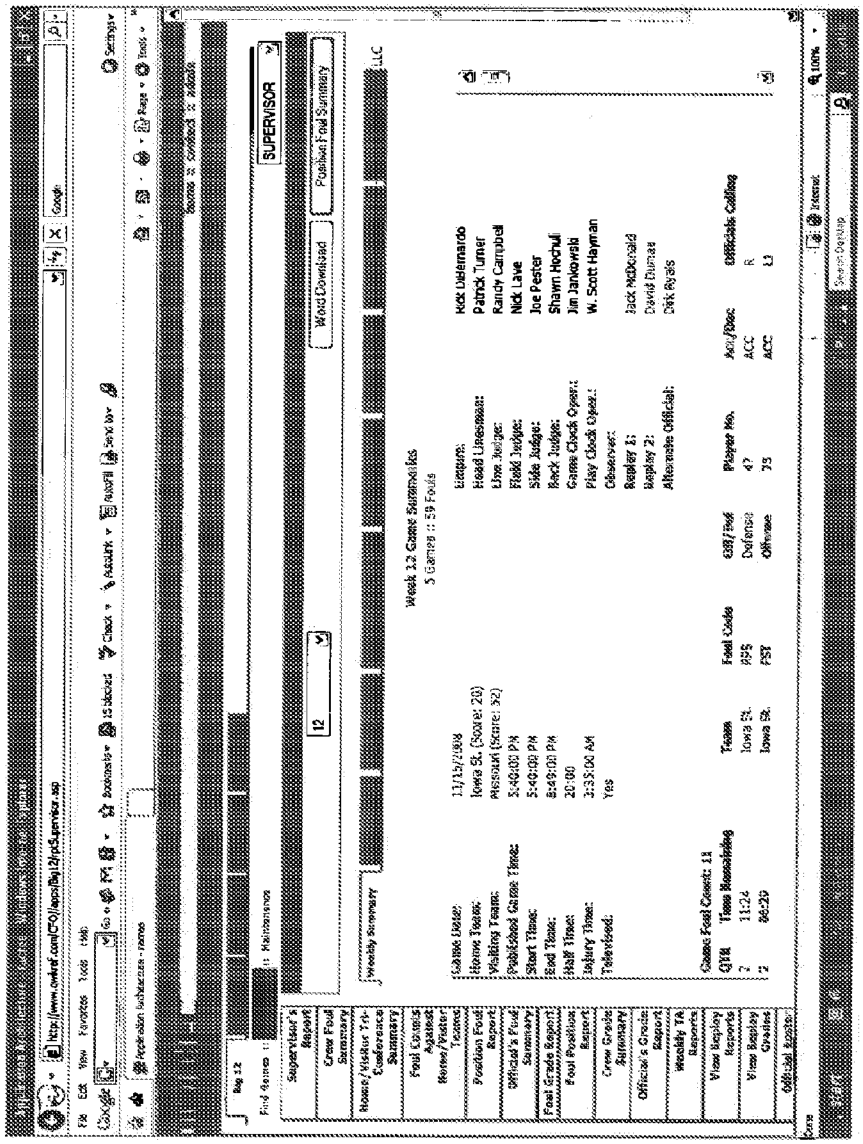
FIG. 16 is a screen shot of a supervisor permission, view reports, supervisor's report weekly summary tab, in accordance with an embodiment of the present invention.
Figure 17:
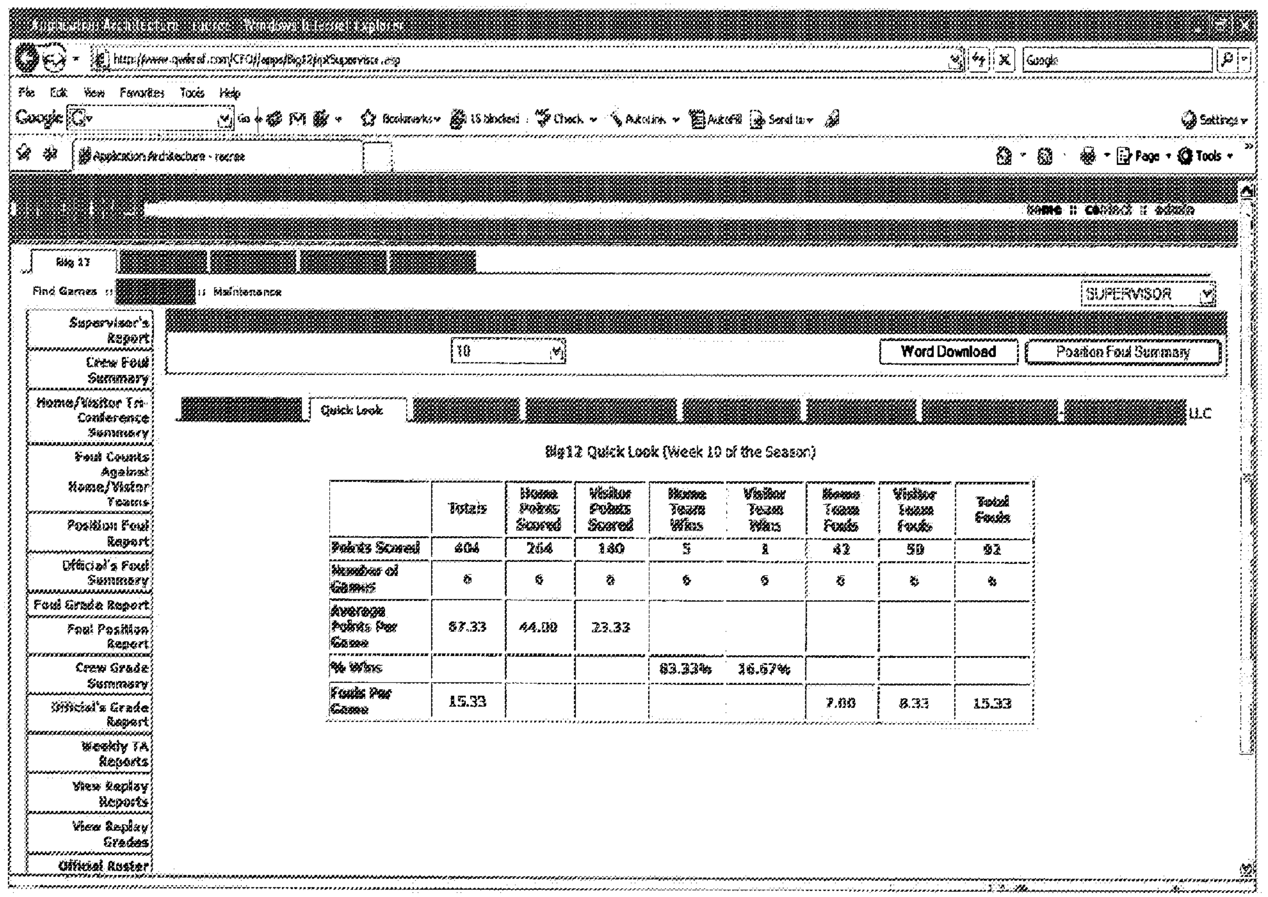
FIG. 17 is a screen shot of a supervisor permission, view reports, supervisor's report qwik look tab, in accordance with an embodiment of the present invention.
Figure 18:
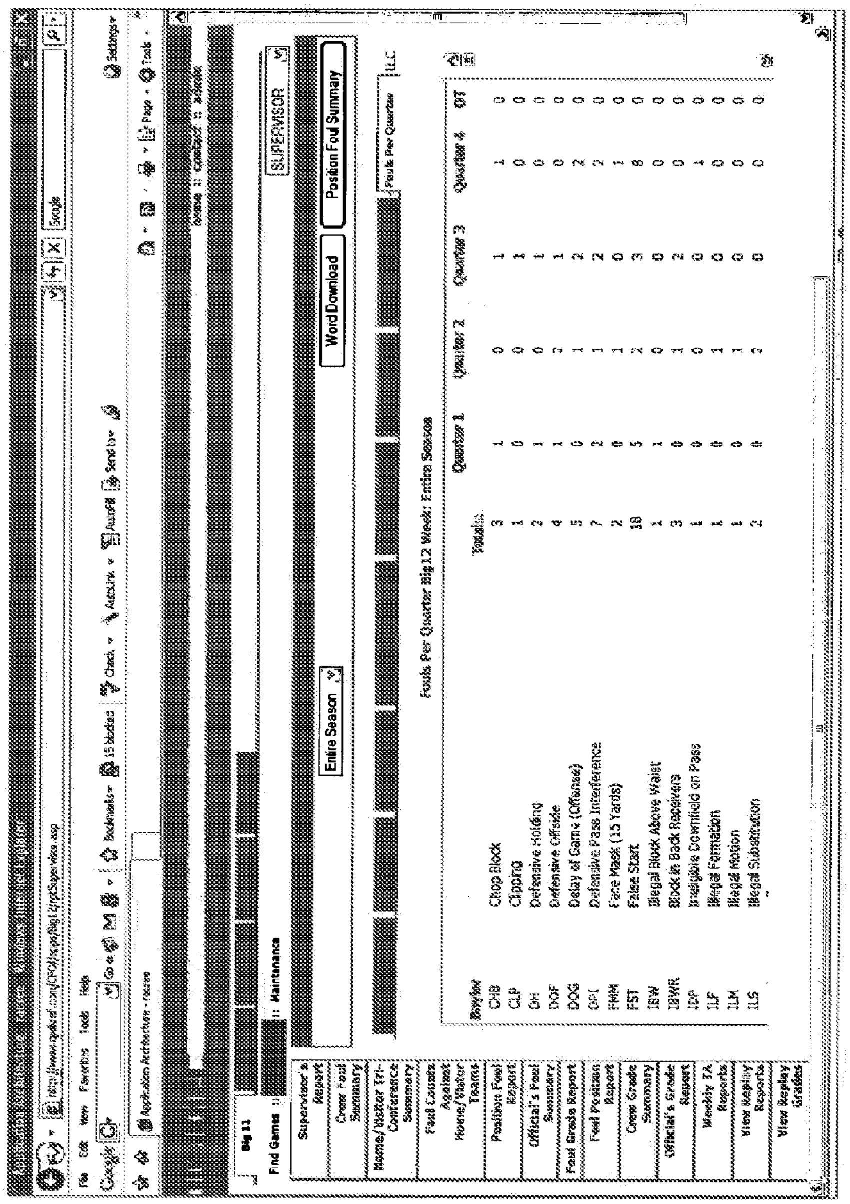
FIG. 18 is a screen shot of a supervisor permission, view reports, supervisor's report fouls for quarter tab, in accordance with an embodiment of the present invention.
Figure 19:
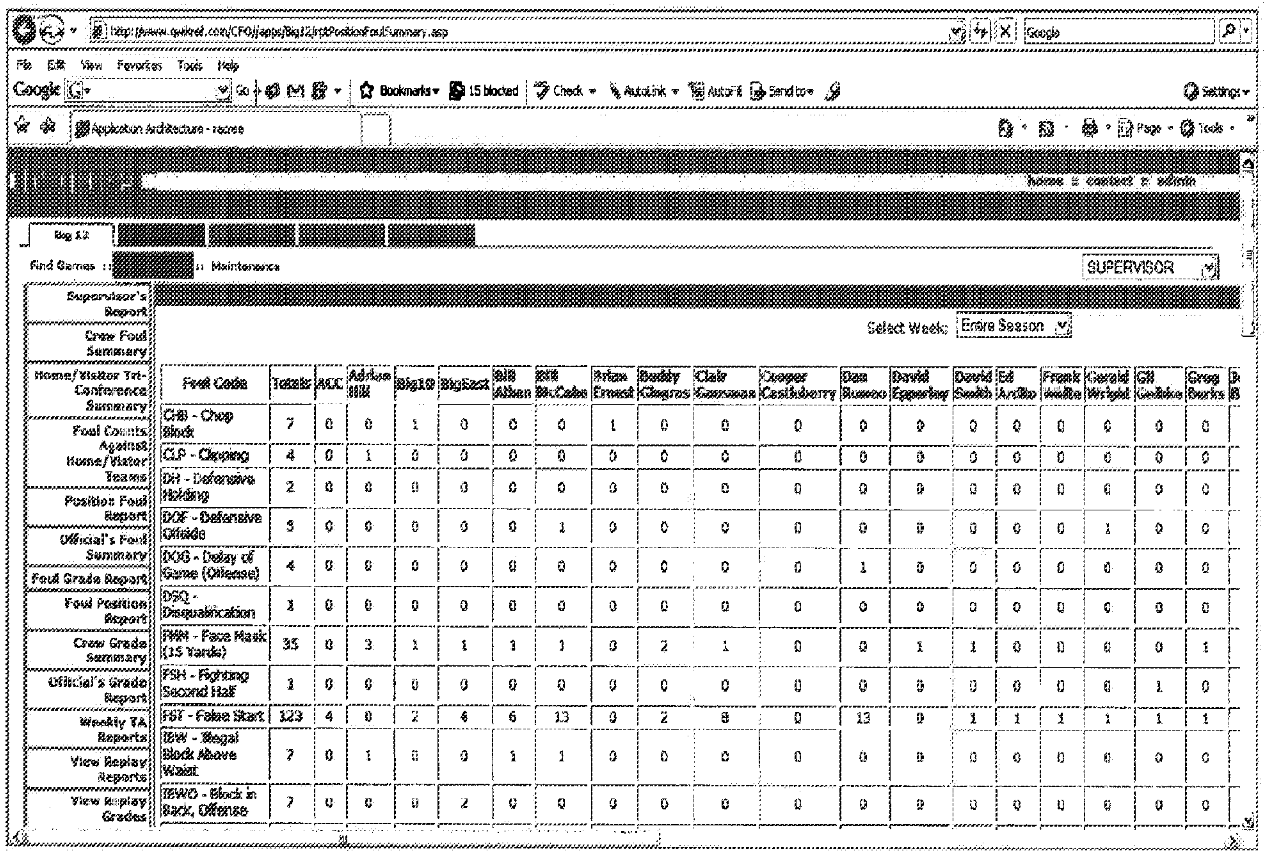
FIG. 19 is a screen shot of a supervisor permission, view reports, position foul report that provides details on the fouls that were called and which officials made the call, in accordance with an embodiment of the present invention.
Figure 20:
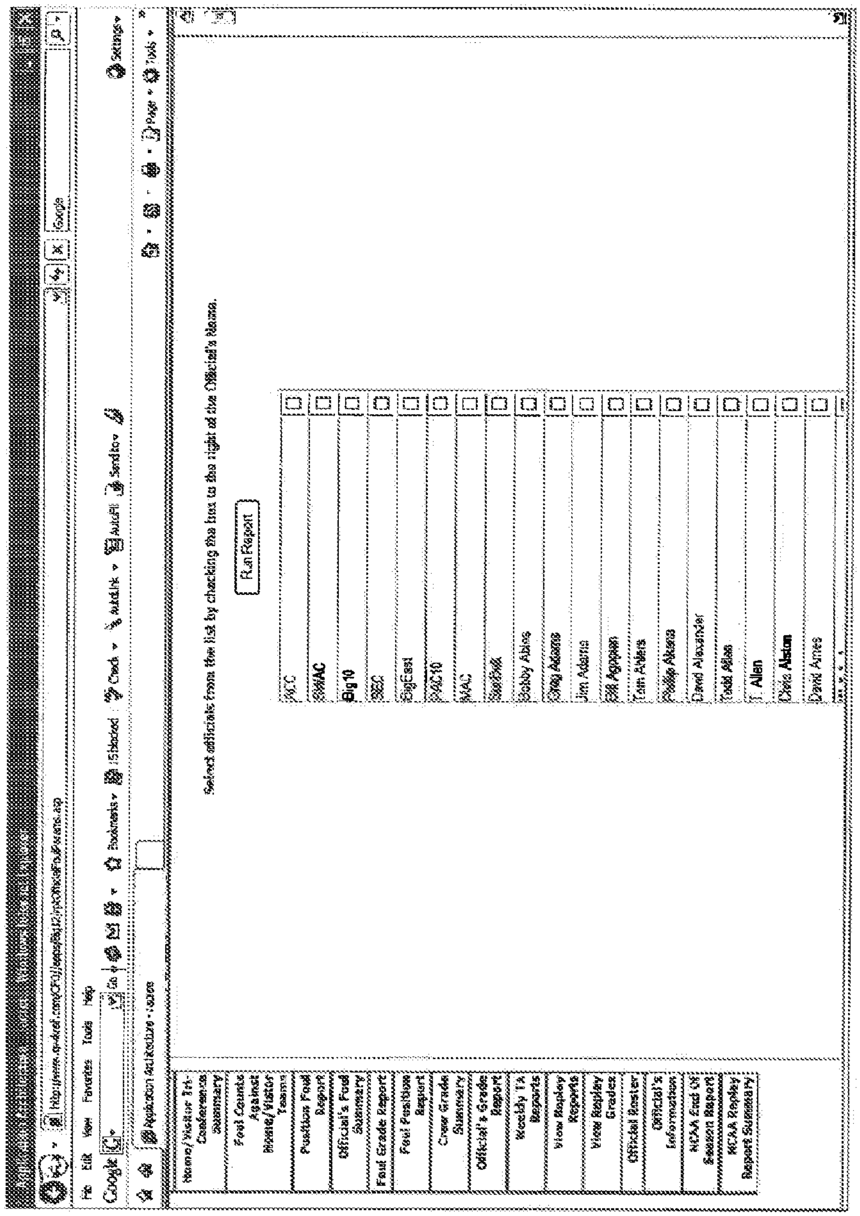
FIG. 20 is a screen shot of a supervisor permission, view reports, officials foul summary display that provides details on the fouls that were called by each official, in accordance with an embodiment of the present invention.
Figure 21:
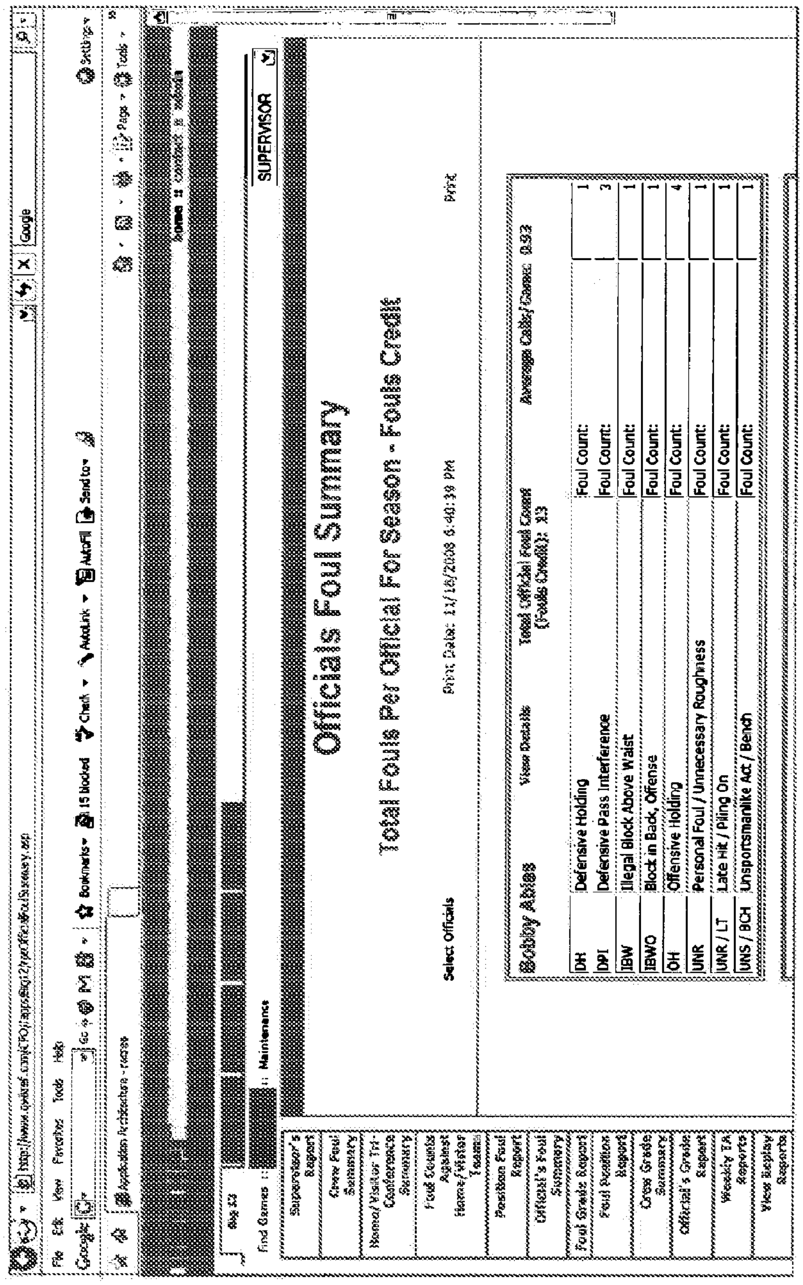
FIG. 21 is a screen shot of a supervisor permission, view reports, officials foul summary, specific official display that provides details on the fouls that were called by a specific official, in accordance with an embodiment of the present invention.
Figure 22:
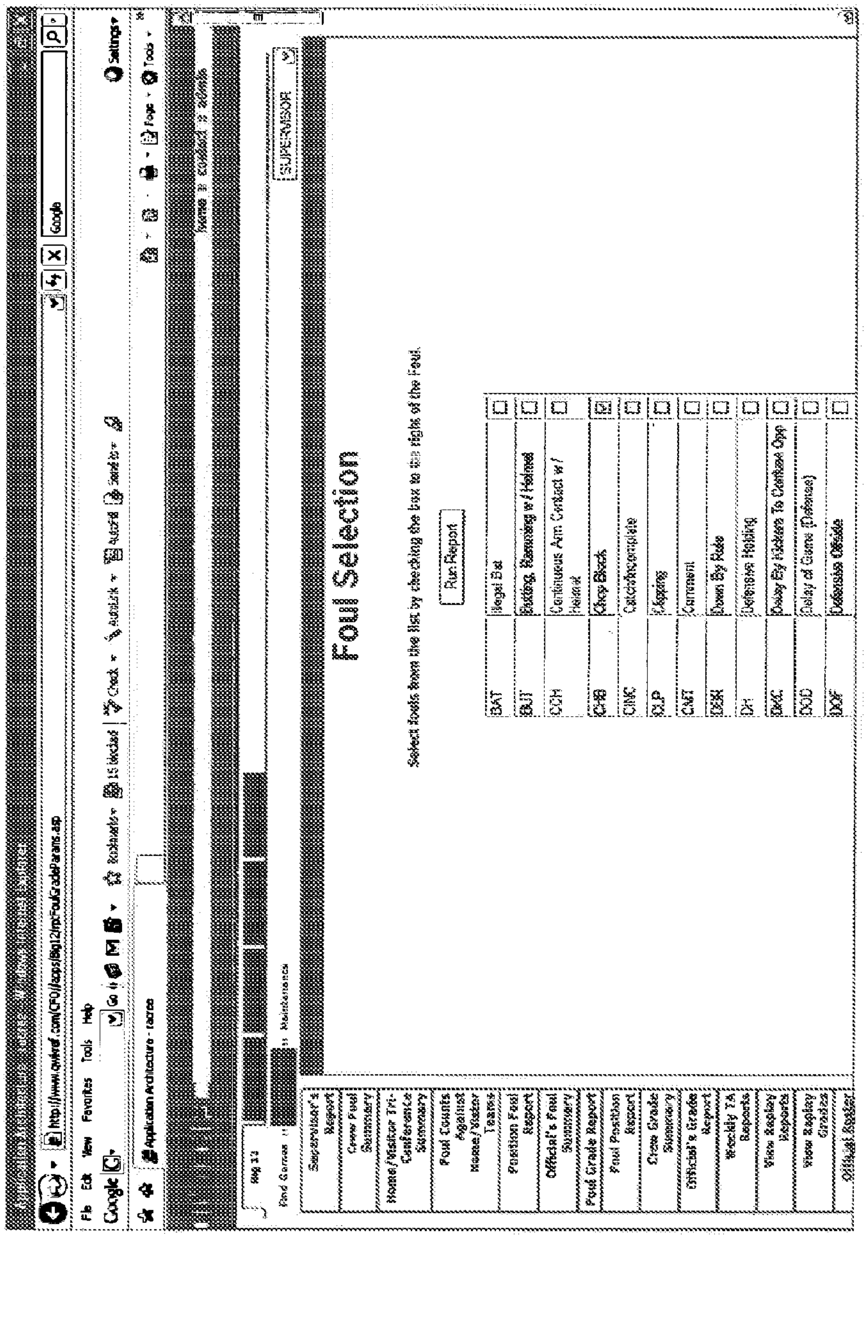
FIG. 22 is a screen shot of a supervisor permission, view reports, foul grade report that provides details on the different types of fouls that were called by all of the officials, in accordance with an embodiment of the present invention.
Figure 23:
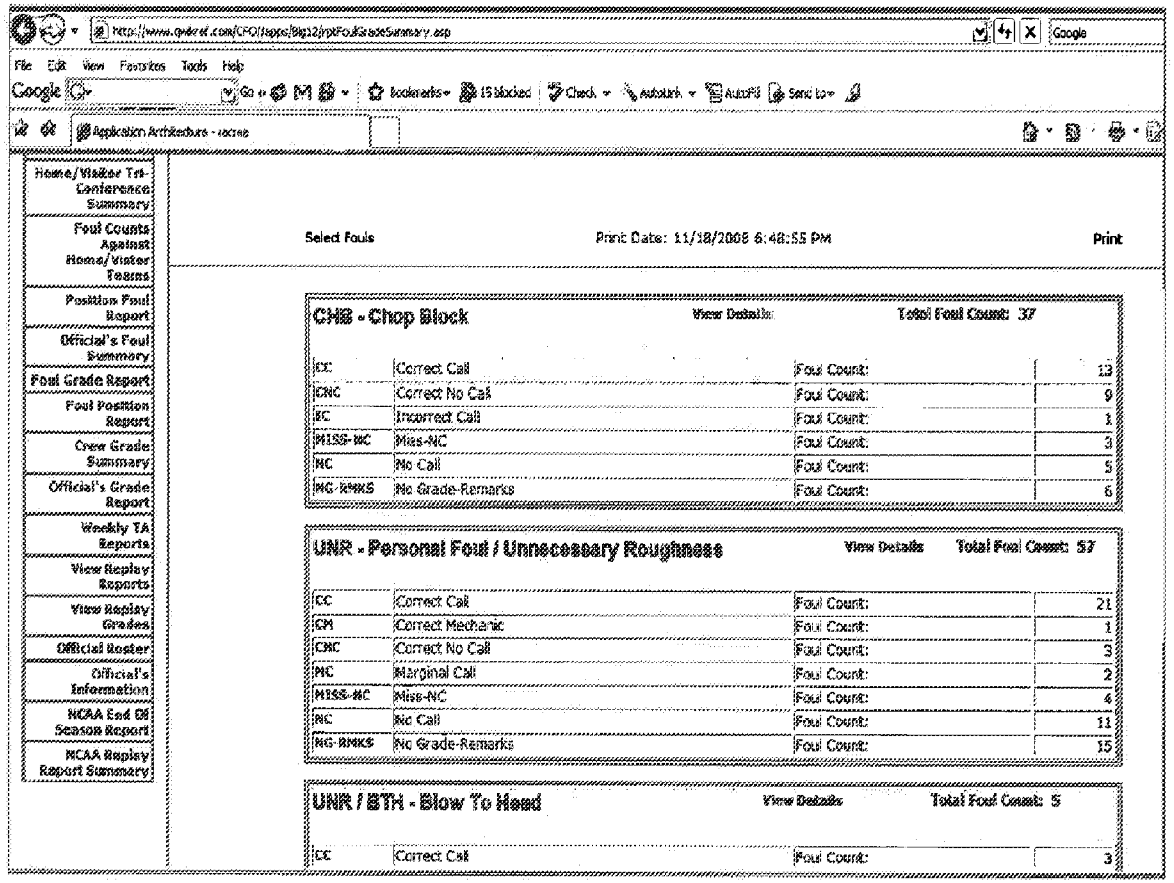
FIG. 23 is a screen shot of a supervisor permission, view reports, foul grade report, fouls checked display that provides information on the fouls checked by the user in FIG. 22, in accordance with an embodiment of the present invention.
Figure 24:
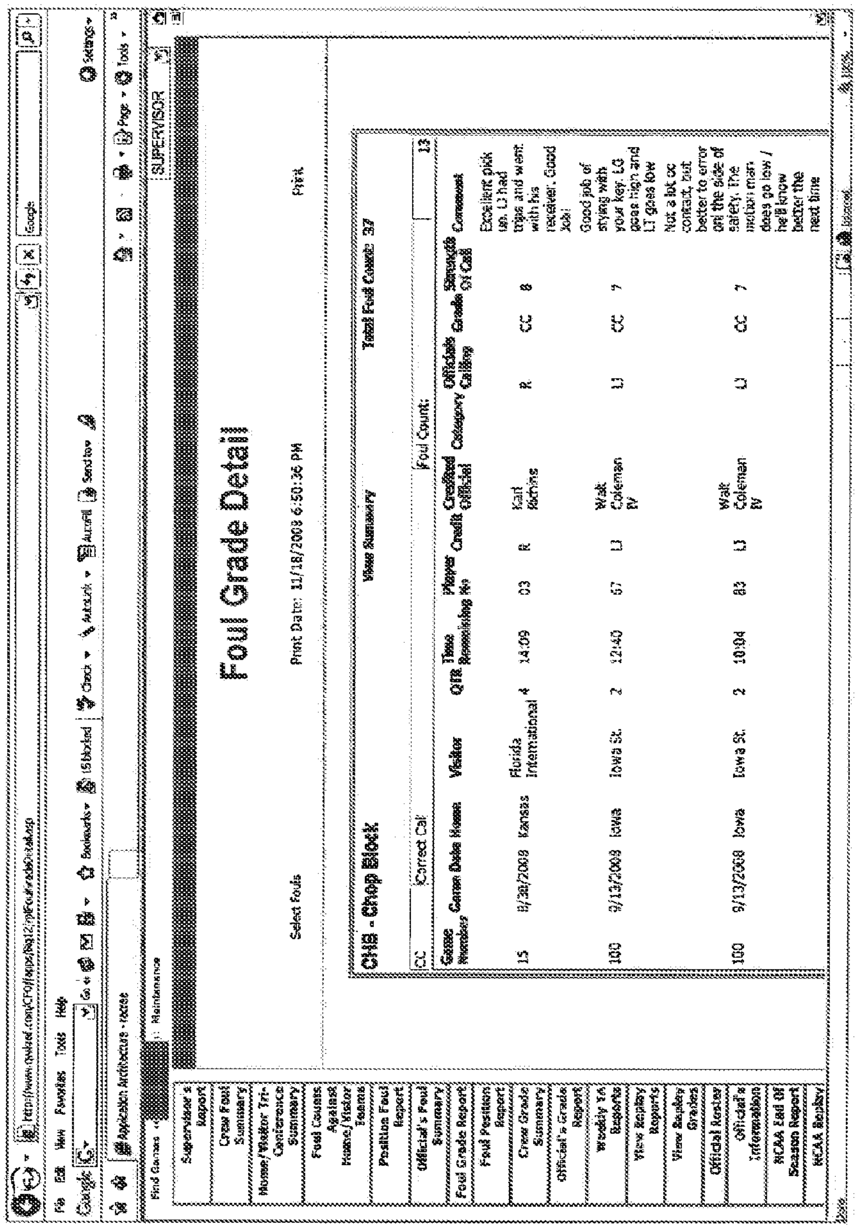
FIG. 24 is a screen shot of a supervisor permission, view reports, foul grade report, fouls checked, view details display that provides details on a selected foul after the user selects a view detail option associated with a specific foul, in accordance with an embodiment of the present invention.
Figure 25:
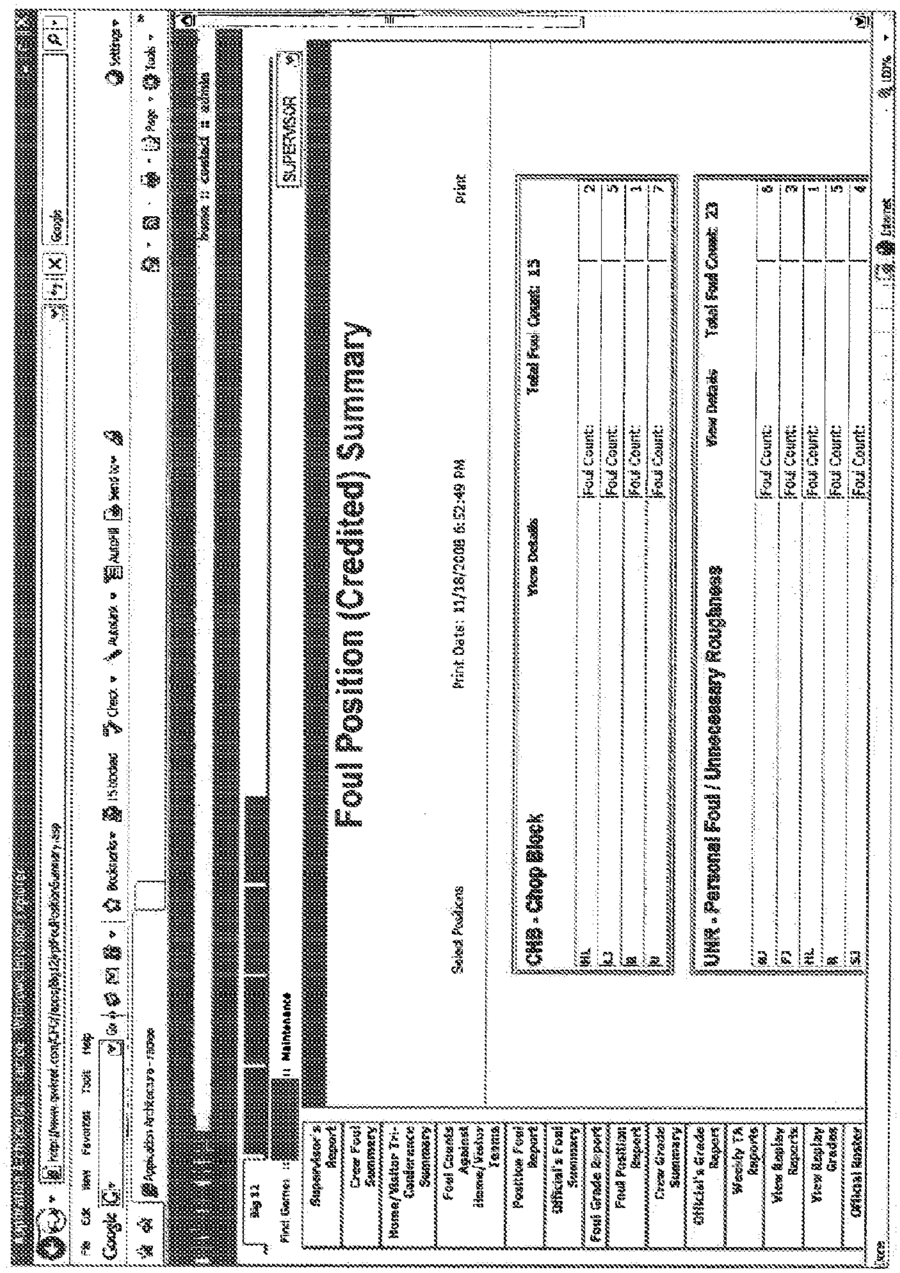
FIG. 25 is a screen shot of a supervisor permission, view reports, foul position report display that provides details on selected fouls by official position, in accordance with an embodiment of the present invention.
Figure 26:
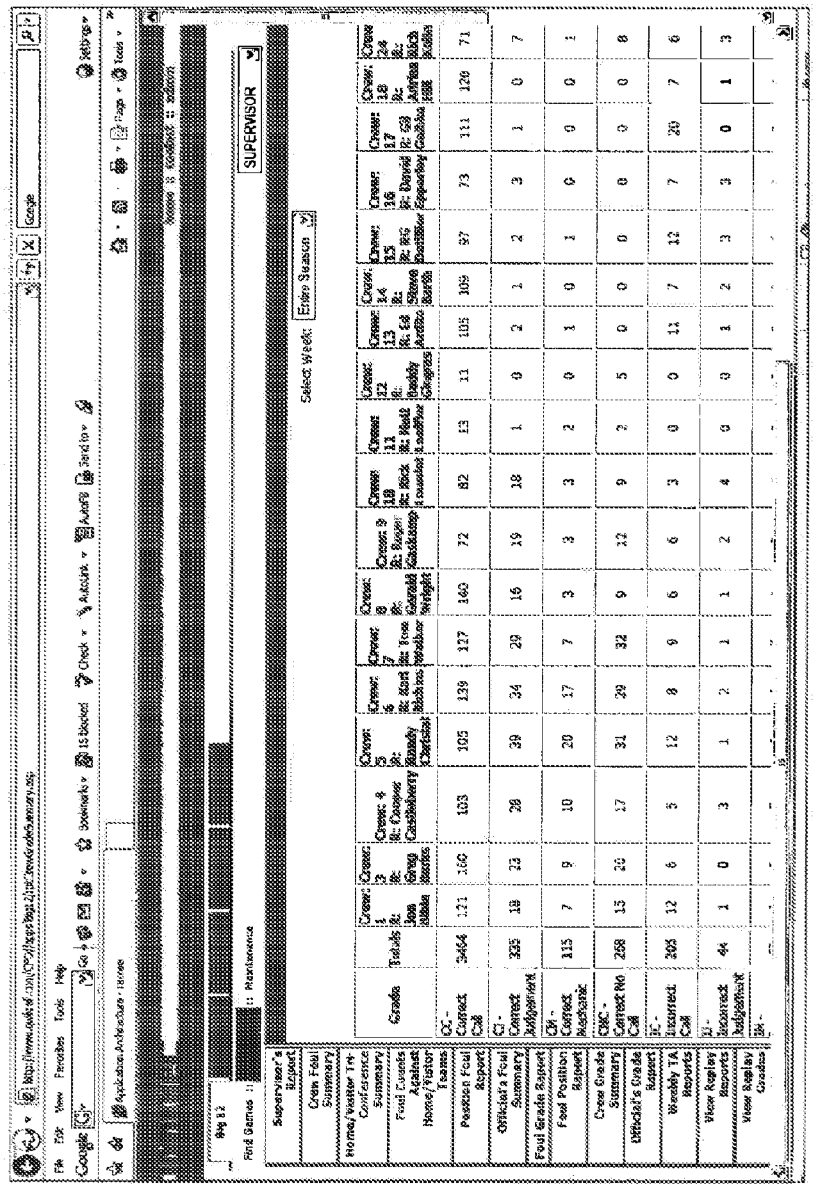
FIG. 26 is a screen shot of a supervisor permission, view reports, crew grade summary report display that provides details on the grades for each crew of officials over the year, in accordance with an embodiment of the present invention.
Figure 27:
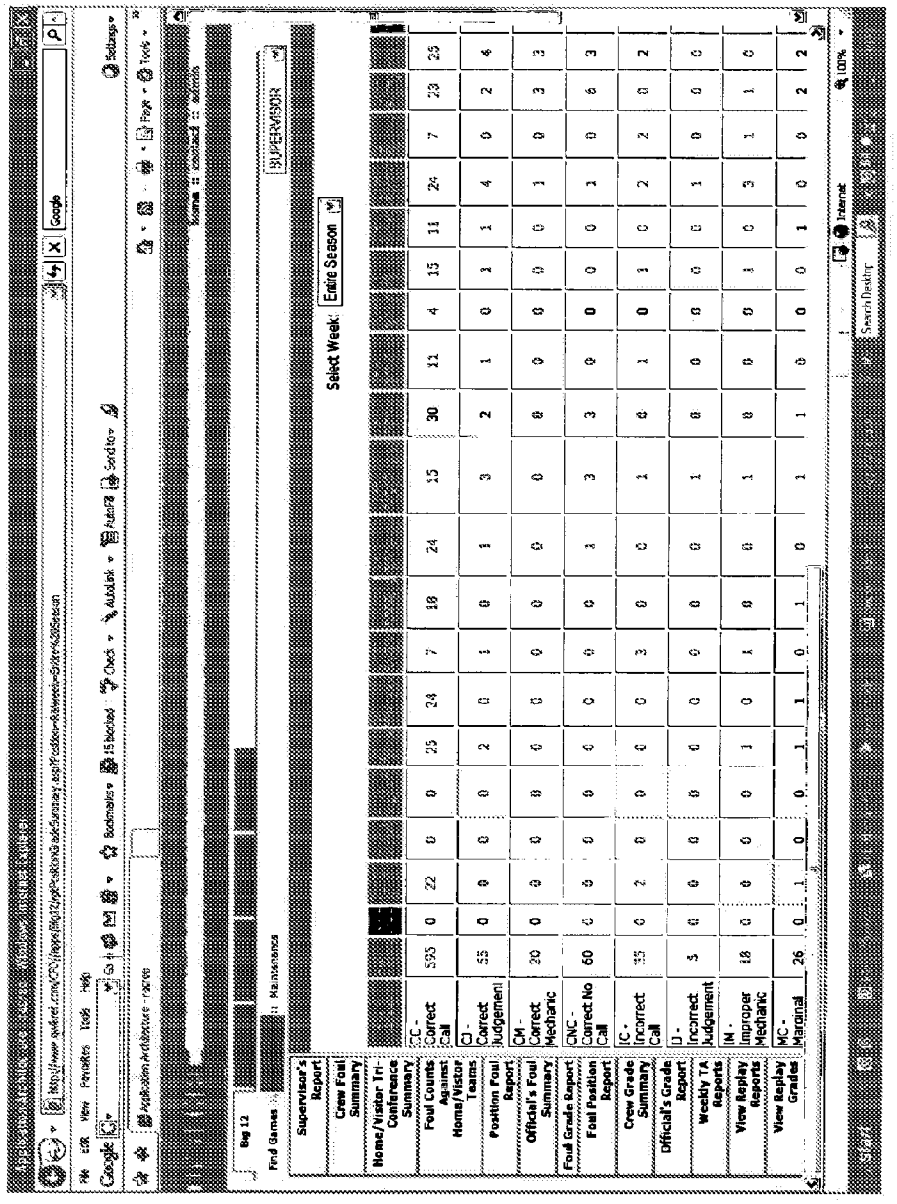
FIG. 27 is a screen shot of a supervisor permission, view reports, crew grade summary, referee report display that provides details on the grades for each referee over the year, in accordance with an embodiment of the present invention.
Figure 28:
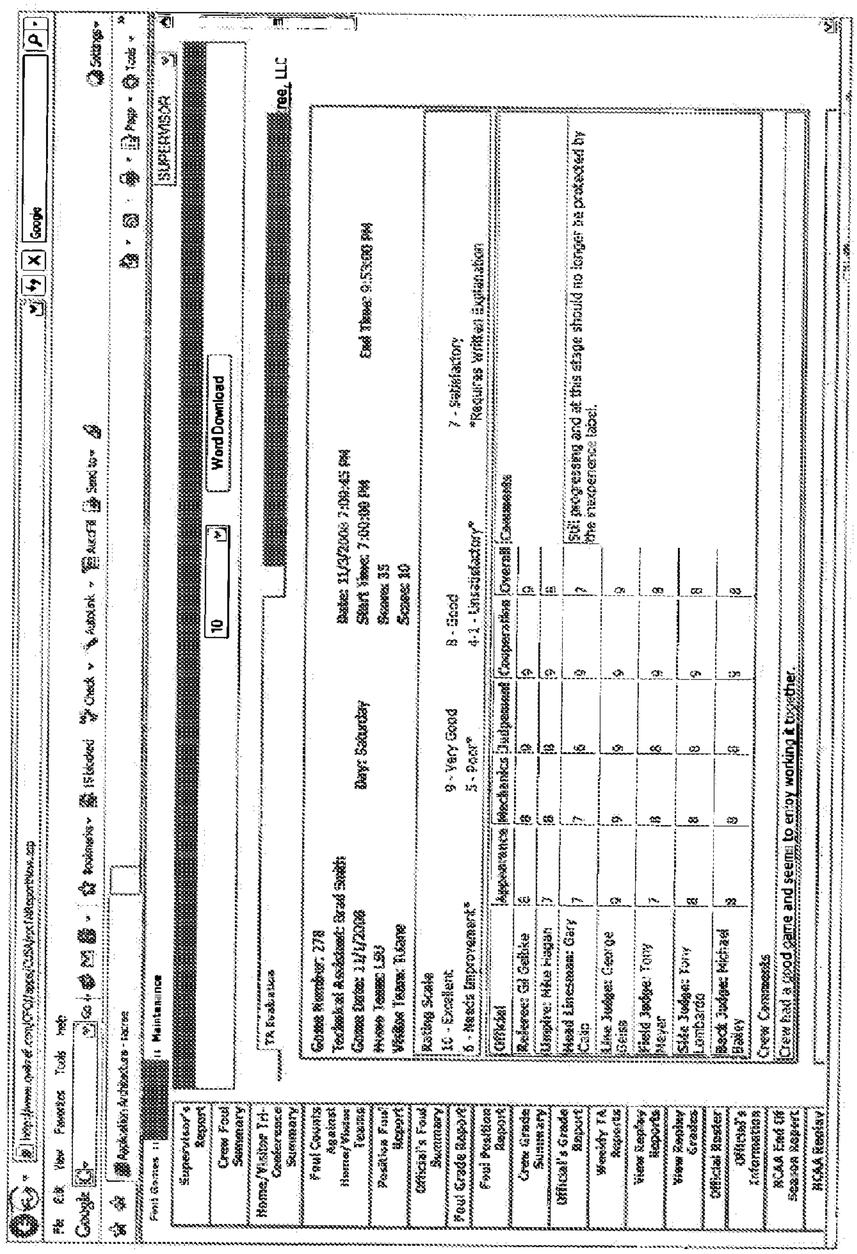
FIG. 28 is a screen shot of a supervisor permission, view reports, weekly TA report display that provides the technical assistant's evaluation of each member of the crew of officials for a specific game, in accordance with an embodiment of the present invention.
Figure 29:
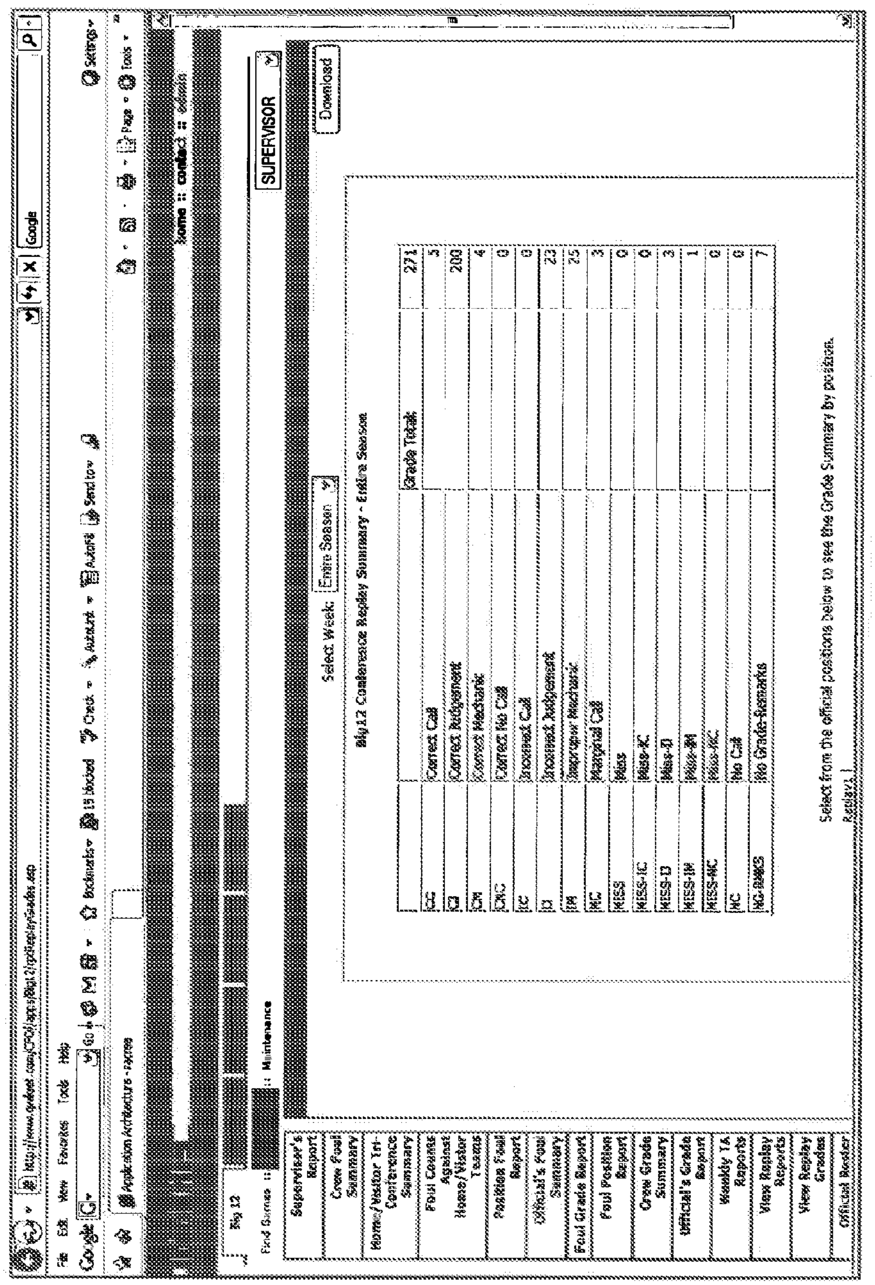
FIG. 29 is a screen shot of a supervisor permission, view reports, view replay grades summary display that provides a conference replay summary for the entire season, in accordance with an embodiment of the present invention.
Figure 30:
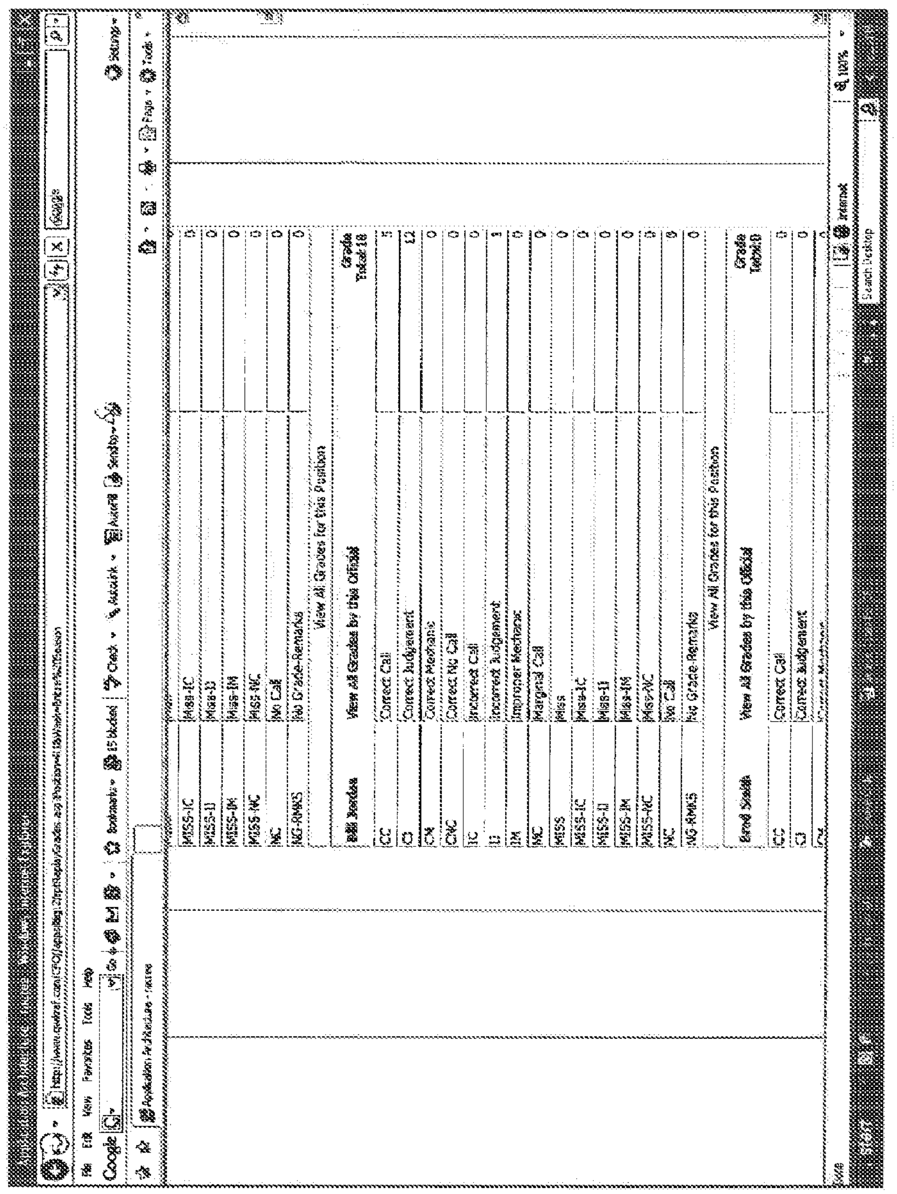
FIG. 30 is a screen shot of a supervisor permission, view reports, view replay grades, replay 1 display that provides a replay summary by individual official for the entire season, in accordance with an embodiment of the present invention.
Figure 31:
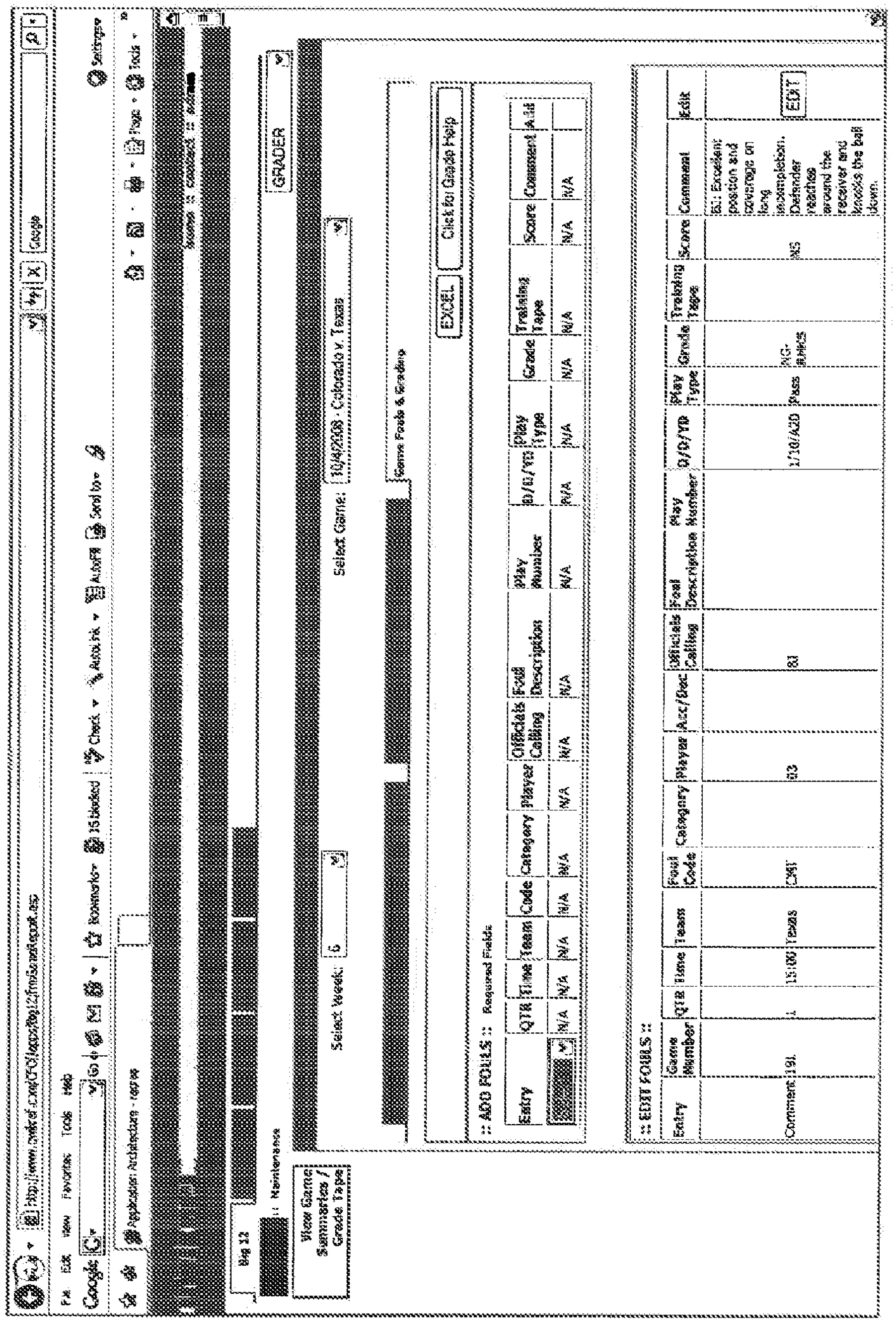
FIG. 31 is a screen shot of a grader permission, find games, view game summaries/grade tape display that permits the grader to grade each call by official, in accordance with an embodiment of the present invention.
Figure 32:
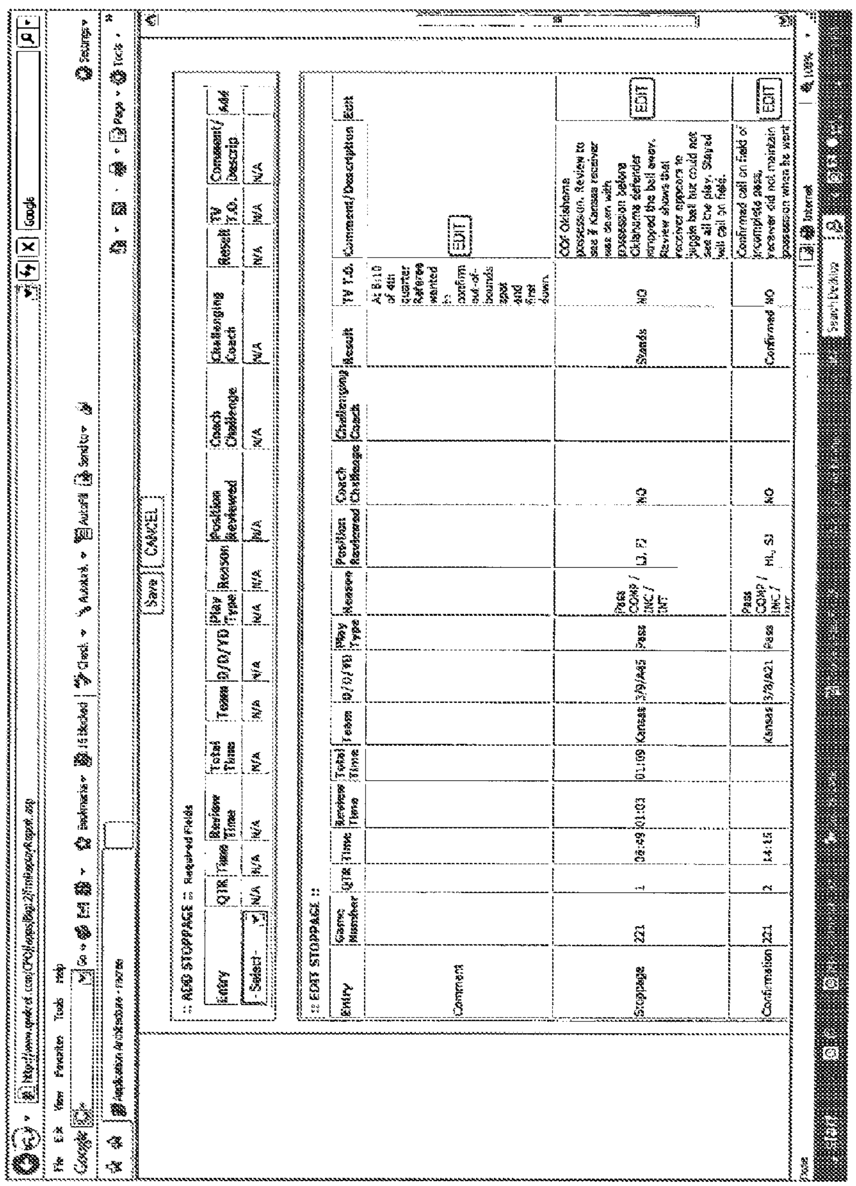
FIG. 32 is a screen shot of a replay permission, find games, submit replay report display that permits the user to add comments on the replay call, in accordance with an embodiment of the present invention.
Figure 33:
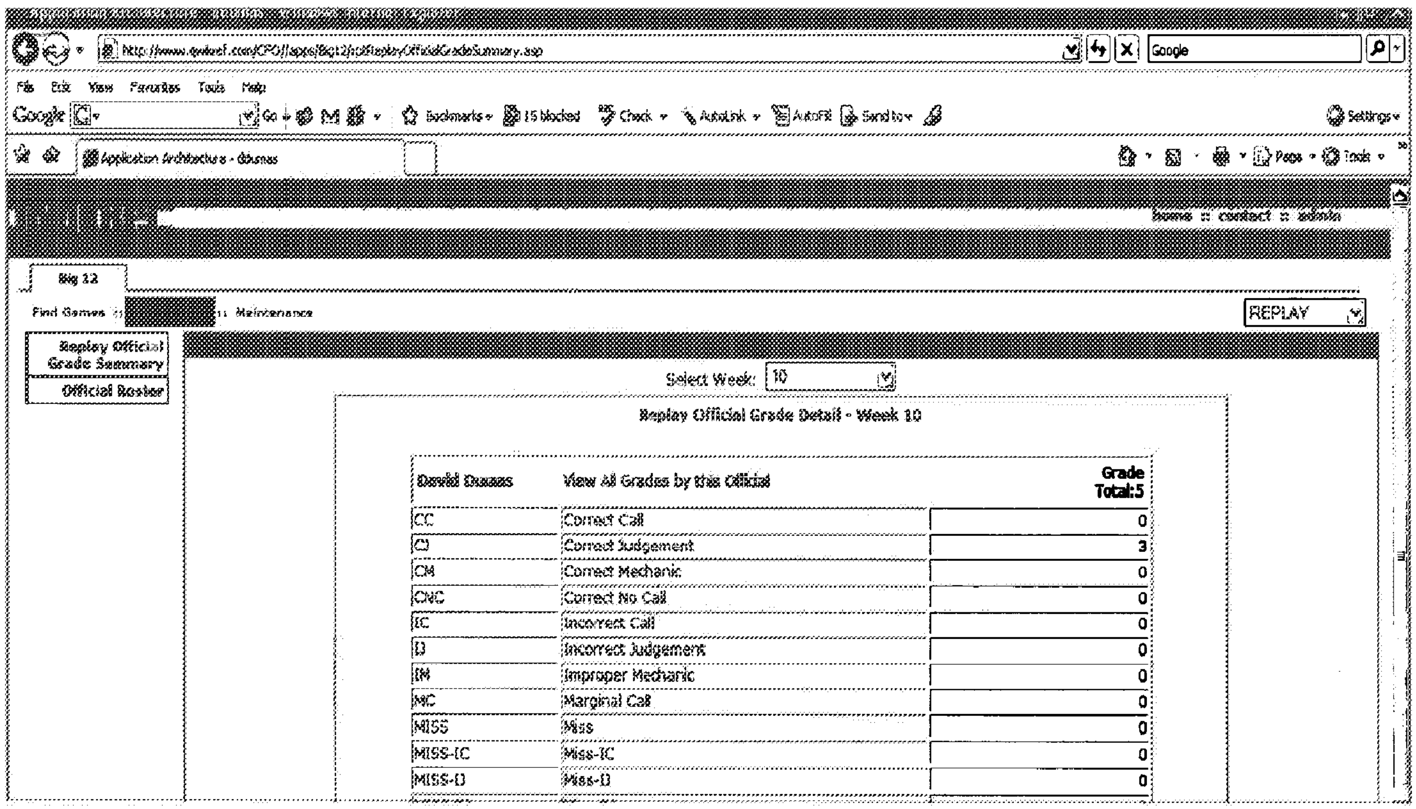
FIG. 33 is a screen shot of a replay permission, view reports, replay official grade summary display that shows the grades given to the replay official for a given week's game, in accordance with an embodiment of the present invention.
Figure 34:
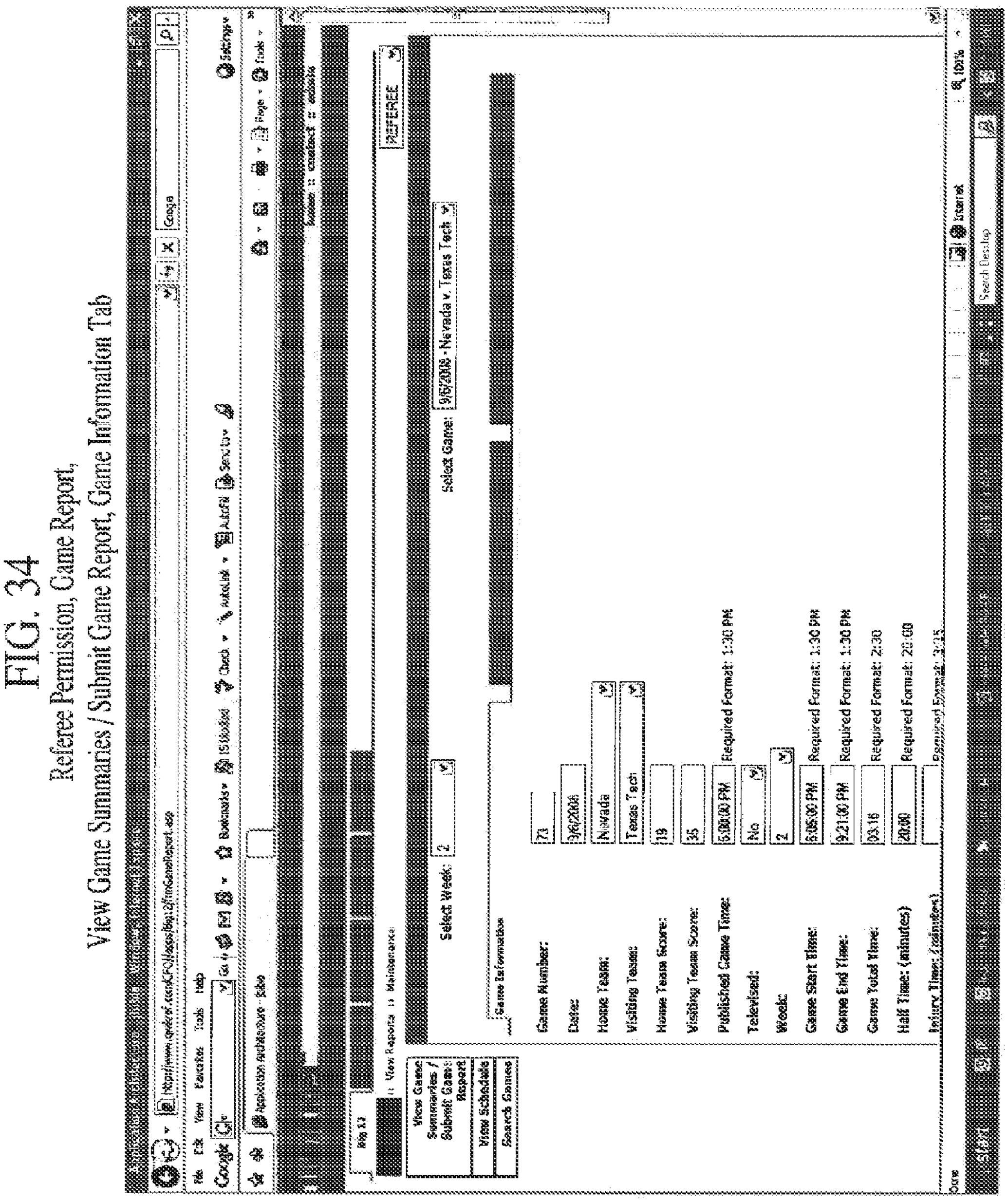
FIG. 34 is a screen shot of a referee permission, game report, view game summaries/submit game report, game information tab display, in accordance with an embodiment of the present invention.
Figure 35:
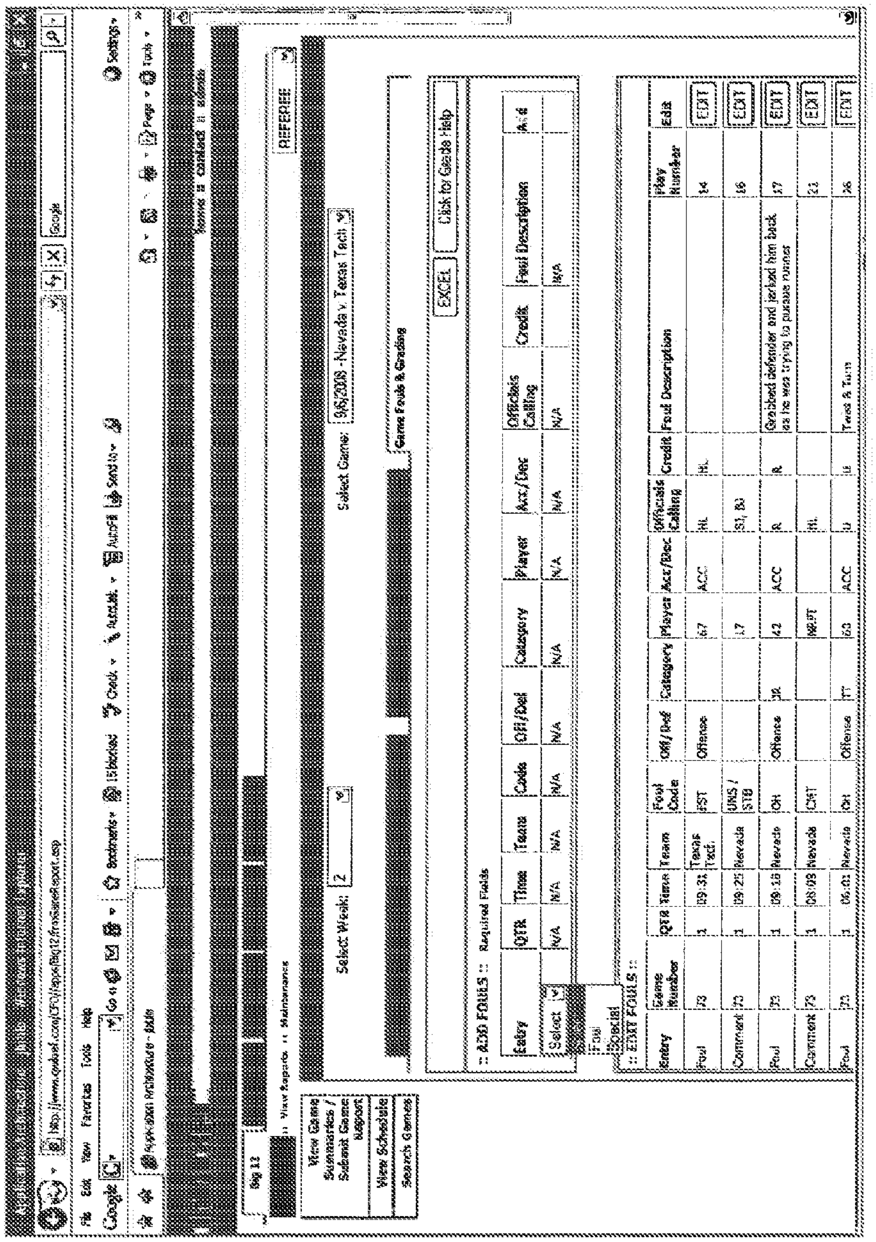
FIG. 35 is a screen shot of a referee permission, game report, view game summaries/submit game report, game foul summary tab display, in accordance with an embodiment of the present invention.
Figure 36:
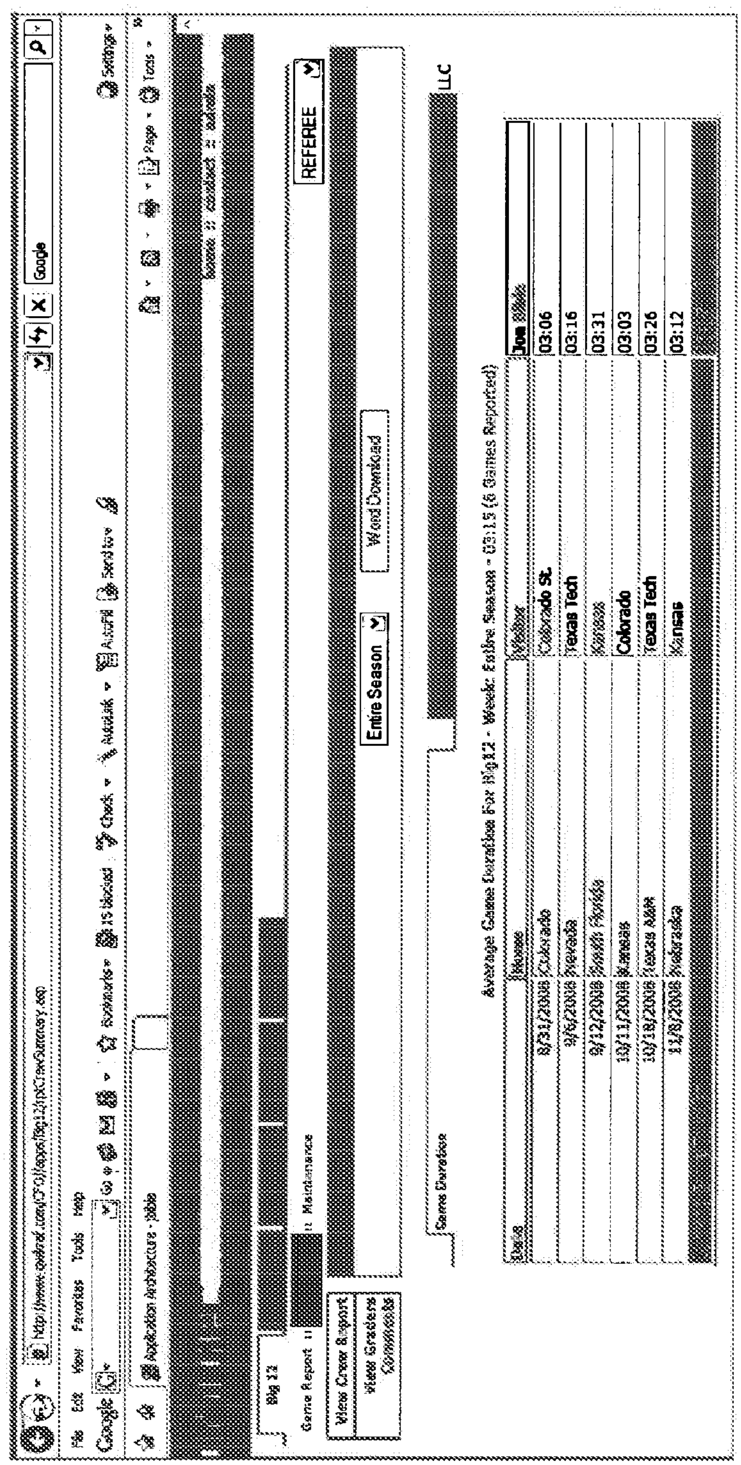
FIG. 36 is a screen shot of a referee permission, view reports, view crew report, crew foul summary tab display, in accordance with an embodiment of the present invention.
Figure 37:
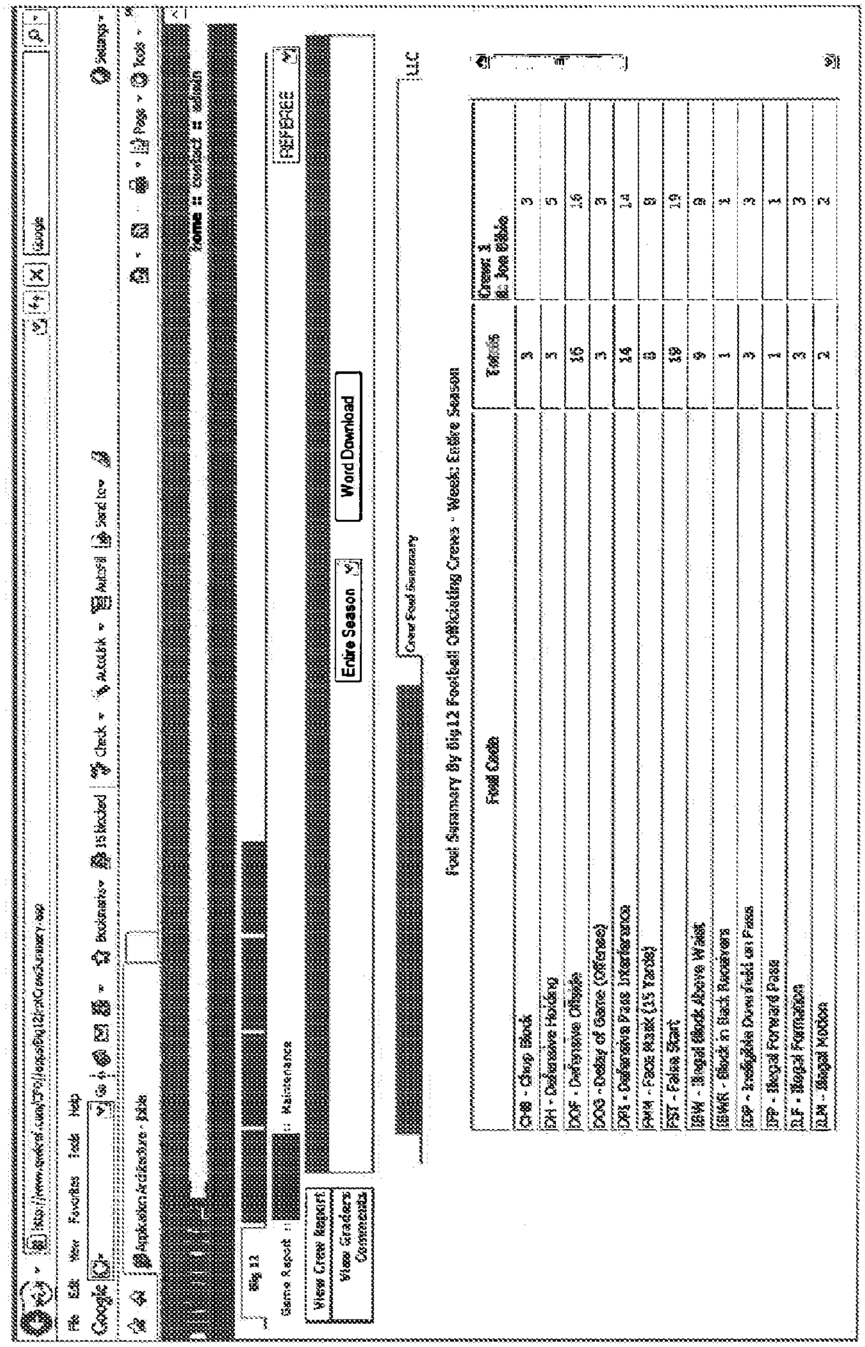
FIG. 37 is a screen shot of a referee permission, view reports, view crew report, crew foul summary tab display, in accordance with an embodiment of the present invention.
Figure 38:
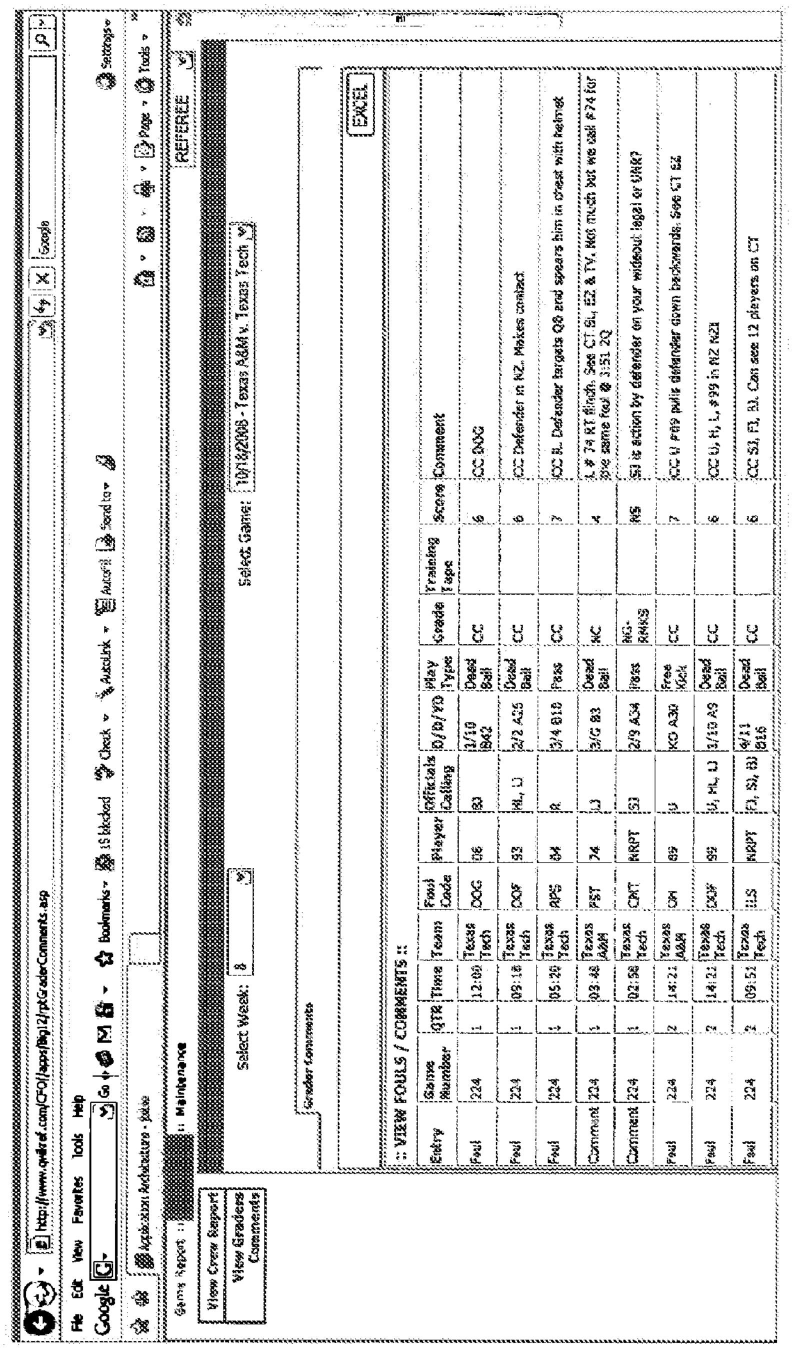
FIG. 38 is a screen shot of a referee permission, view reports, view graders comments display, in accordance with an embodiment of the present invention.
Figure 39:
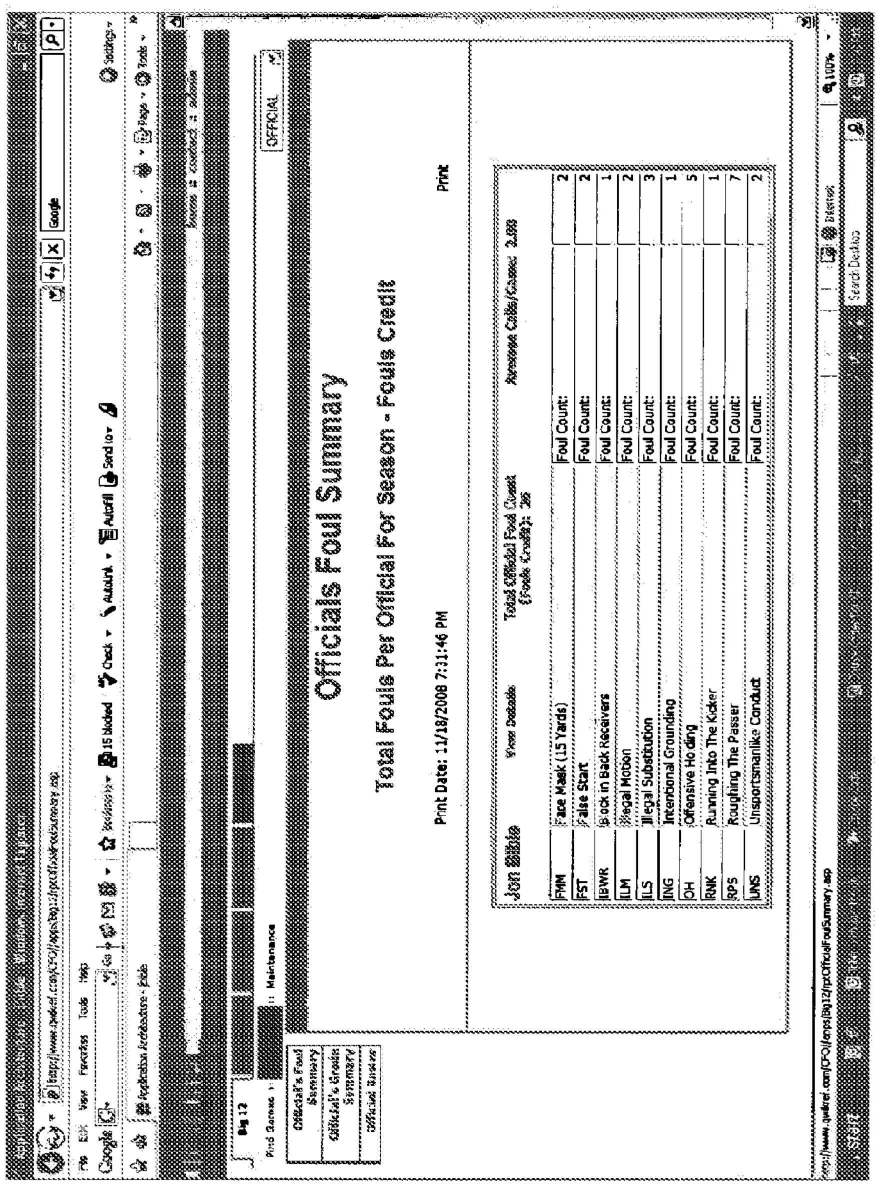
FIG. 39 is a screen shot of an officials permission, view reports, officials foul summary display, in accordance with an embodiment of the present invention.
Figure 40:
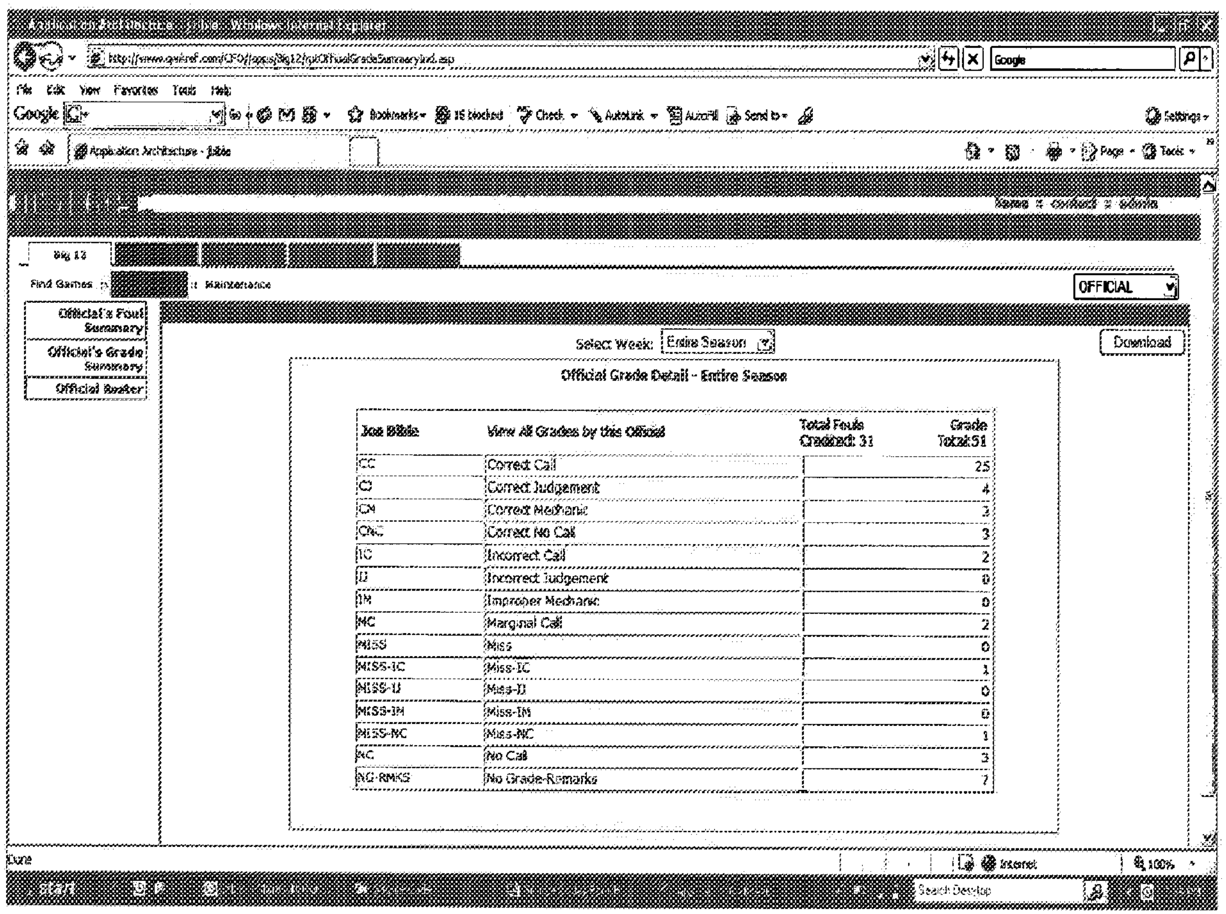
FIG. 40 is a screen shot of an officials permission, view reports, officials grade summary display, in accordance with an embodiment of the present invention.
Figure 41:
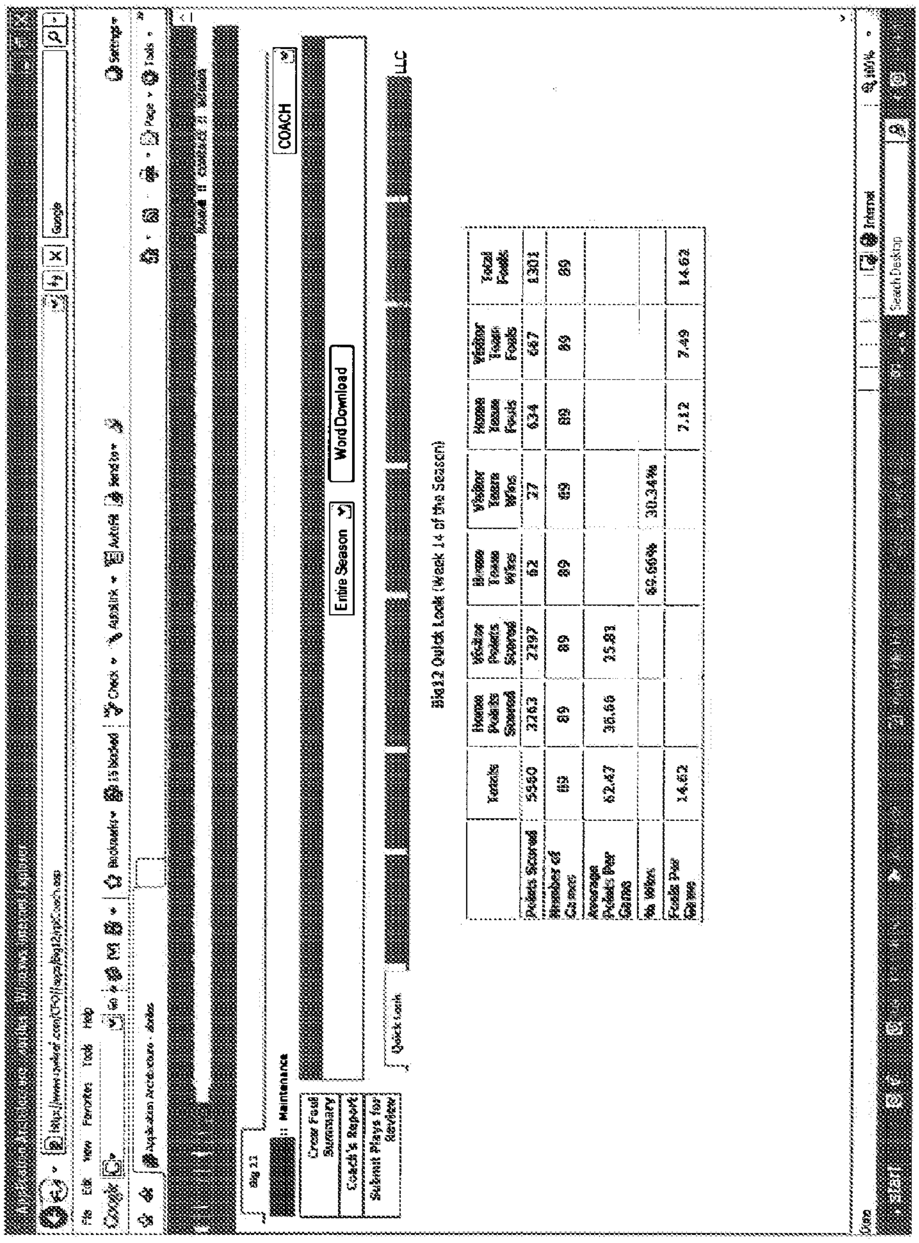
FIG. 41 is a screen shot of a coach permission, view reports, coach's report, quick look display, in accordance with an embodiment of the present invention.
Figure 42:
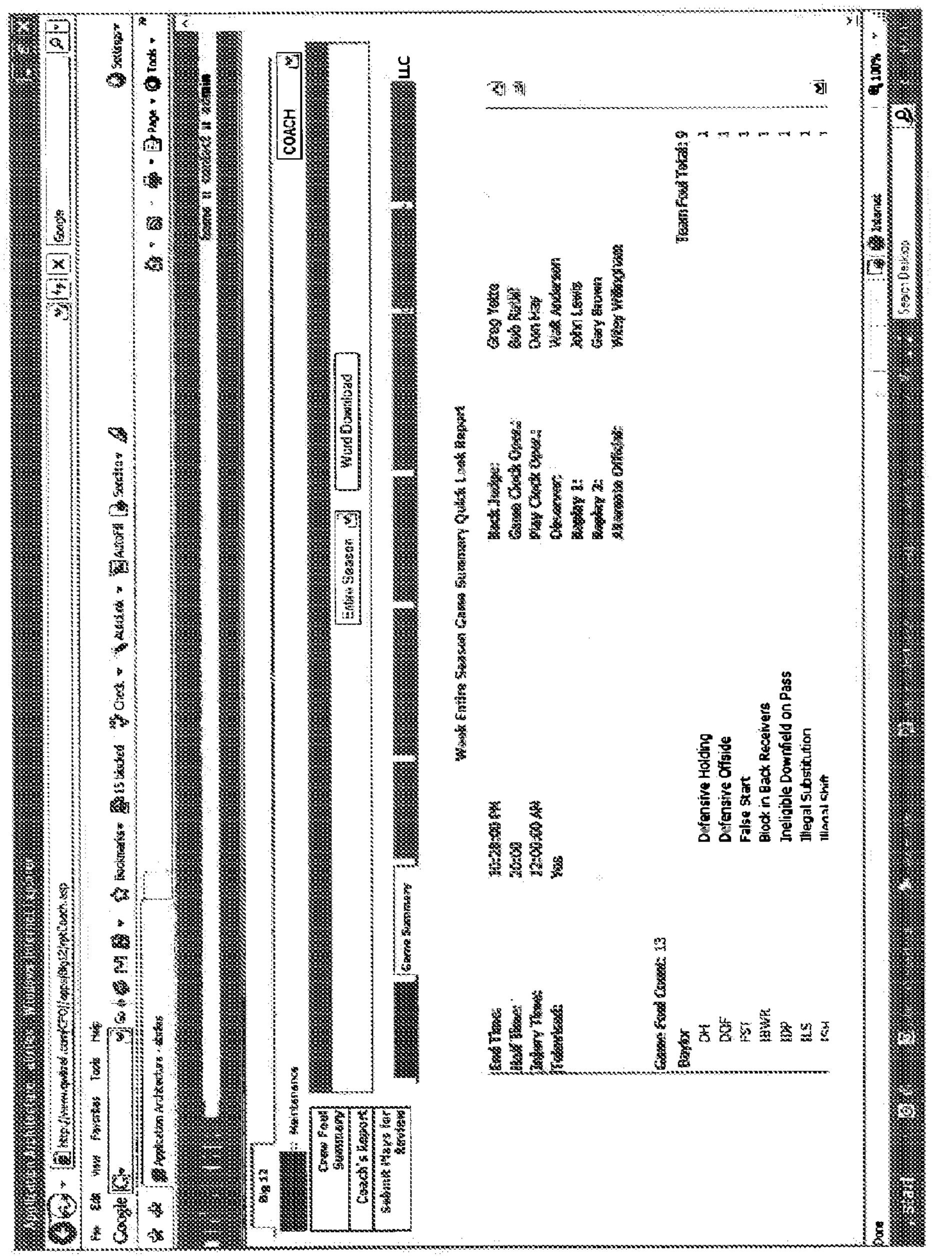
FIG. 42 is a screen shot of a coach permission, view reports, coach's report, game summary display, in accordance with an embodiment of the present invention.
Figure 43:
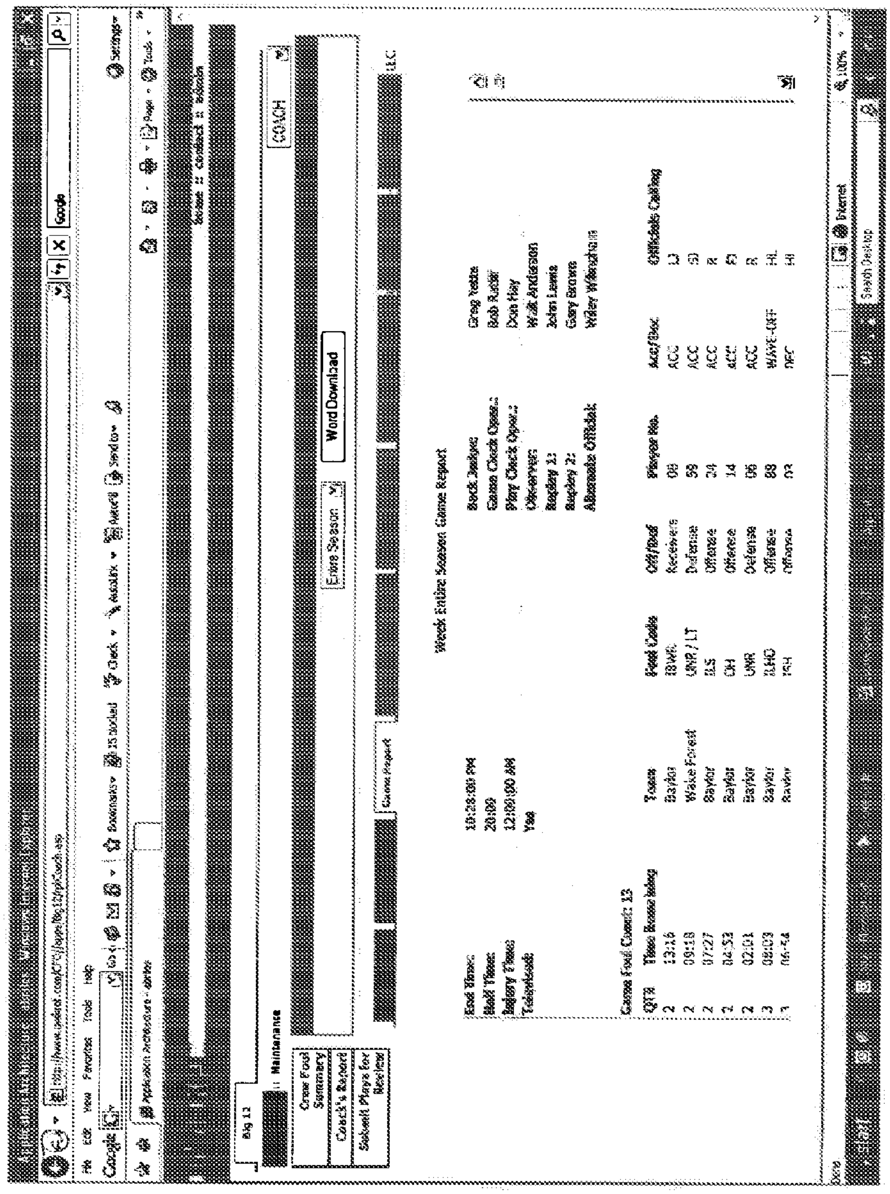
FIG. 43 is a screen shot of a coach permission, view reports, coach's report, game report, in accordance with an embodiment of the present invention.
Figure 44:
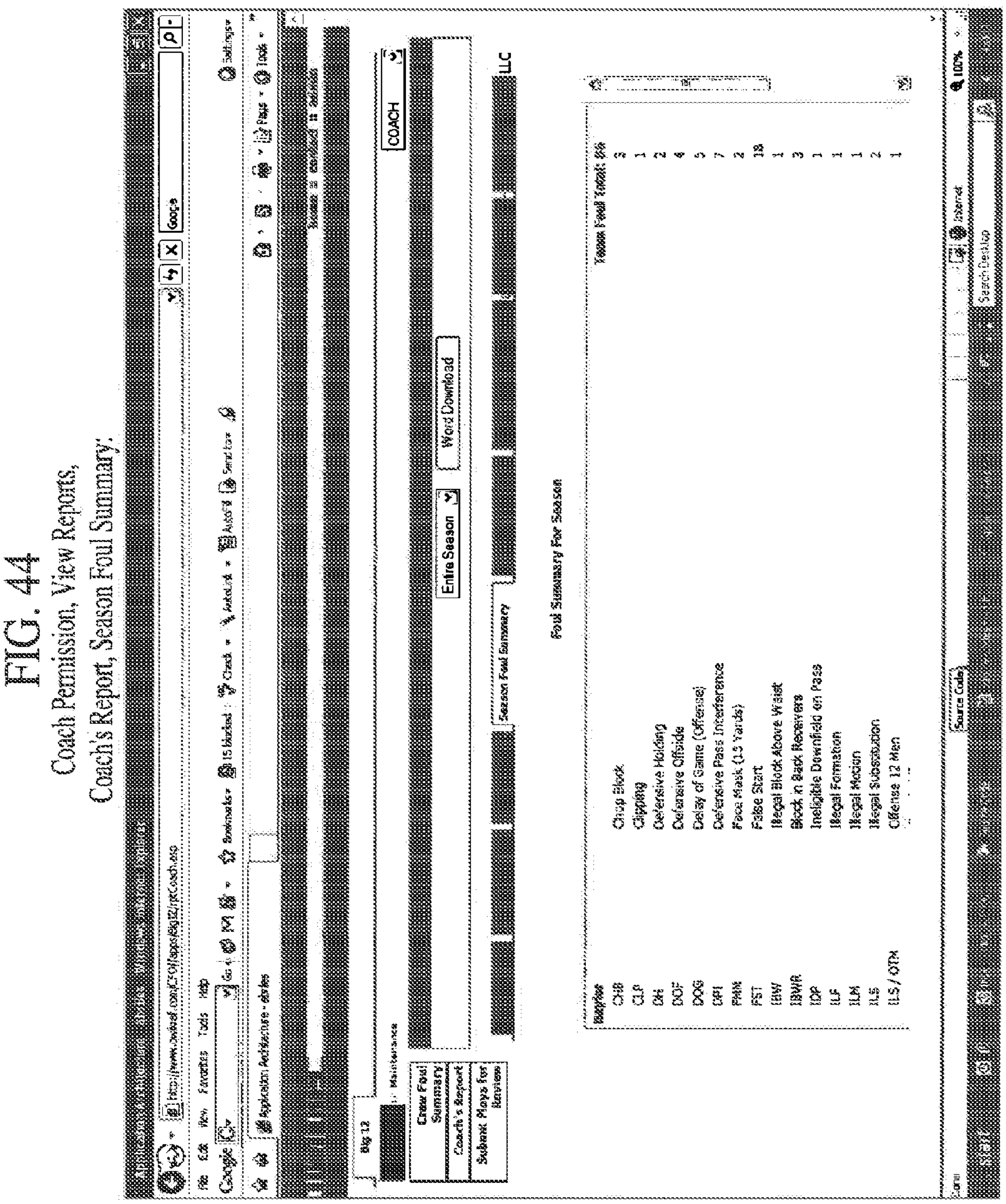
FIG. 44 is a screen shot of a coach permission, view reports, coach's report, season foul summary display, in accordance with an embodiment of the present invention.
Figure 45:
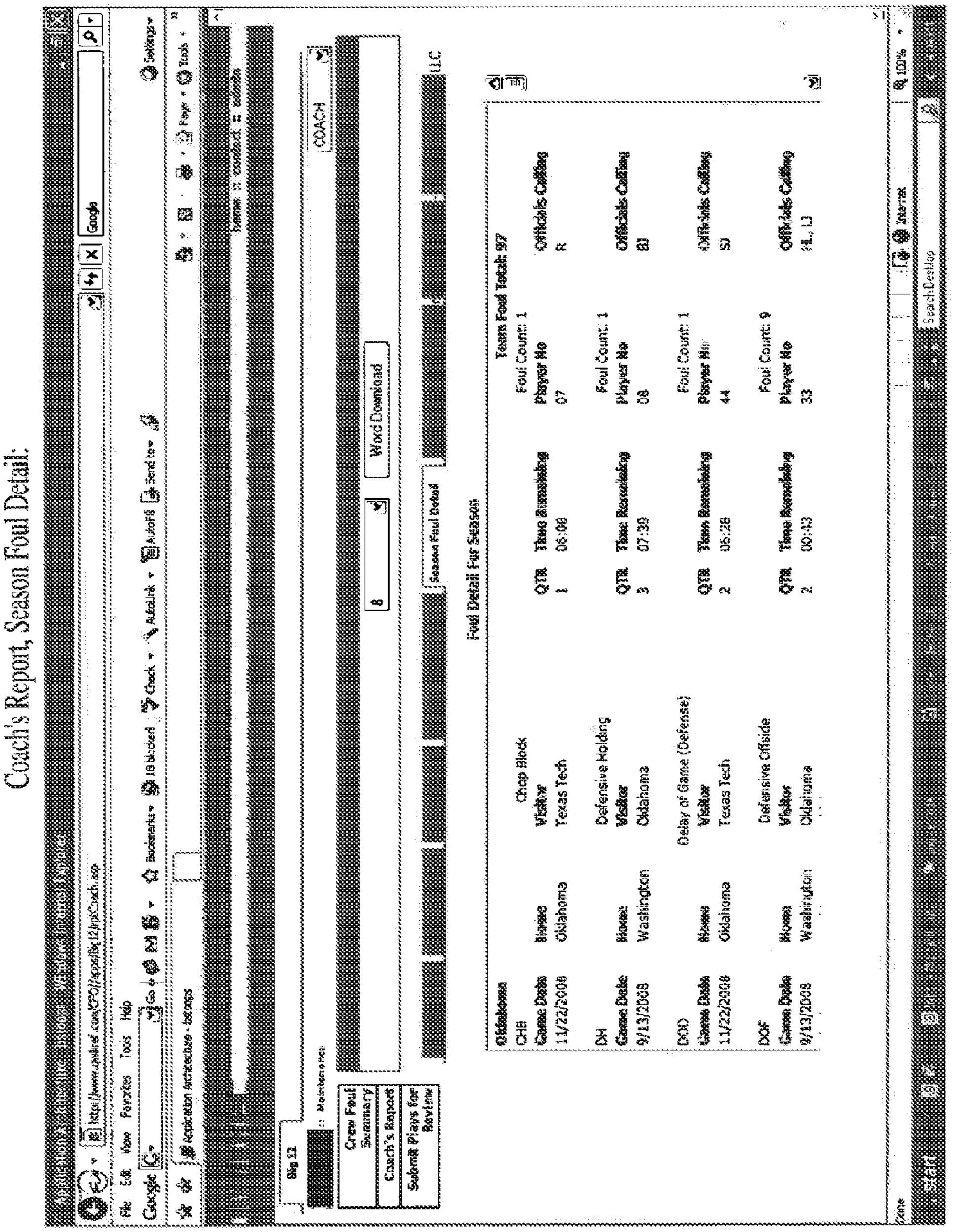
FIG. 45 is a screen shot of a coach permission, view reports, coach's report, season foul detail display, in accordance with an embodiment of the present invention.
Figure 46:
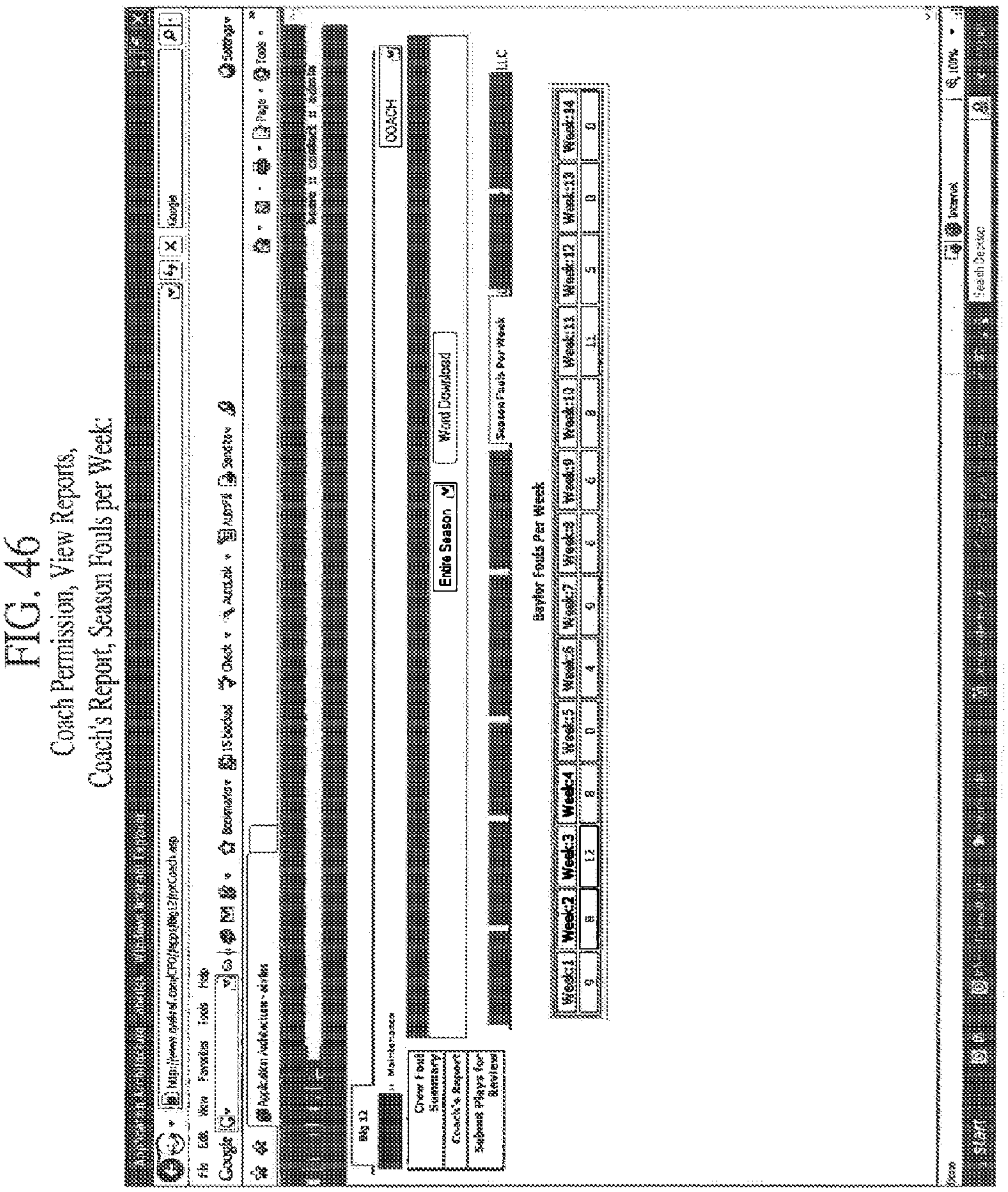
FIG. 46 is a screen shot of a coach permission, view reports, coach's report, season fouls per week display, in accordance with an embodiment of the present invention.
Figure 47:
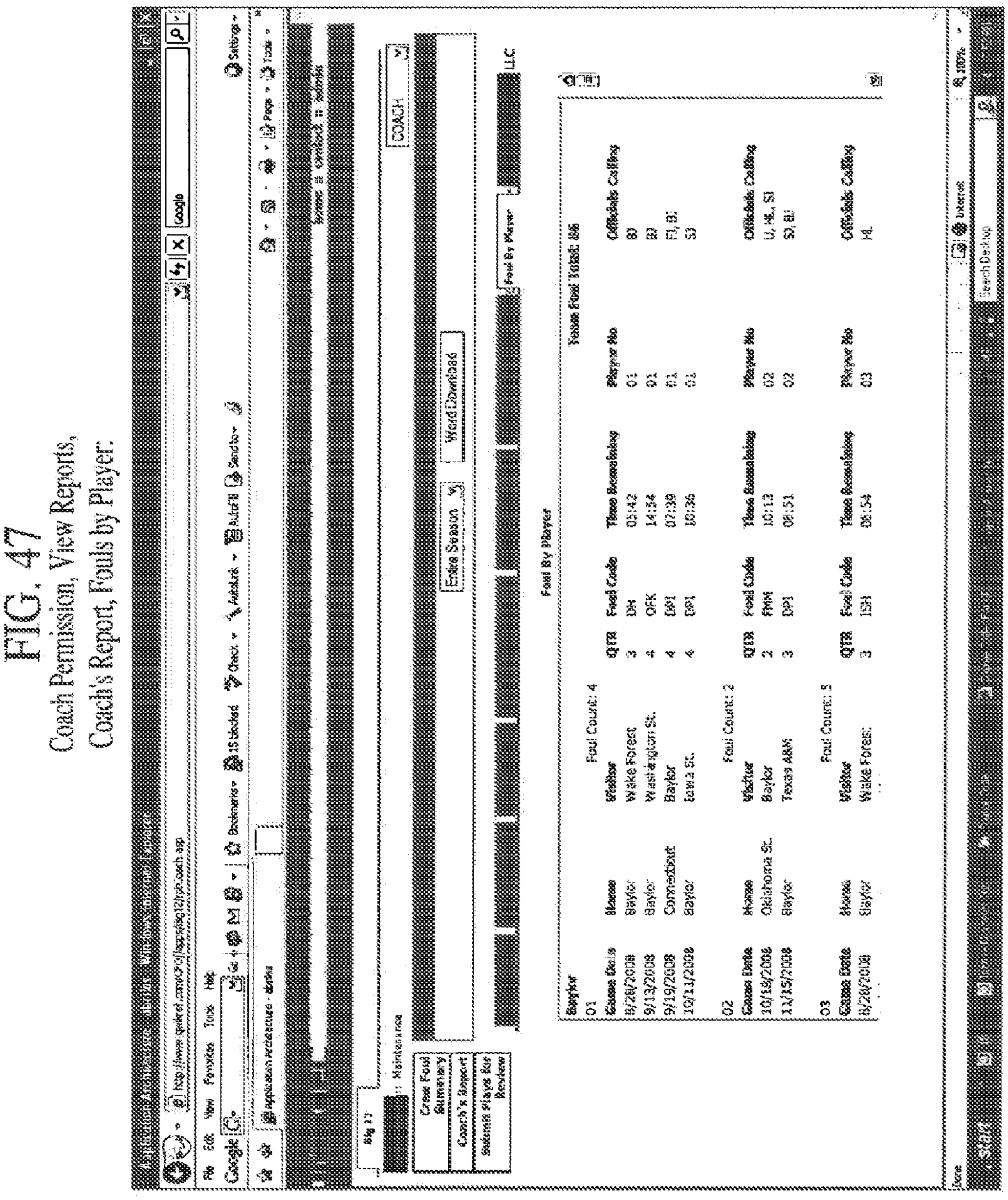
FIG. 47 is a screen shot of a coach permission, view reports, coach's report, fouls by player display, in accordance with an embodiment of the present invention.
Figure 48:
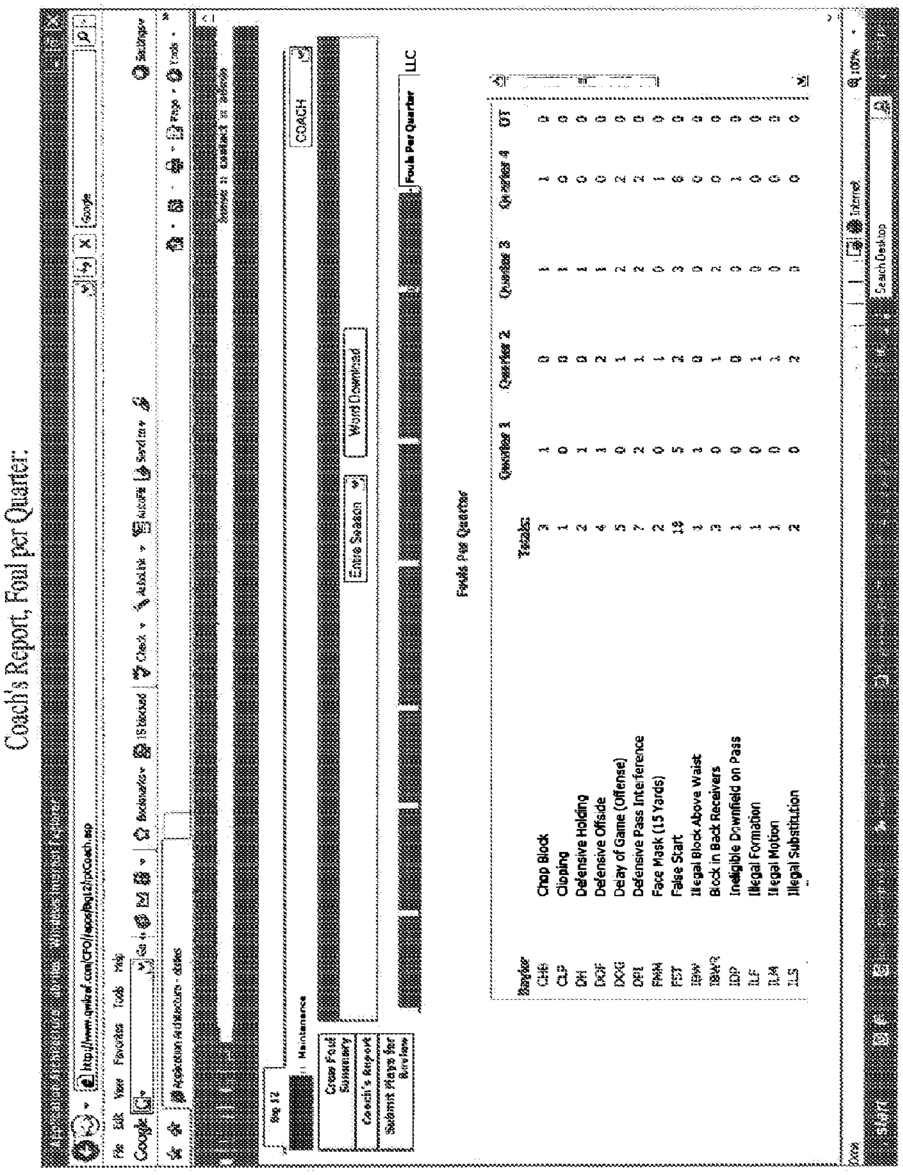
FIG. 48 is a screen shot of a coach permission, view reports, coach's report, fouls per quarter display, in accordance with an embodiment of the present invention.
Figure 49:
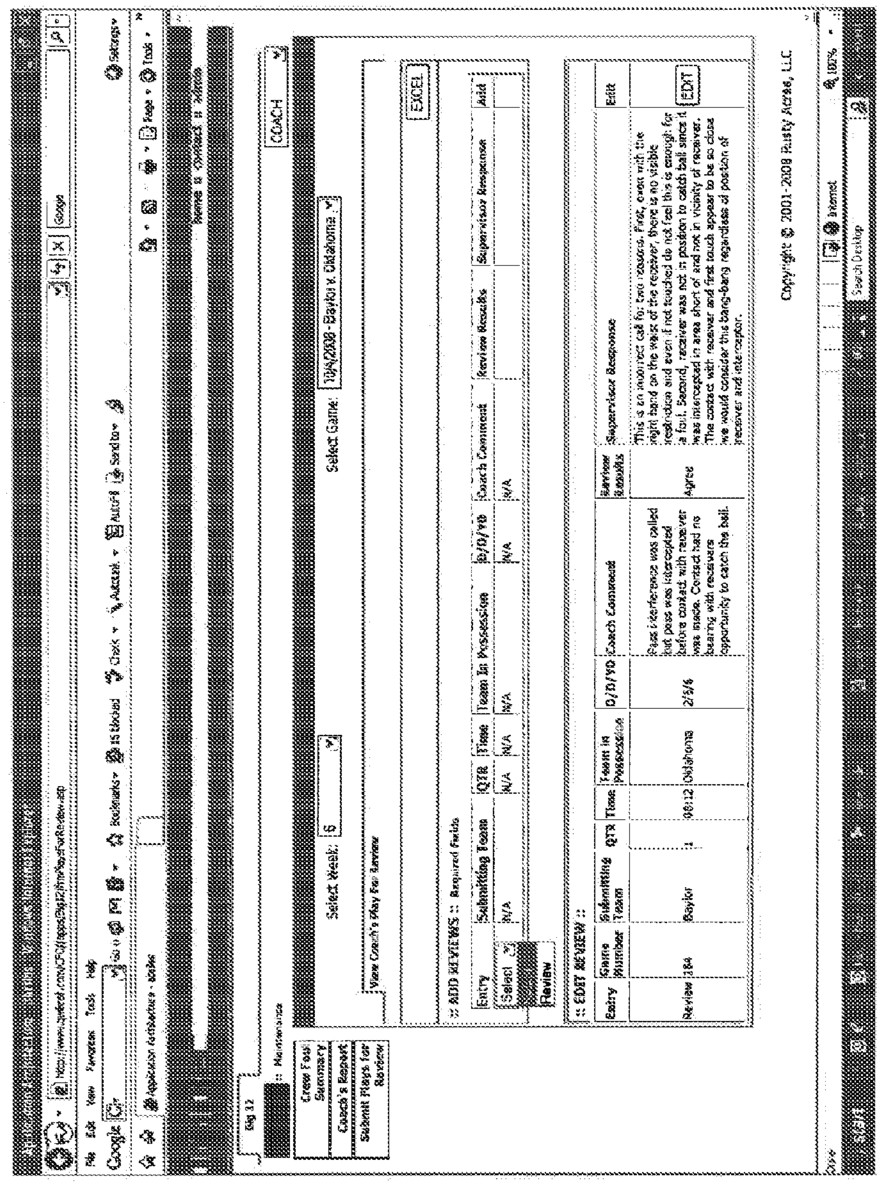
FIG. 49 is a screen shot of a coach permission, view reports, submit plays for review display, in accordance with an embodiment of the present invention.
Figure 50:
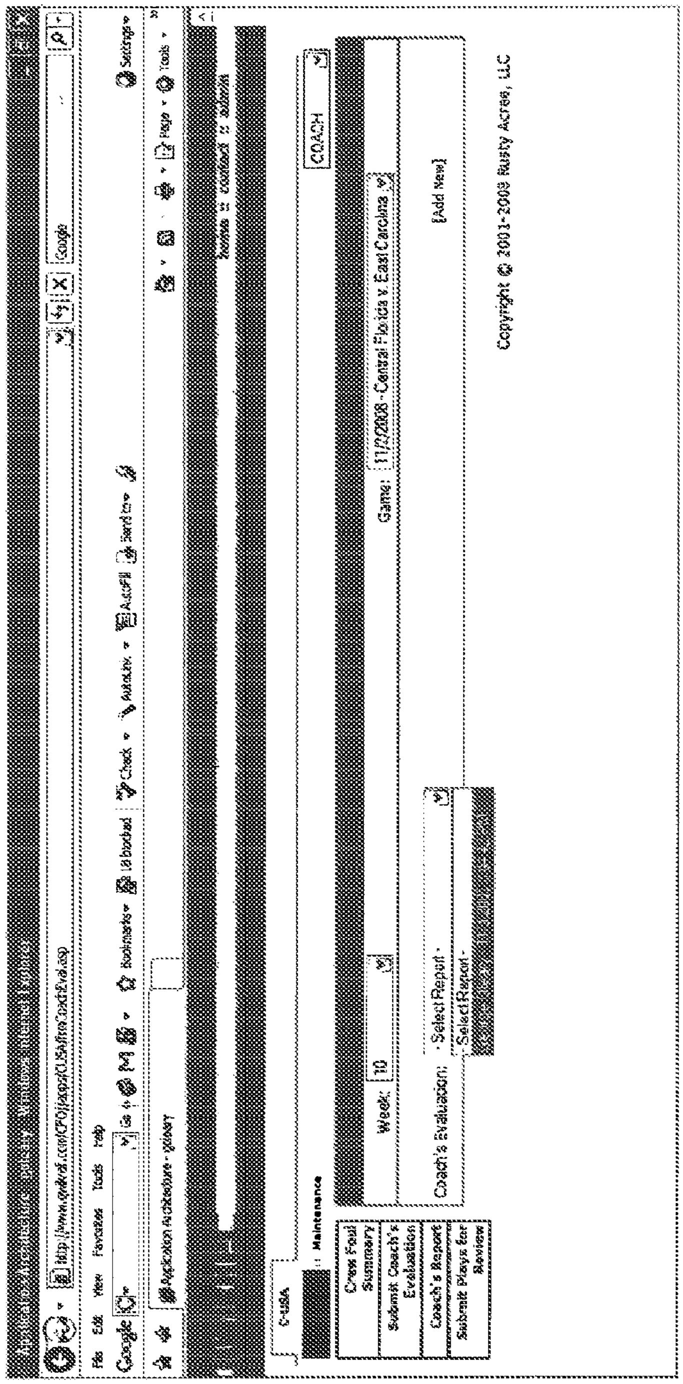
FIG. 50 is a screen shot of a coach permission, view reports, coach's report, submit officials evaluation display, in accordance with an embodiment of the present invention.
Figure 51:
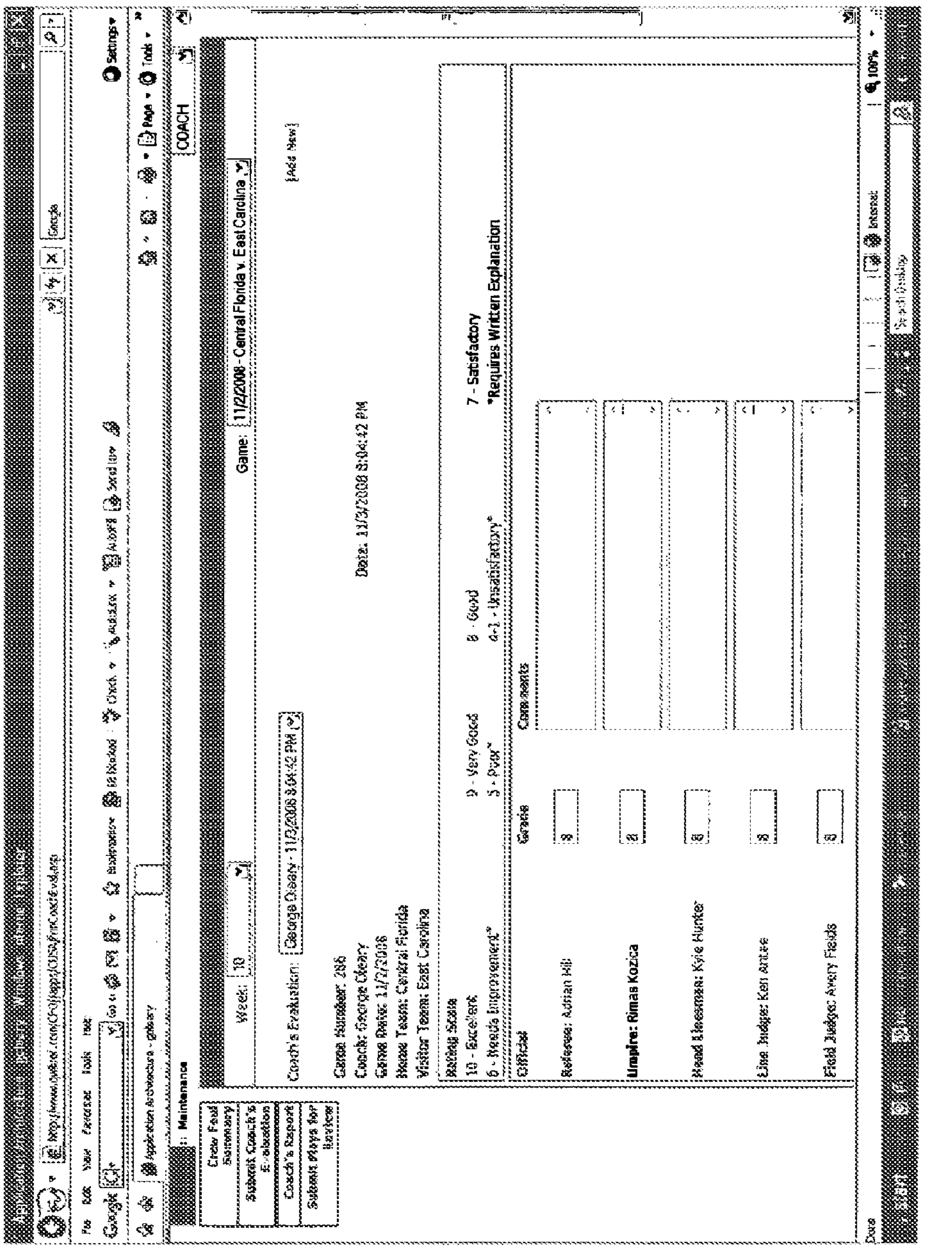
FIG. 51 is a screen shot of a coach permission, view reports, coach's report, submit officials evaluation display, in accordance with an embodiment of the present invention.
Figure 52:
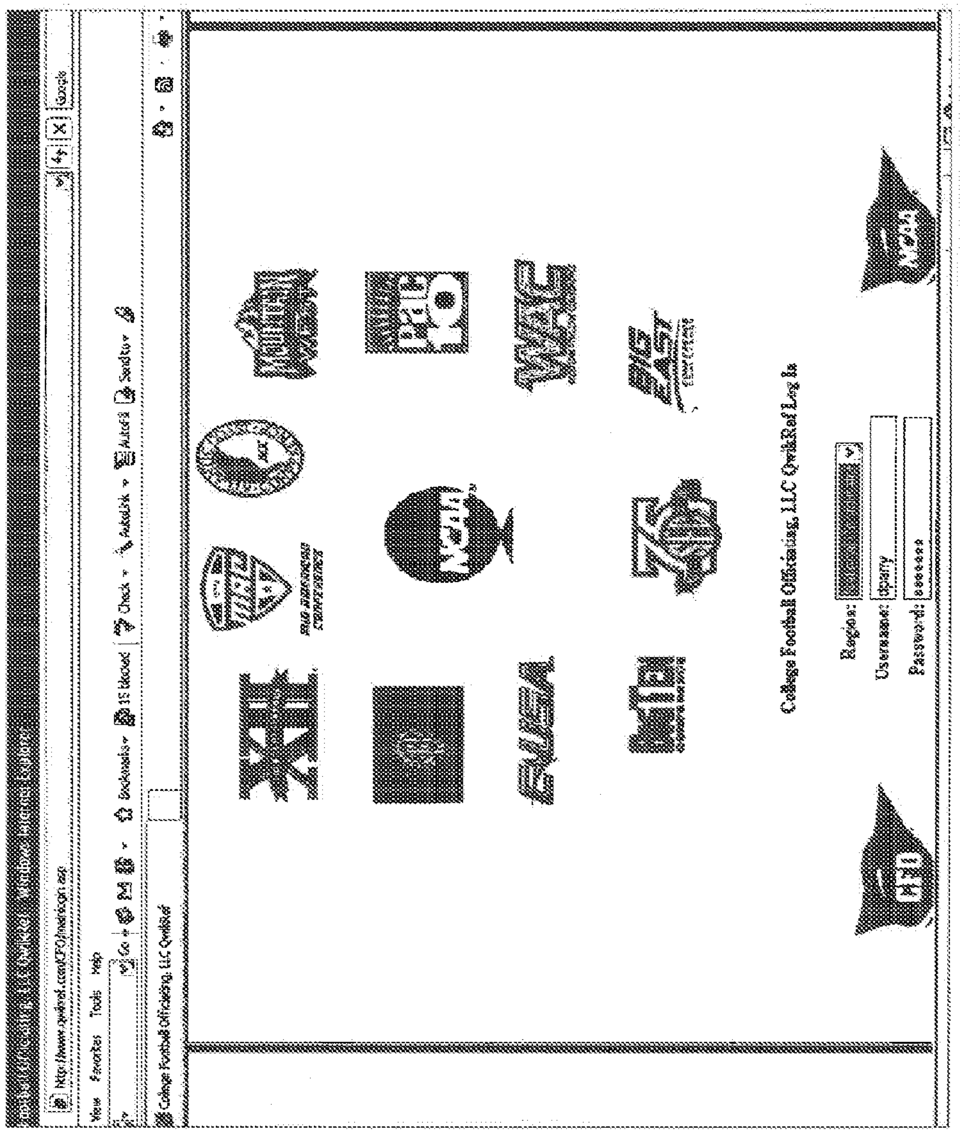
FIG. 52 is a screen shot of a login page for a national coordinator, in accordance with an embodiment of the present invention.
Figure 53:
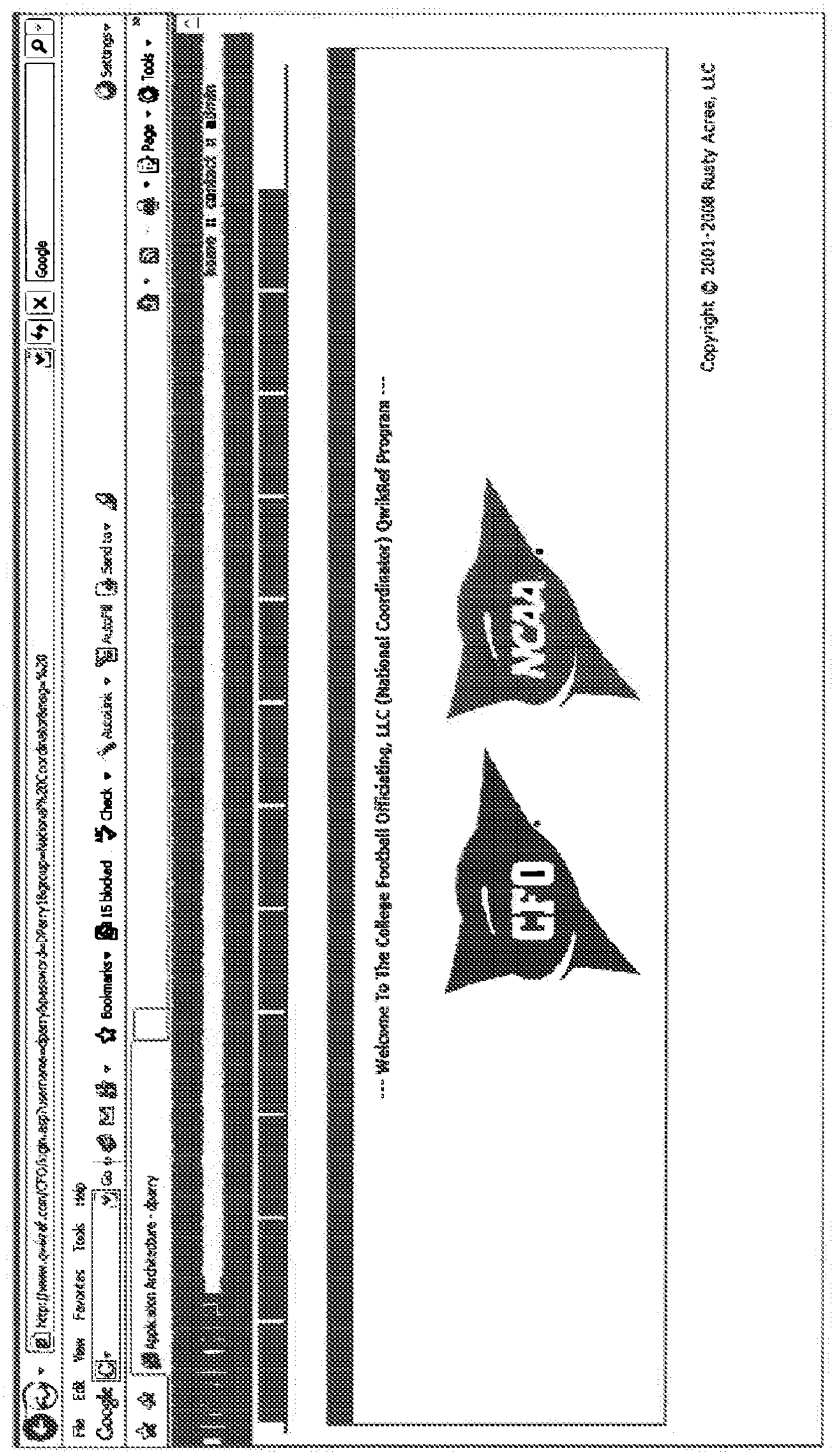
FIG. 53 is a screen shot of a national coordinator welcome screen, in accordance with an embodiment of the present invention.
Figure 54:
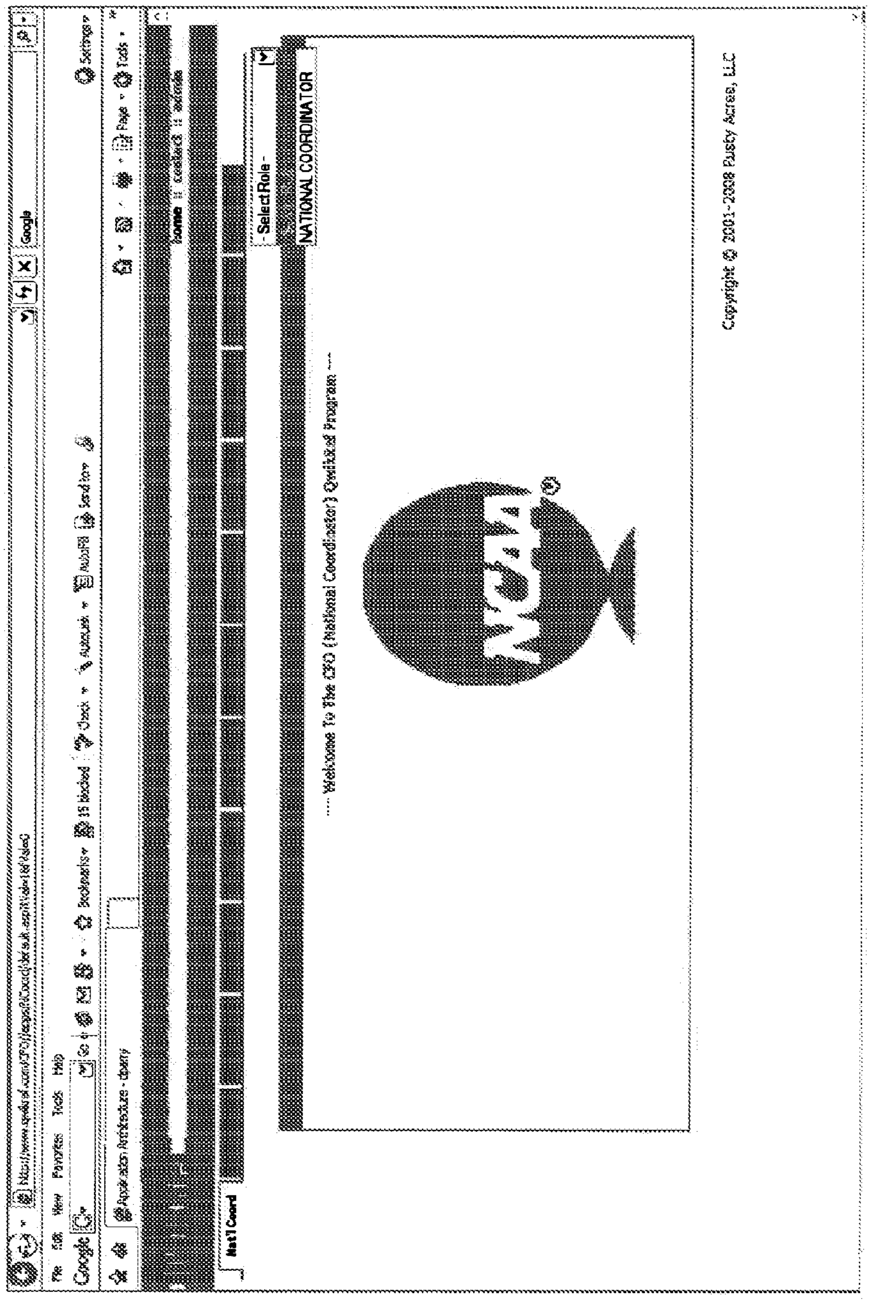
FIG. 54 is a screen shot of a national coordinator tab welcome page with national coordinator role highlighted, in accordance with an embodiment of the present invention.
Figure 55:
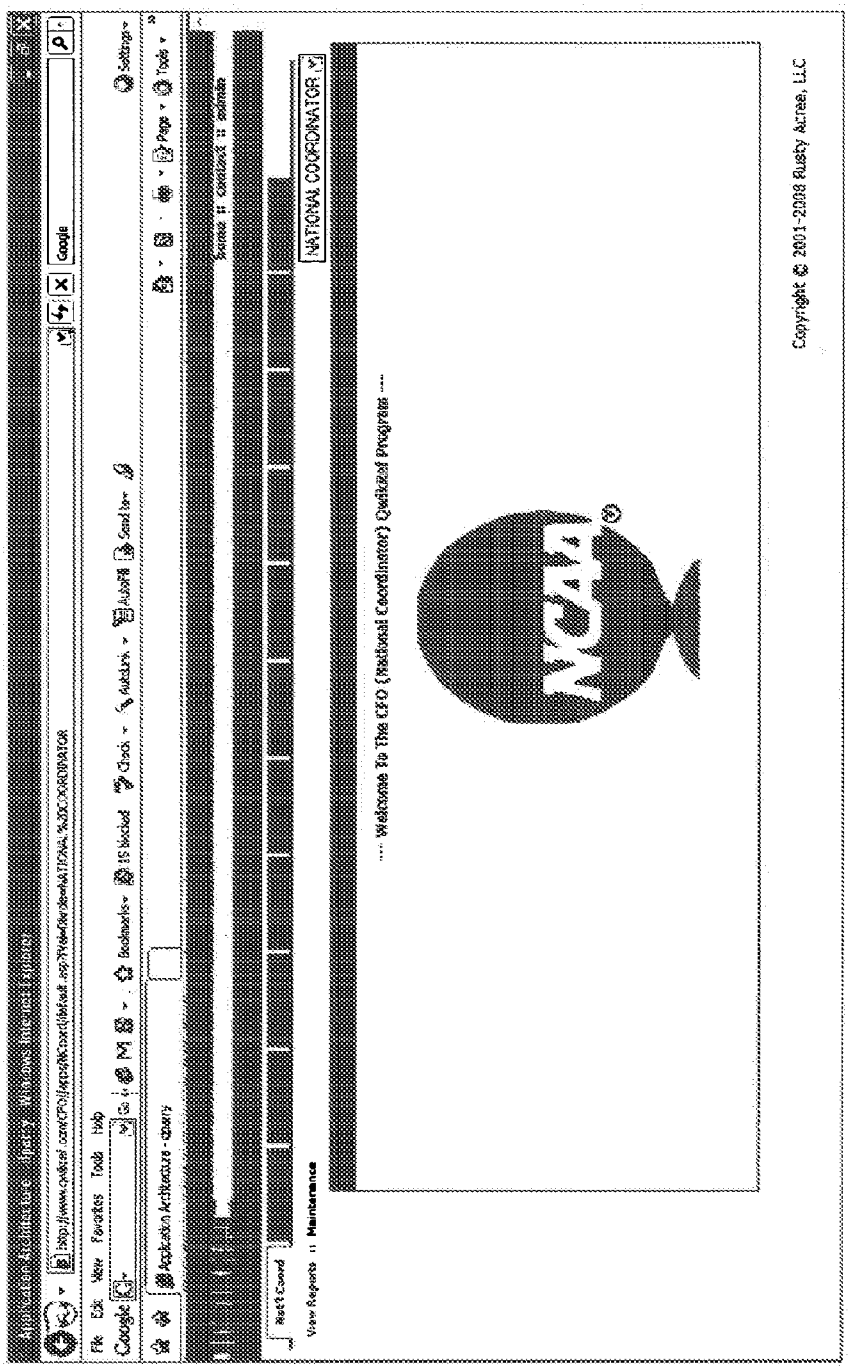
FIG. 55 is a screen shot of a national coordinator navigation page, in accordance with an embodiment of the present invention.
Figure 56:
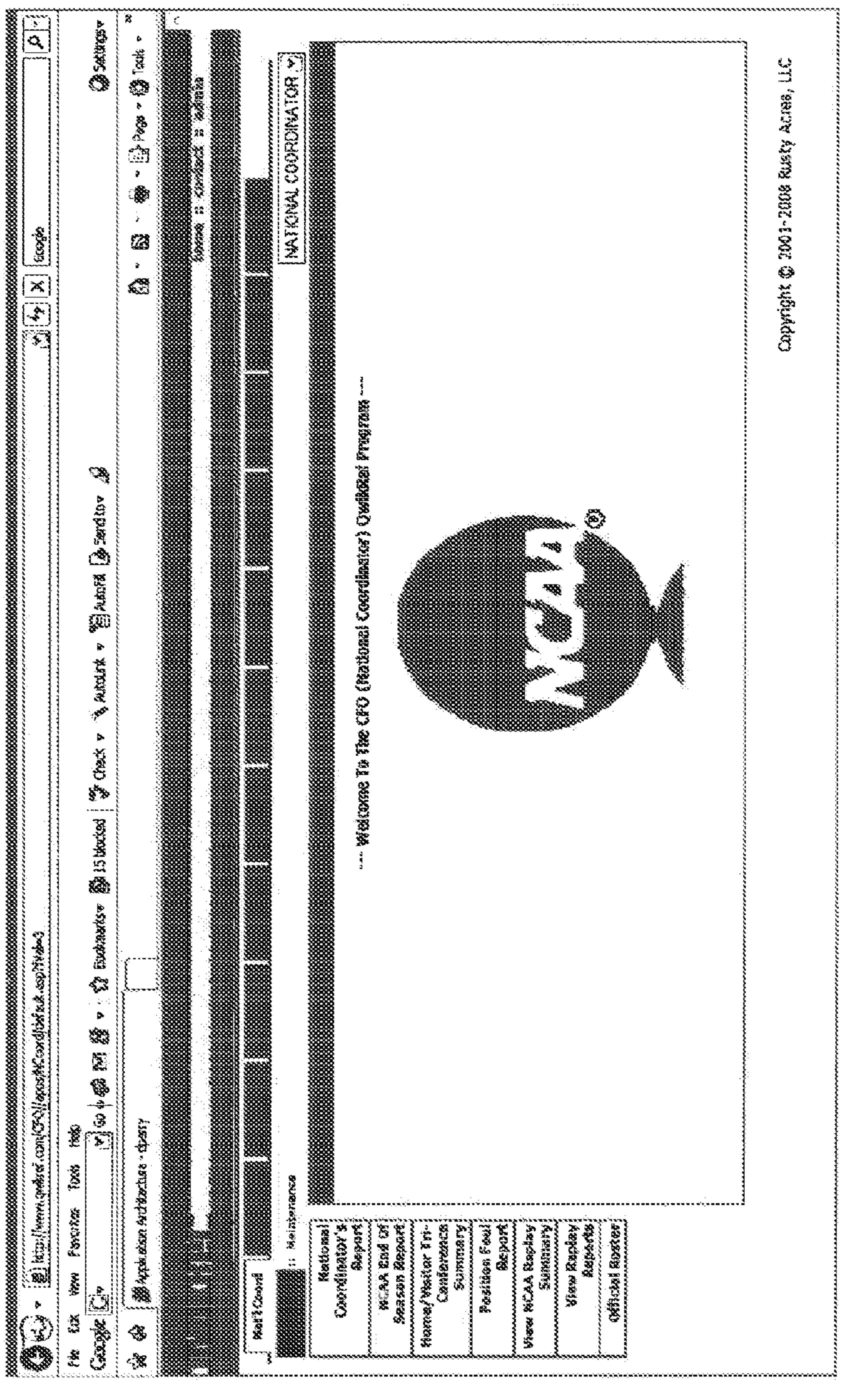
FIG. 56 is a screen shot of a national coordinator menu page, in accordance with an embodiment of the present invention.
Figure 57:
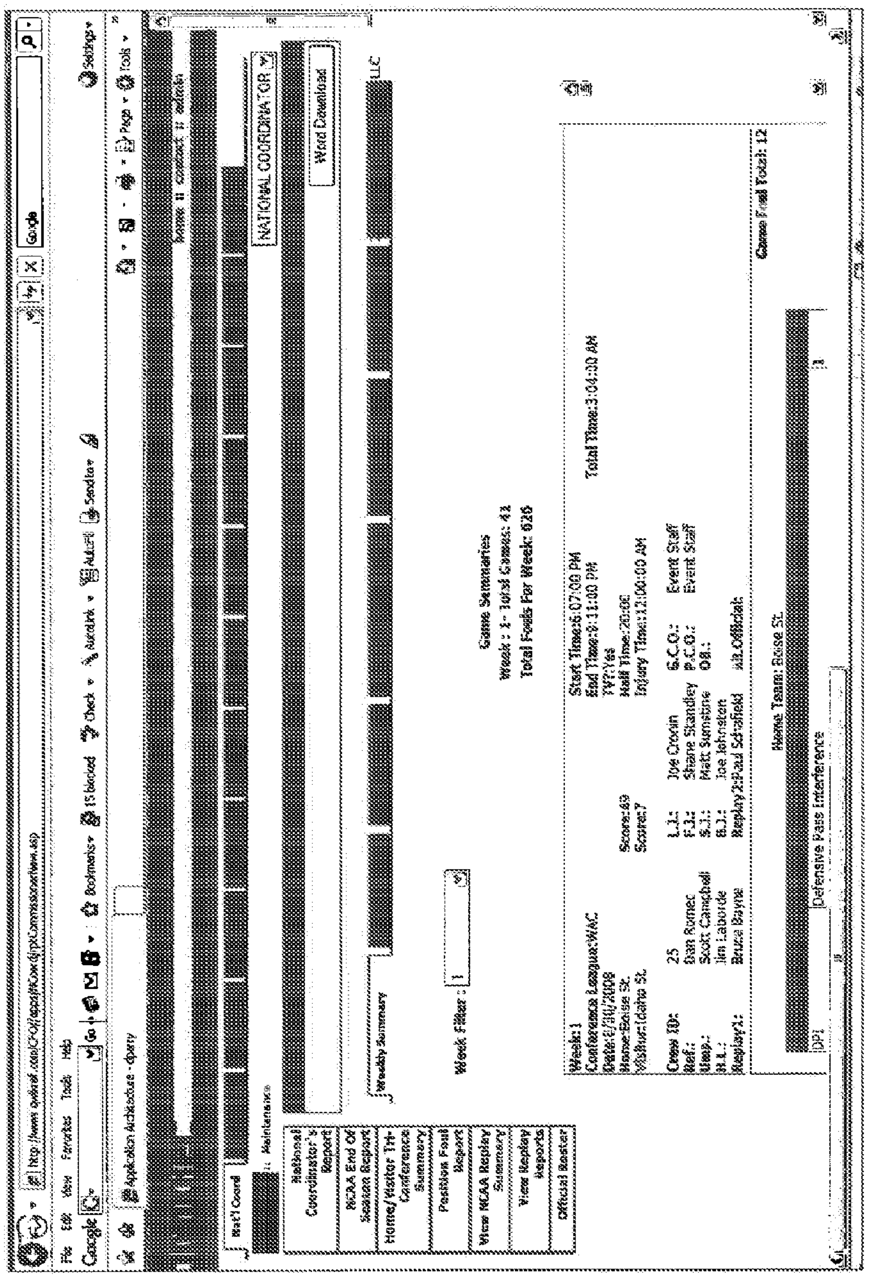
FIG. 57 is a screen shot of a national coordinator's report, weekly summary tab, in accordance with an embodiment of the present invention.
Figure 58:
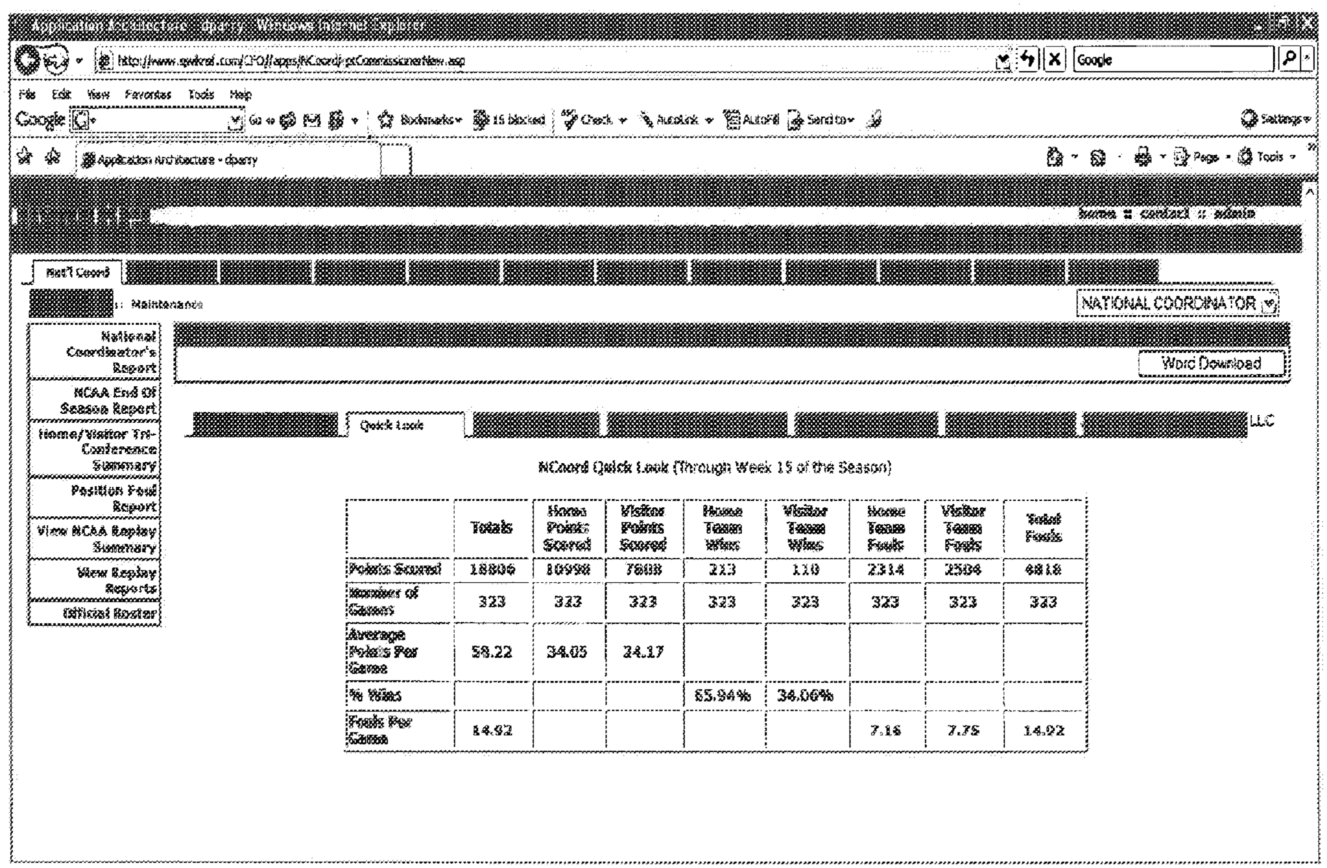
FIG. 58 is a screen shot of a national coordinator's report, quick look tab, in accordance with an embodiment of the present invention.
Figure 59:
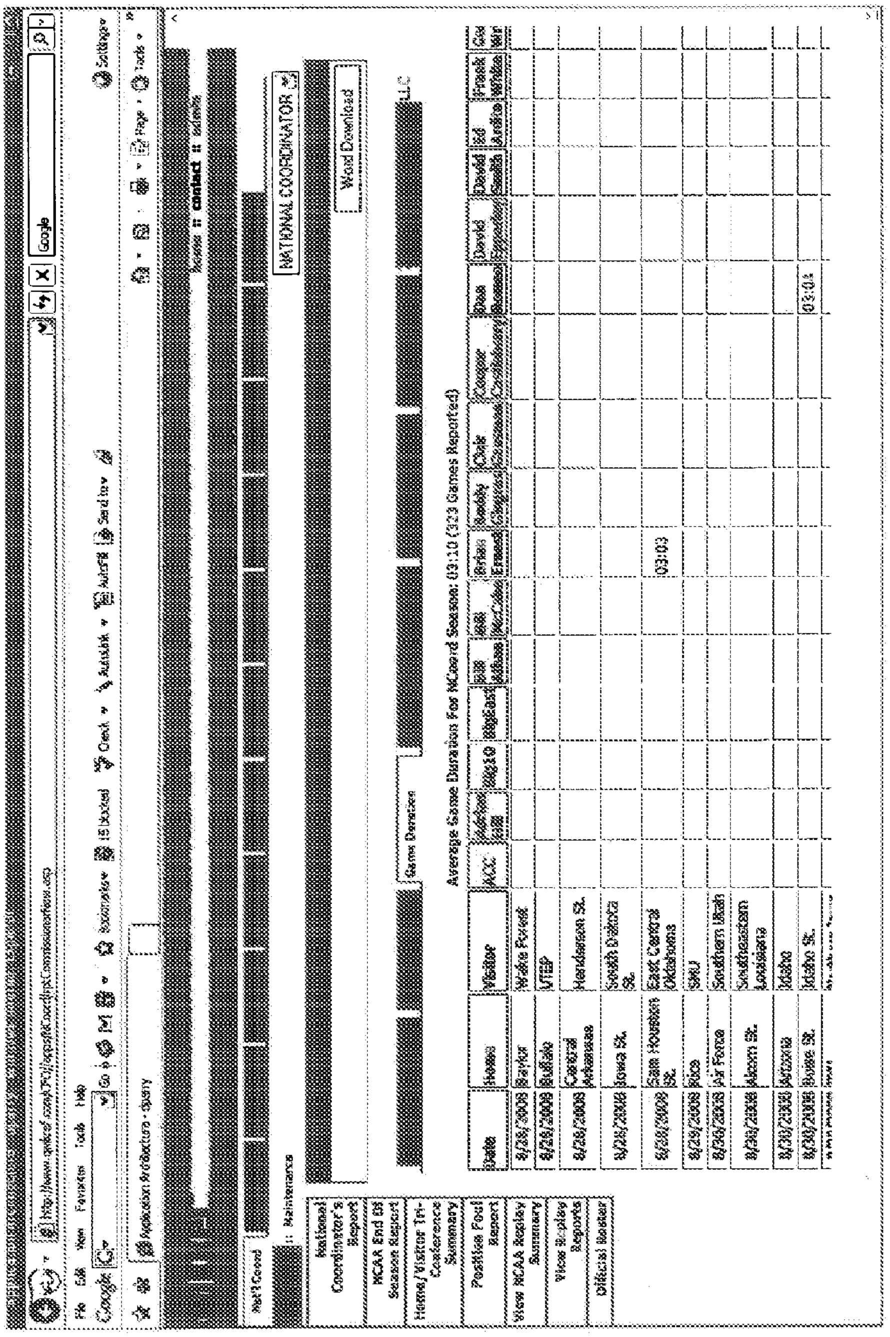
FIG. 59 is a screen shot of a national coordinator's report, game duration tab, in accordance with an embodiment of the present invention.
Figure 60:
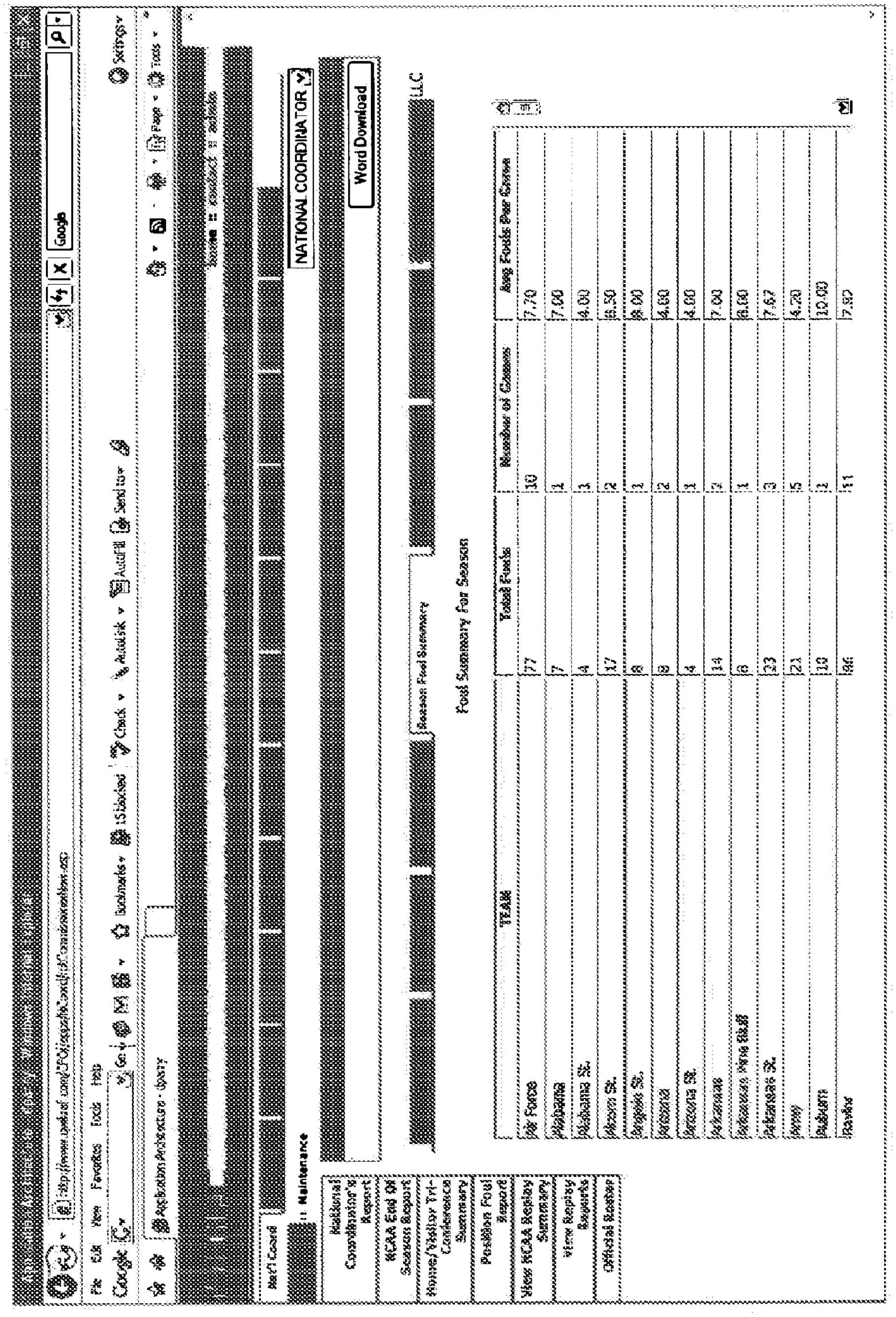
FIG. 60 is a screen shot of a national coordinator's report, season foul summary tab, in accordance with an embodiment of the present invention.
Figure 61:
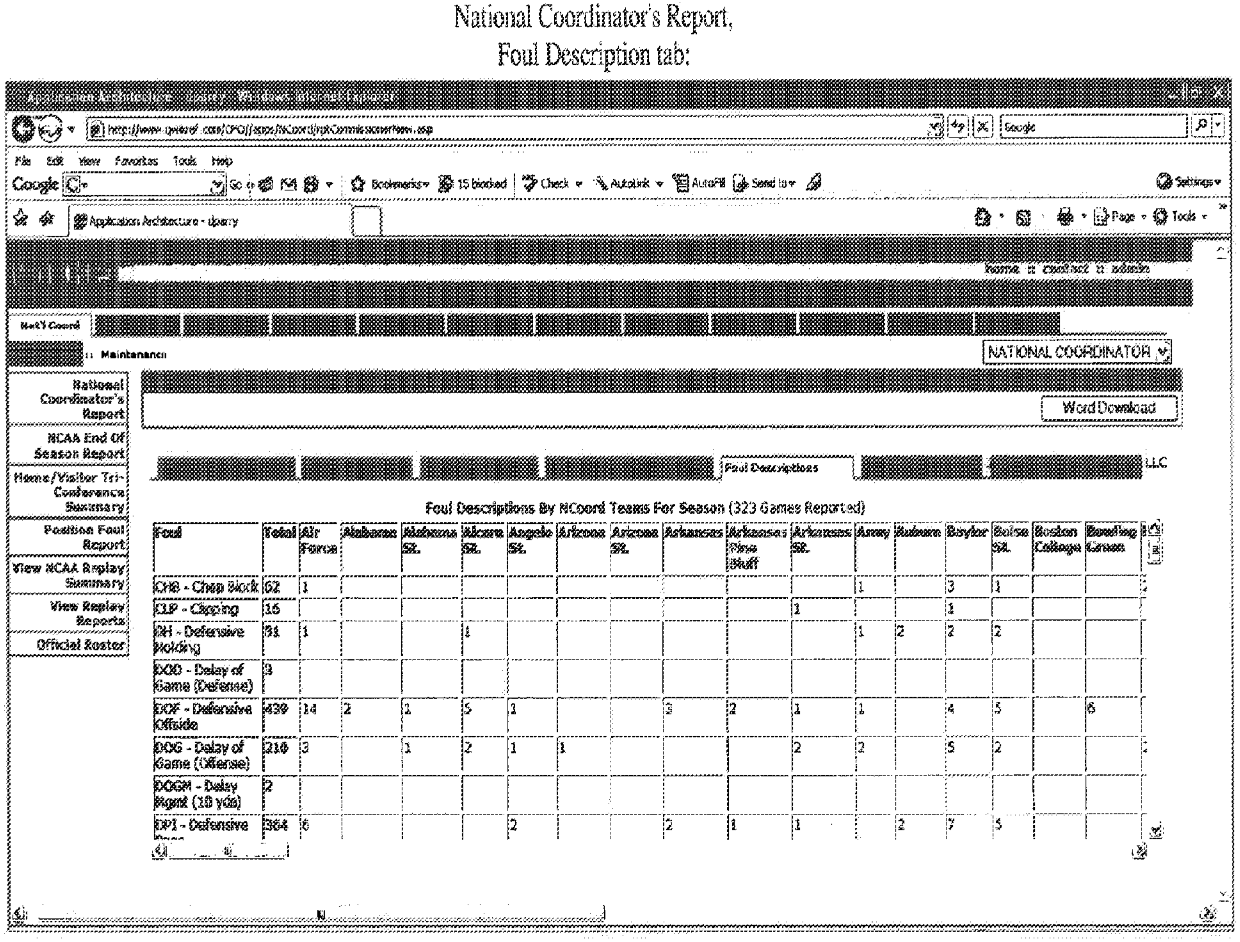
FIG. 61 is a screen shot of a national coordinator's report, foul description tab, in accordance with an embodiment of the present invention.
Figure 62:
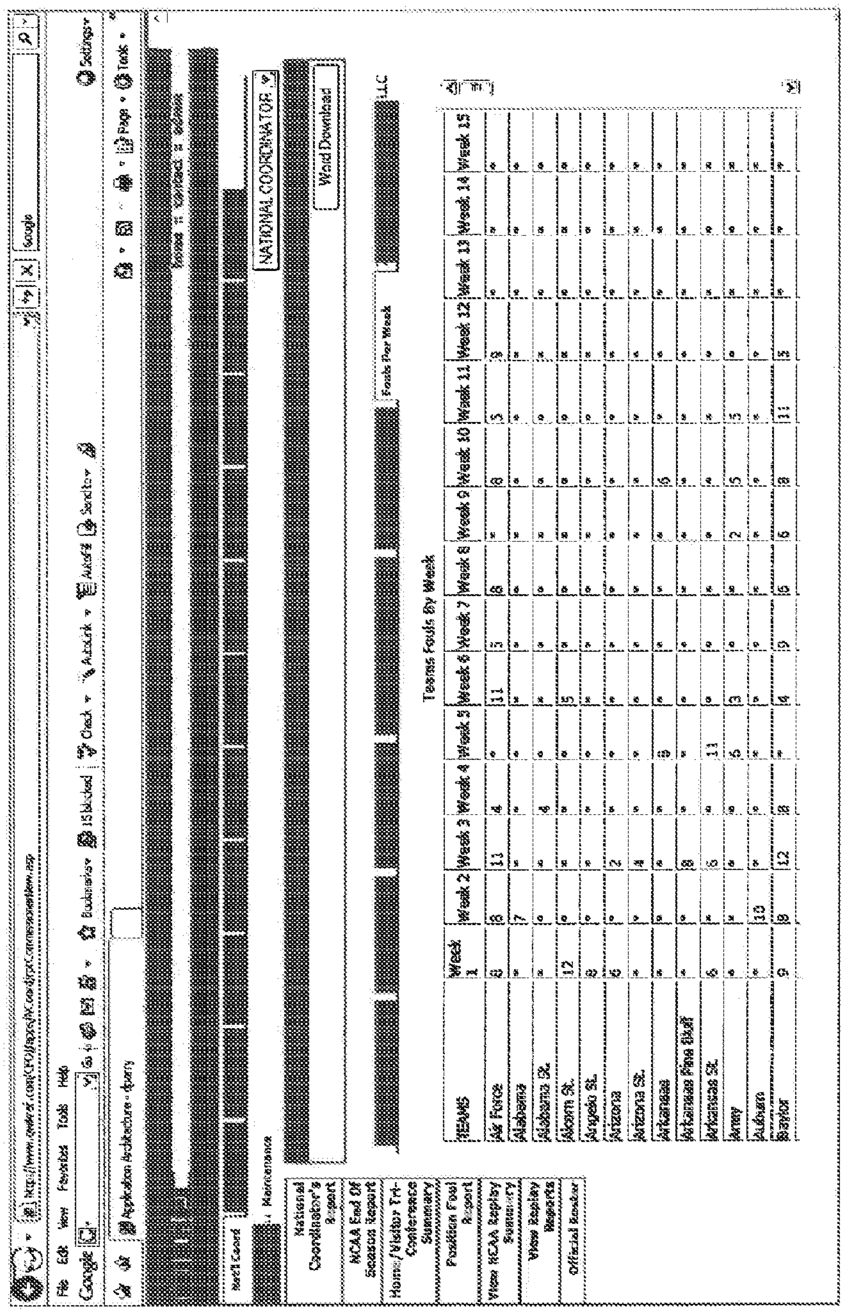
FIG. 62 is a screen shot of a national coordinator's report, fouls per week tab, in accordance with an embodiment of the present invention.
Figure 63:
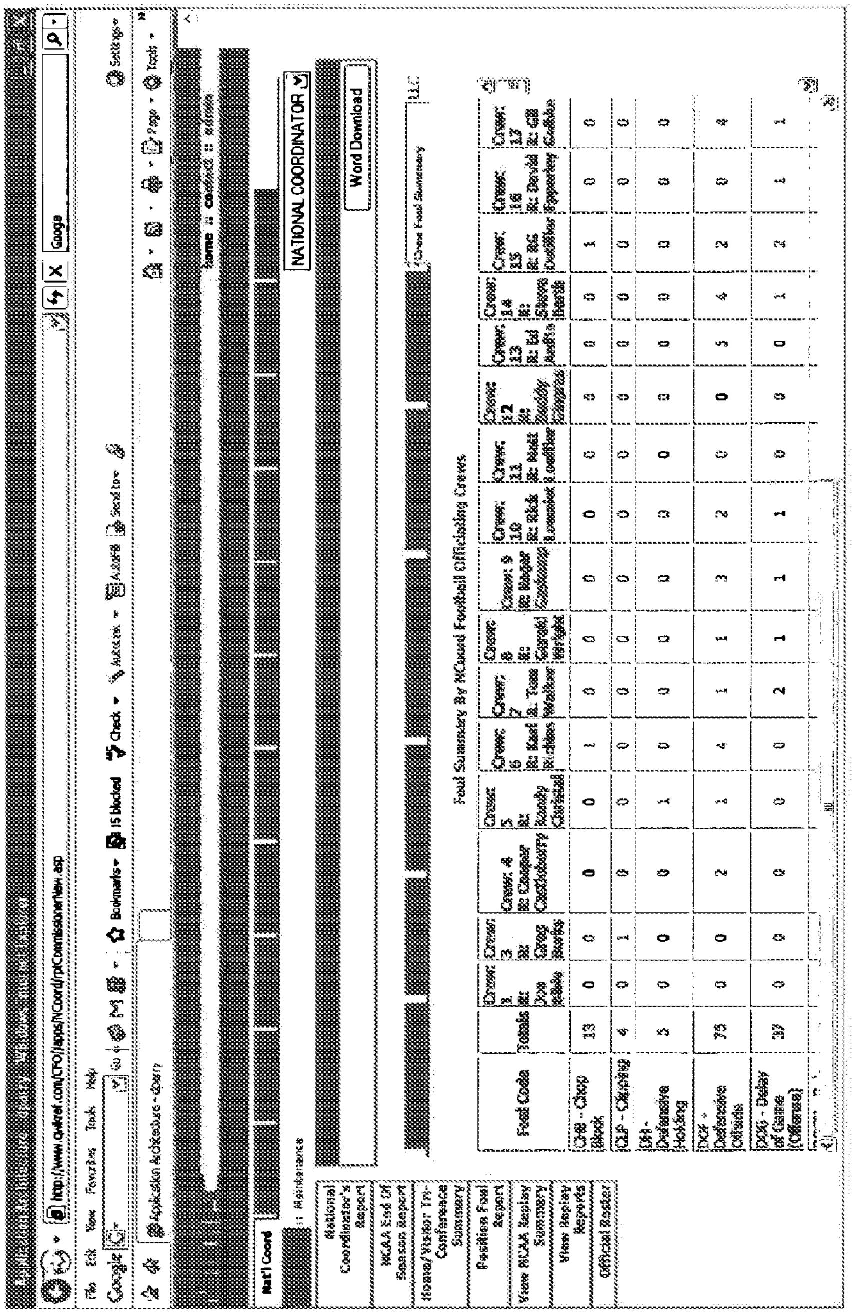
FIG. 63 is a screen shot of a national coordinator's report, crew foul summary tab, in accordance with an embodiment of the present invention.
Figure 64:
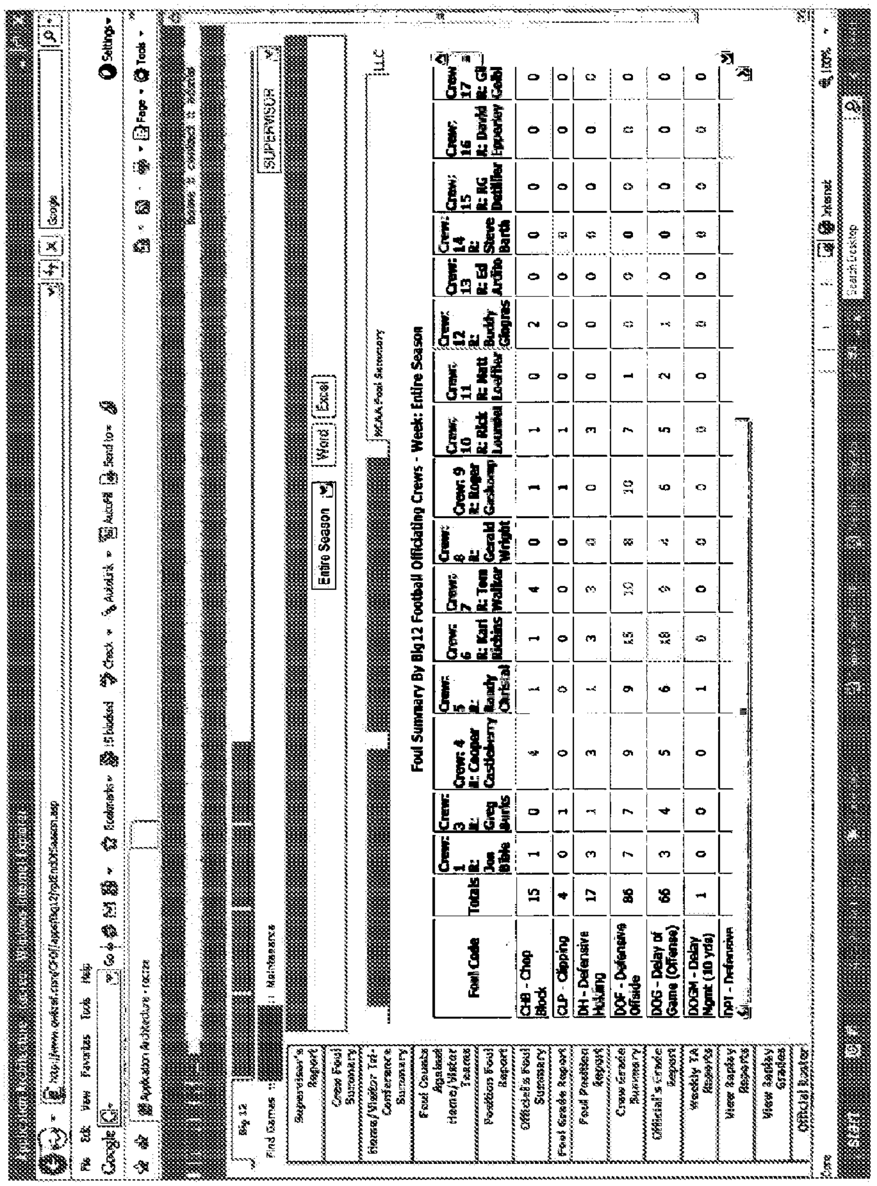
FIG. 64 is a screen shot of a national coordinator's report, NCAA end of season report, in accordance with an embodiment of the present invention.
Figure 65:
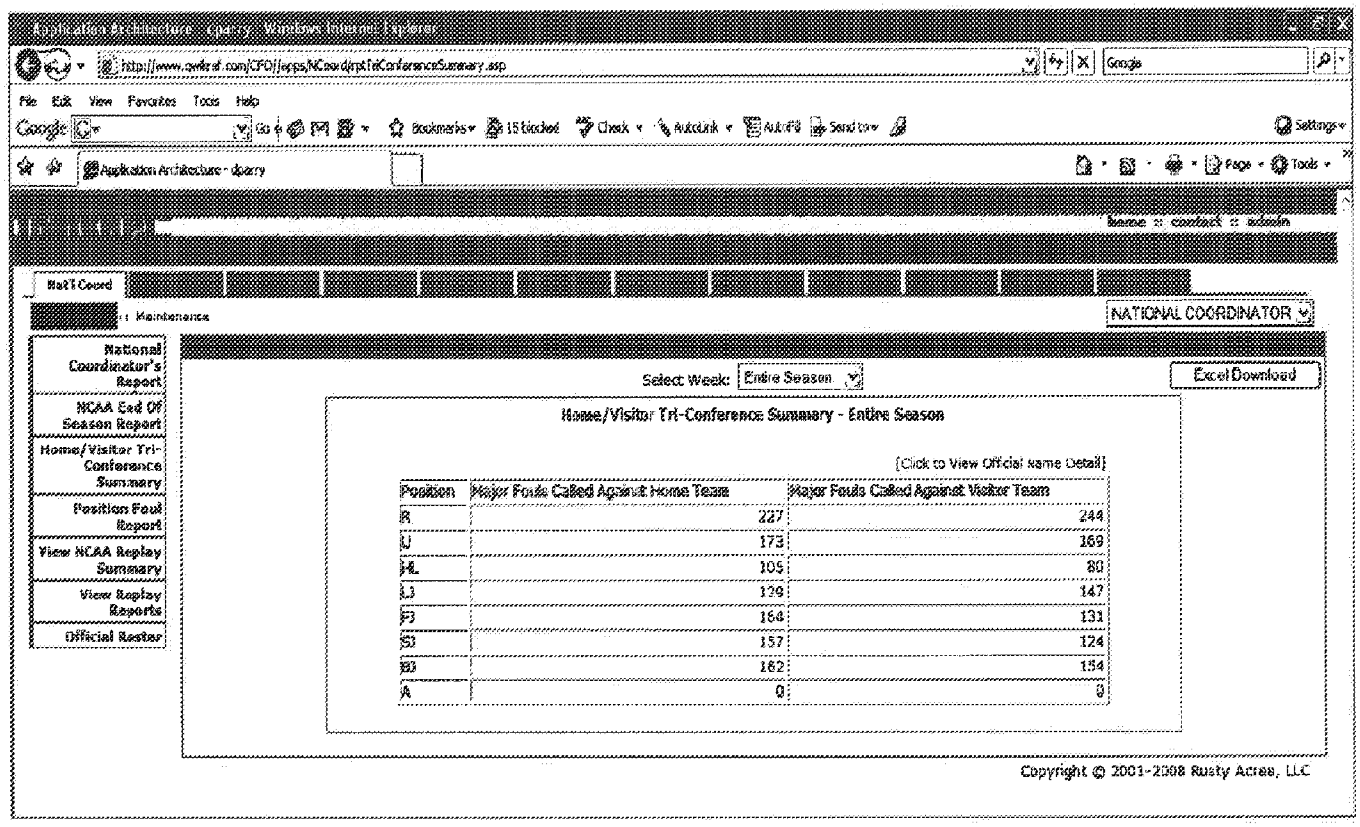
FIG. 65 is a screen shot of a national coordinator's report, home visitor triconference summary display, in accordance with an embodiment of the present invention.
Figure 66:
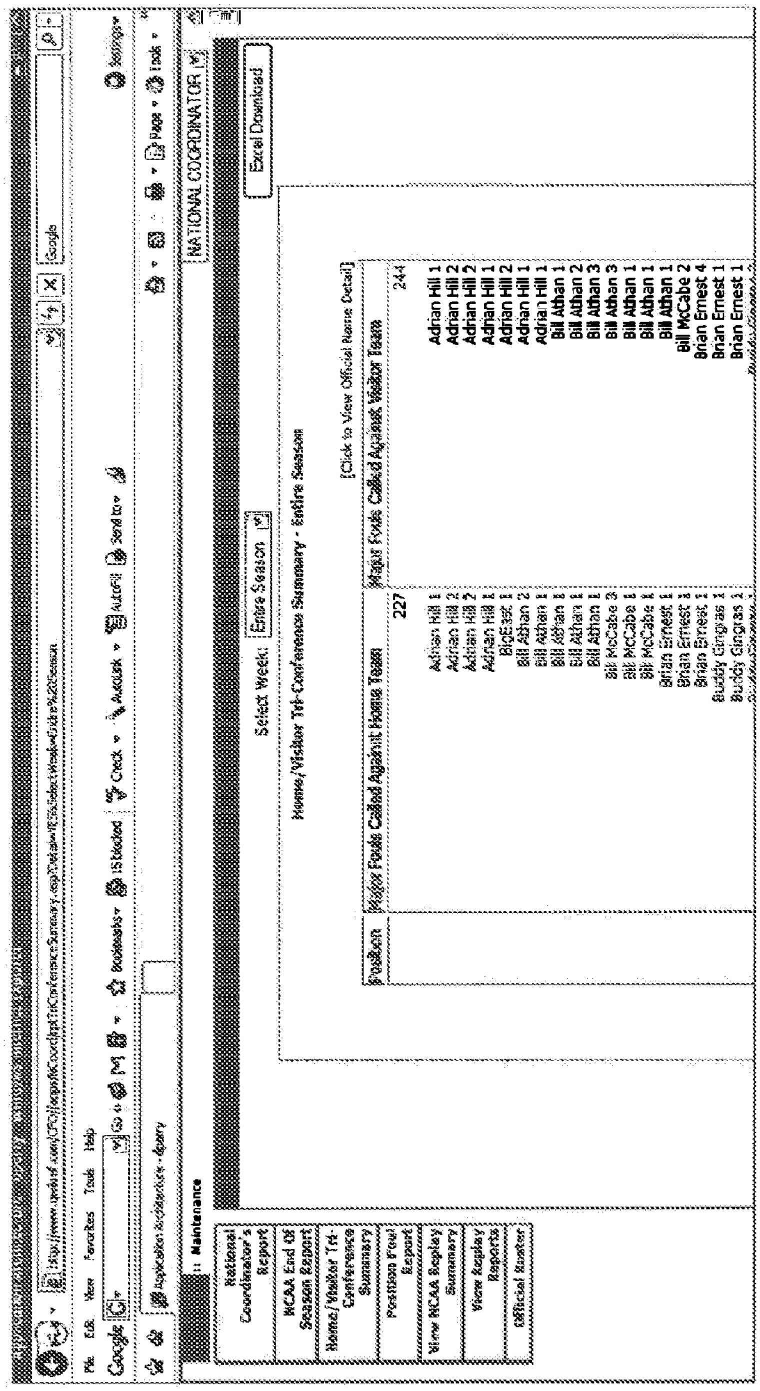
FIG. 66 is a screen shot of a national coordinator's report, home visitor triconference summary, click to view official detail display, in accordance with an embodiment of the present invention.
Figure 67:
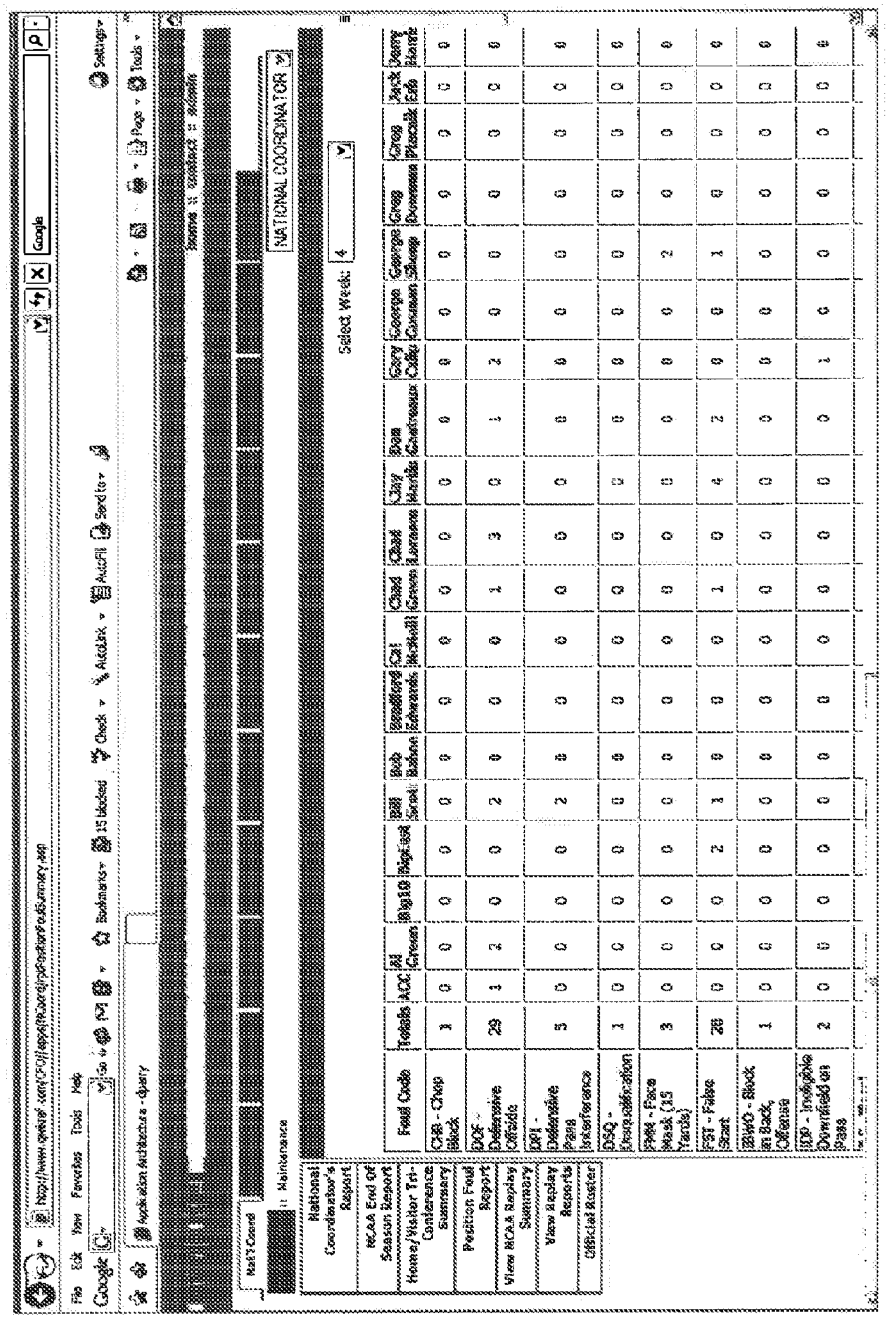
FIG. 67 is a screen shot of a national coordinator's report, position foul report, line judges display, in accordance with an embodiment of the present invention.
Figure 69:
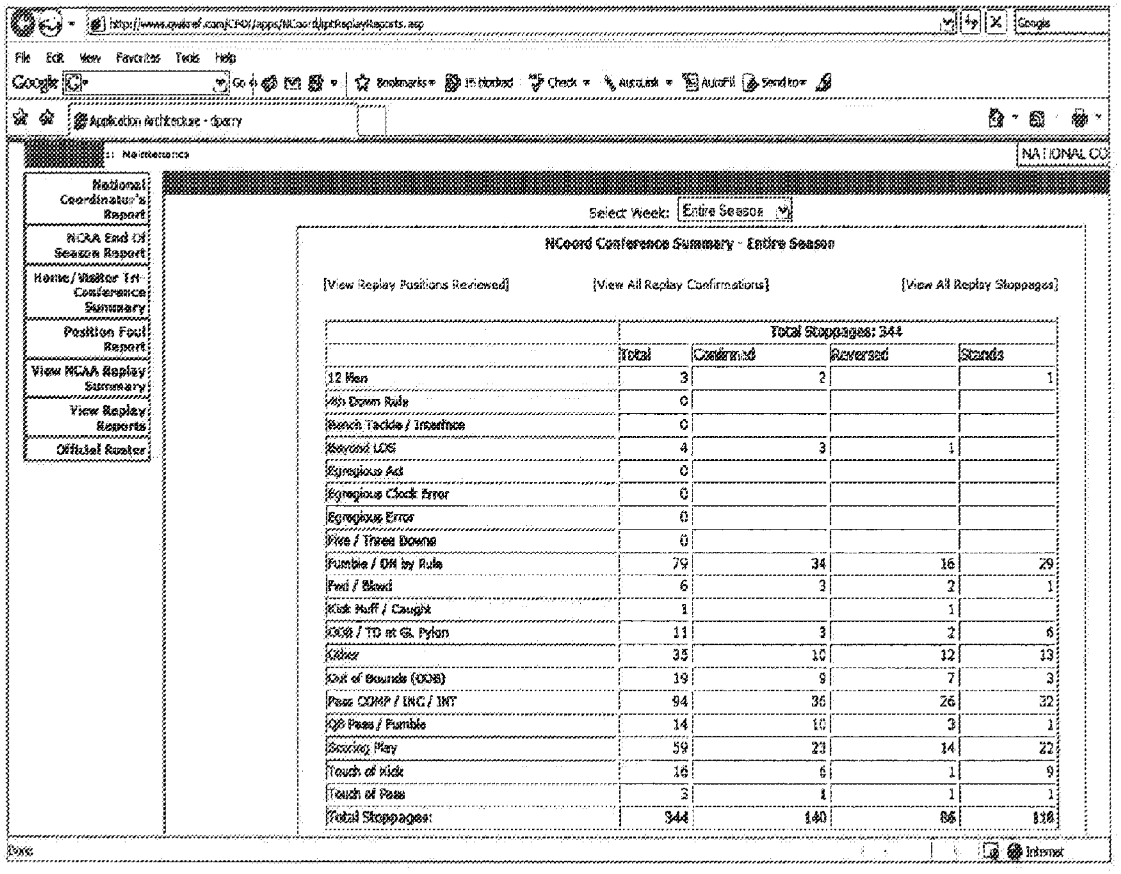
FIG. 69 is a screen shot of a national coordinator's report, view replay reports summary display, in accordance with an embodiment of the present invention.
Figure 70:
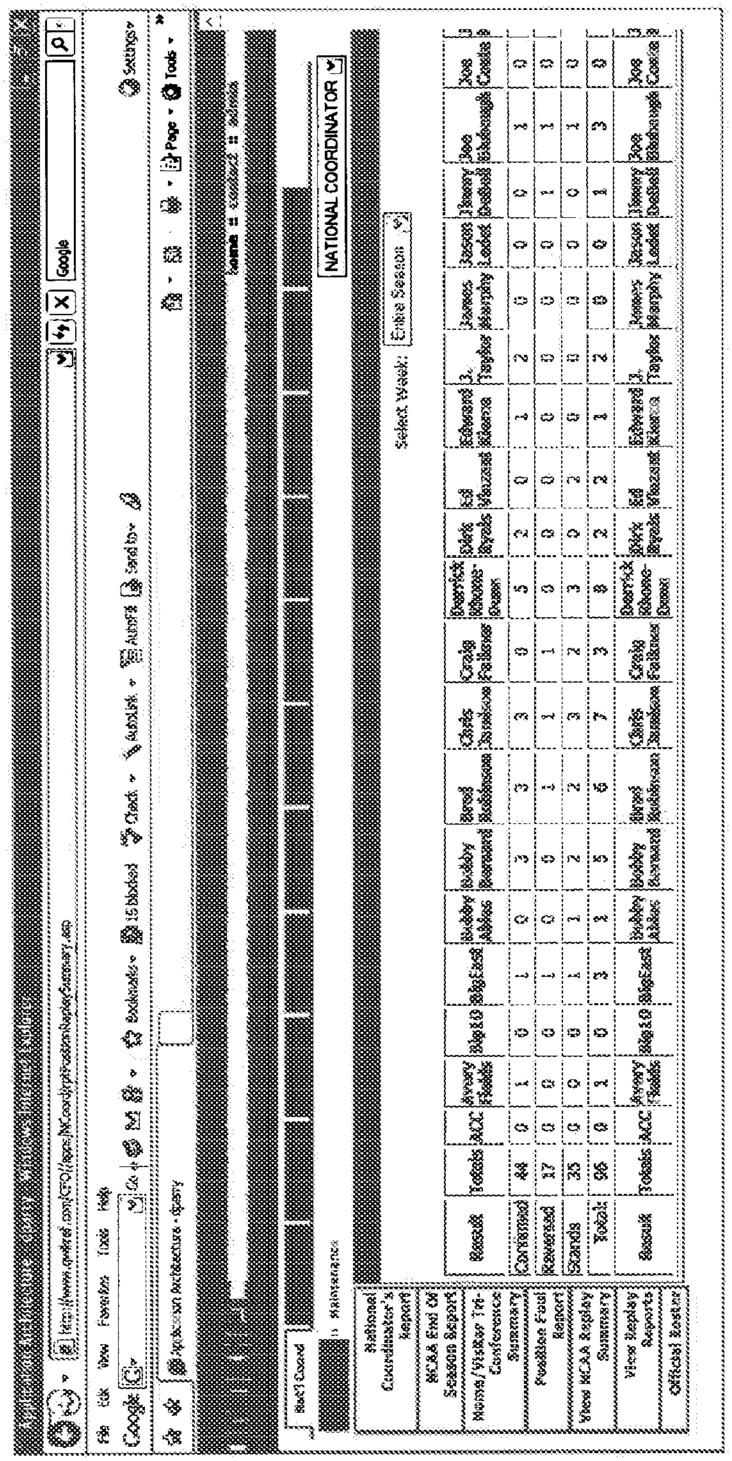
FIG. 70 is a screen shot of a national coordinator's report, view replay reports, view replay positions reviewed, field judge display, in accordance with an embodiment of the present invention.
Figure 72:
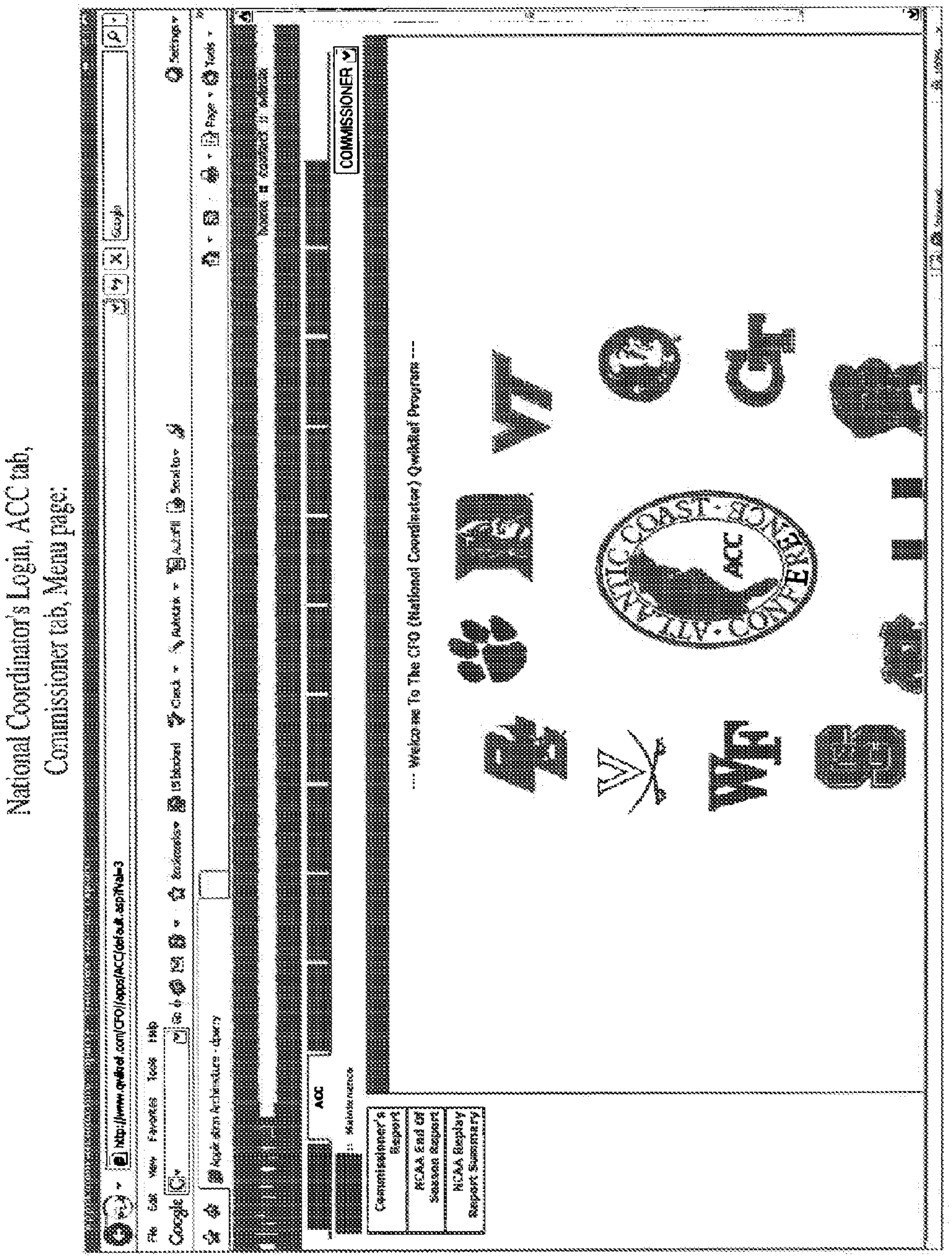
FIG. 72 is a screen shot of a national coordinator's login, ACC tab, commissioner tab, menu page summary display, in accordance with an embodiment of the present invention.
Figure 73:
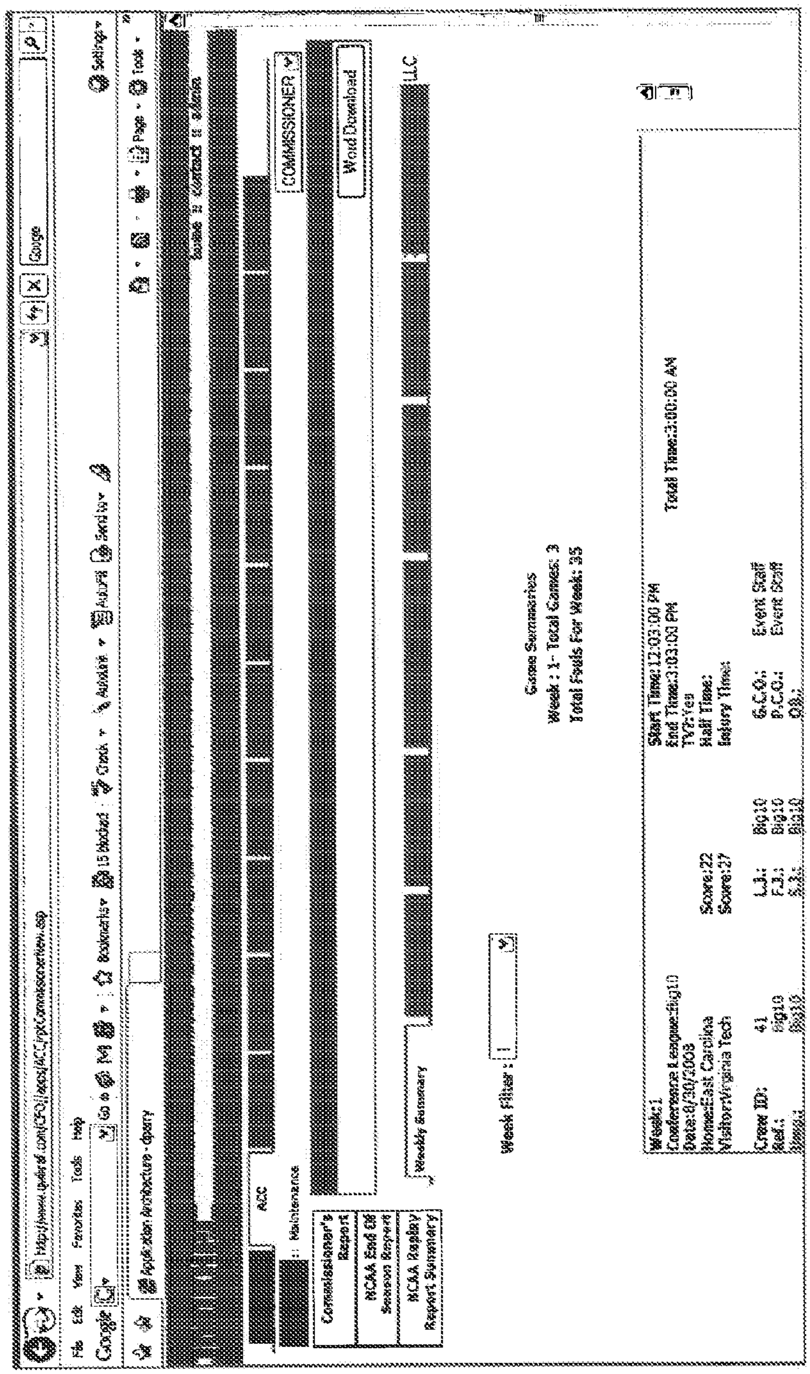
FIG. 73 is a screen shot of a national coordinator's login, ACC tab, commissioner tab, commissioner's report summary display, in accordance with an embodiment of the present invention.

FIG. 2 is a flow diagram of how various users can use the program shown in FIG. 1, in accordance with an embodiment of the present invention. In FIG. 2, the website 110 may receive 205 data, including game information, rosters and assignments at the website, generally from the coordinator of football officials 130 and store 210 the received data in the database 112 at the website 110. The website 110 can also receive 215 post game foul reports, including penalty data and store 220 the received penalty data in the database 112 at the website 110. In general, this information usually is supplied by users 120 who are referees. The website 110 can also receive 225 and store 230 stoppage reports in the database 112 related to instant replay review of a play, and these reports can are usually supplied by users 120 who are replay officials. The website 110 may further receive 235 related technical assistance data from one or more technical assistants assigned to help the referees and other officials. The technical assistance data may be stored 240 in the database 112 for later use. The website may still further receive 245 a list or lists of plays/calls, usually from the coaches of the teams involved in the game, that are to be reviewed for correctness, and the lists may be stored 250 in the database 112.

In FIG. 2, a grader may be permitted to access 255 the website 110 and database 112 to review the data and provide grades and comments on one or more referee's performance for one or more games and store the grades and comments in the database 112. Likewise, the one or more referee's whose performance was graded and commented on may be permitted to access 260 the website 110 and database 112 to review their individual grades and comments. In general, each referee will only be given restricted access to review the grades and comments specifically about their performance and/or the entire crew of referees that worked a given game together.

Referring to FIG. 1, the coordinator of officials user 120 and the commissioner/staff/head coach users 150 may access the website 110 to review customized reports about each game in their conference. For example, the commissioner and the commissioner's staff of the Big 12 can only access information on the games that involve Big 12 teams, while the head coaches may only access information on the games in which his school played.

The system and method can be customized and tailored based on, for example, the user or users who will be accessing the data and/or entering data. Data, such as, but not limited to, penalty data, may be compiled and used to perform penalty analysis. The penalty analysis may be used to determine whether an official or group of officials' performance and/or conduct was adequate and appropriate during a given play or when a certain penalty was called. For example, a grader may review a play in which a penalty was called by the officiating crew. This may be facilitated by providing some sort of a dynamic link, for example, but not limited to, a hyperlink to a video clip of the actual play, so the grader may review the actual play. In general, all camera angles may be provided, either separately, or in a single file. Additional description of how linking to the video may be accomplished is provided subsequently herein.

Reports including data and/or results of analysis may be generated based on the data inputted by users. The reports also can be specifically tailored. For example, reports may be customized and tailored to a specific conference, official, team, game, week, season, etc. Moreover, report or reports can be generated at any suitable frequency. For example, the report or reports can be automatically generated on a weekly, monthly, end-of-season basis, etc. In fact, Appendix A, attached hereto, is an example of a coordinator's final end-of-season report.

A system according to various embodiments of the present invention can include a storage apparatus, a processing apparatus, and an interface apparatus. The system may also include a means for transmission which facilitates the transmission of data to and from the storage apparatus. In various embodiments, the system and method may be implemented in one or more computer programs. Furthermore, in embodiments of the present invention, the program may be an interactive, web-based program.

The storage apparatus can be any suitable storage apparatus, including, but not limited to, a server, a database, a lookup table, etc. Furthermore, the storage apparatus can include any suitable number or combination of servers, databases, lookup tables, etc. The storage apparatus can be in communication with the processing apparatus and/or to the interface apparatus. In various embodiments, the storage apparatus may be coupled to the processing apparatus and/or to the interface apparatus via the means for transmission. The means for transmission can be any suitable means by which data can be transmitted to and from one or more of the processing apparatus and the interface apparatus. In various embodiments, the storage apparatus may include a first storage portion and a second storage portion, whereby the first storage portion stores video data and the second storage portion stores data other than video data. Furthermore, the first storage portion and the second storage portion may be located remote from each other. For example, the first storage portion may be a video server, which stores video data in video files, that is located at a first location, and the second storage portion may be a data server that stores non-video data and that is located at a second location, different from the first location. The storage apparatus may also include a storage portion, which may be either the first or second storage portions, that can be used by the processing apparatus to compile data, process requests for data, process and facilitate the entry of data, and provide data and/or information in response to a request.

The processing apparatus can be any suitable apparatus for processing data, including, but not limited to, a program residing on a server, a processor, a computer, a personal computer, etc. For example, the processing apparatus may comprise a web application residing on a server or may comprise a client-side program. In various embodiments, the processing apparatus can be in communication with the storage apparatus and/or the interface apparatus. The processing apparatus can receive commands to access data and commands to store data. Based on a command to access, the processing apparatus can compile the data so that it can be presented to a user or users. In various embodiments, the data is presented via the interface apparatus.

The interface apparatus can be any suitable apparatus configured to access and/or input data. Further, the interface apparatus can be accessed via any suitable means. For example, the interface apparatus can be a webpage that can be accessed via the Internet. Access to the interface apparatus can be by any suitable means and by any suitable number of means. For example, access via the Internet can be by any suitable device, including, but not limited to, a computer, a personal computer, a lap top, a hand-held computing device, such as a PDA, cell phone, etc. In various embodiments, access may be granted based on the entry and verification of a username and password.

In operation, the interface apparatus can allow entry of data, as well as access to data. The inputted data can be stored in the storage apparatus. Conversely, data stored in the storage apparatus can be accessed using the interface apparatus. Data may be input to the interface apparatus using any suitable means and by any suitable person. In various embodiments, the data can be entered using a personal computer, a lap top computer, a hand-held computer (e.g., a PDA), a cell phone, etc. In various embodiments, once the data has been entered, it can be accessed or viewed, simultaneously or substantially simultaneously with its input. Suitable persons who can enter data may be, but are not limited to, an official (including a referee and equivalents), a commissioner, a supervisor, a coach (or his staff), a grader, a coordinator, a replay official, and an administrator.

According to various embodiments of the present invention, the method can include receiving data, storing the data, accessing the data, analyzing and evaluating the data, and providing grading and/or comments based on the analysis and evaluation. The method may also include a step of submitting a request for a specific conduct and/or performance to be analyzed and evaluated. In various embodiments, the interface apparatus can receive the data, and the data can be entered by any suitable person by any suitable means. Further, the data can be any suitable data, including, but not limited to, game information, rosters, and assignments of persons in the rosters. Data may also include penalty data, which can be entered by an official, replay stoppage data, which can be entered by a replay official, evaluator/grader data and technical assistance data. The received data can be stored in the storage apparatus and accessed, either later or at substantially the same time it is entered, by a user using the interface apparatus.

More specifically, for example, in the football context, the method may include the steps of receiving data, which can be entered by a coordinator before a game, and storing this data in the storage apparatus; receiving data, which can be entered by referees during or after a game, and storing this data in the storage apparatus; receiving data, which can be entered by a replay official, relating to stoppage time in the game due to replay review, and storing this data in the storage apparatus; and receiving data, which can be entered by a technical advisor, and storing this data in the storage apparatus. The data inputted by an official, such as a referee, can be inputted by any suitable means and at any suitable time. In various embodiments, the data can be inputted after the game. Alternatively, the data can be inputted during the game, in real time. Moreover, if the officials, or other persons assisting the officials, are going to enter the data after the game, the data may be captured manually (i.e., by writing) during the game, and entered via a personal computer, hand-held computer (e.g., PDA), cell phone, etc. after the game. Alternatively, if the officials are entered data during the game, the data may be entered during the game using a computing apparatus, including, but not limited to, a personal computer, hand-held computer (PDA), etc.

The method may also include submitting plays to be reviewed; accessing the stored data; analyzing and evaluating the accessed data; and providing grades and/or comments for the analyzed and evaluated data. In various embodiments, a coach may submit plays to be reviewed. In addition to the play or plays to be reviewed, the coach (or even a commissioner) may also submit questions and/or comments, as well as enter an evaluation of an official and/or officiating crew. Responses to the coach's or commissioner's questions may be made in the same way the plays are graded. The aforementioned data can be entered by any suitable person by any suitable means. Typically, the Coordinator or Supevisor of Officials enters responses to the coach's questions. As noted above, entry and access is real time or substantially real time. As such, data can be viewed by coordinators, officials, coaches, supervisors, and commissioners as soon as entered.

The data entered before a game can include, but is not limited to, game information, rosters, and assignments. The data received by referees can include, but is not limited to, penalty data, which may be in the form of a penalty summary report. Further, penalty data can include, but is not limited to, penalty indicia, a penalty description, a penalty code, in what game the penalty was called, what quarter and time in the game the penalty was called, whether the penalty was on the offense or defense, the player or players, whether the penalty was accepted, declined, offset or waved off, the official who made the call, the official to whom the penalty is credited, etc. The data received by a replay official can include, but is not limited to, the reason for stoppage, the time the stoppage occurred, the result of whether the call by the official was confirmed, overturned or stands by the replay official, review time, total time, whether on not the stoppage was a result of the Coach Challenge, if TV went to a TV timeout during the stoppage and text description of why the ruling on the field was either confirmed, reversed or stands. Subsequently, a score, a grade, a comment can be entered by an evalutator to evaluate and access the replay official's performance for each stoppage or confirmation. The data received by the technical advisor may be, but is not limited to, an evaluation of each official, as well as an evaluation for the overall officiating crew.

The data may be configured for viewing in any suitable format and any suitable manner. The processing apparatus may compile data such that it is grouped and/or configured as information. For example, the data may be compiled or configured to be viewed in a table format.

The system and method may also allow for on-line/web-based scheduling and data submission, grading, replay, and report generation. The data may be input using any suitable means and by any suitable person. In various embodiments, the data may be entered using a personal computer, a lap top computer, a hand-held personal computer (e.g., a PDA), a telephone, etc. The system may allow for full online data submission and data access via the Internet. The system may require a user to provide a previously determined user name and associated password. All users have proprietary access and permissions determined by an administrator or a coordinator. A user can log in by entering his or her associated user name and password.

After logging in, a user can have access to data and can enter data. In various embodiments, the user can select a specific group in which to access information or for which to enter data. For example, a user can select a specific conference, team, official, etc. to access information and/or enter data. A user can select the group by any suitable means including, but not limited to, clicking on the particular group or selecting the particular group from a drop down menu.

Once a specific group is selected, the user may be presented with a choice to select an even more specific grouping or to view an appropriate page for displaying information and data for entry and/or access. Various data and information may be supplied based on each selection and/or page. For example, when a user selects a specific team, information about that team may be supplied to the user.

The user may also be presented with a choice for selecting the user's particular role. For example, a user's particular role can include an administrator, a commissioner, a grader, an official, replay official, replay review, TA, or a supervisor. As another example, when a user selects a specific role, information related to the user's role is provided to the user. Further, once a more specific selection is entered, the user may be prompted for more information. For example, a user who has entered the role of Supervisor when scheduling a game may be prompted to enter one or more of a date, a home team, a visiting team, a conference of the home team, a conference of the away team, a conference of the officiating crew, the published game time, whether the game was televised, a crew identifier, and a week in which the game was played. Additionally, as a further example of a person and type of data input, coaches can submit plays for review and can submit evaluations of officials. Another example is that, after the game, officials can log in to the website and enter the data from their penalty summary report. Additionally, the system and method may allow for an official to submit data regarding the amount of time a game was stopped for reviewing calls/decisions of officials. For example, the amount of time may be the amount of time a game was stopped for replay review. Other examples include a replay official can submit replay reports of game stoppages online, submission of crew evaluations to a coordinator, coaches can submit plays for review online for the coordinator to review and respond to privately online, coaches can submit evaluations of officials on-line.

After inputting information regarding data to be accessed, the system may search in the storage apparatus for data meeting the criteria entered by the user. If there is a match in the storage apparatus, the system can display data and information that matches the data inputted by the user. In various embodiments, the displayed data can include, but is not limited to including, a penalty summary, a position summary, a crew summary, and/or game summary. As noted above, the data can be presented in any suitable format, on any suitable visual apparatus. For example, the data may be presented to a user via a webpage that can be viewed on the user's computer, laptop computer, cell phone, etc. In various embodiments, once the data has been entered, it can be accessed, or viewed, simultaneously or substantially simultaneously with its input.

Based on the data input relating to an official's conduct, the performance and/or conduct of an official can be evaluated and graded, and comments can be provided, if desired. Grades and comments can be accessed immediately. For example, referees and officials can immediately see online the comments and grades entered by graders. Moreover, the system and method may allow for on-line compilation of grades and/or remarks. The grades and/or remarks may relate to the performance of an official or group of officials based on a singular event or based on a group of events. For example, the grades and/or remarks can be based on an official's performance for one play, a group of officials' performance for one play, an official's performance for an entire game (group of plays), a group of officials' performance for an entire game (group of plays), one official's performance for an entire season, a group of officials' performance for an entire season, etc.

Data and/or information provided by the interface apparatus can be presented in any suitable format and by any suitable means. For example, the data may be presented in a table, with indicia representing various pieces of data and/or information. The indicia may be configured to provide a user with additional information. For example, an indicia relating to a penalty or foul may allow a user to obtain additional information related to the penalty or foul. The indicia may be configured such that it is coupled to a link that, when accessed, provides the user with additional information. In various embodiments that link may be a hyperlink that links the user to a video file of the play in which the penalty was called and assessed. Alternatively, or in addition to, a button may be provided to access additional information. The video file can be any suitable format, and can be stored in any suitable storage apparatus, including, but not limited to, a server, a data base, etc.

In various embodiments, the system and method can allow for video review. Thus, a grader may, while watching video of a play, evaluate and submit grades and/or comments based on the official or officials' performance. Each penalty/infraction/foul may be linked to a video or videos, with an indicia for the penalty being coupled to a hyperlink, whereby a video or videos associated with the play relating to that specific penalty can be accessed and viewed. The insertion of hyperlinks to video files for each play may facilitate review of plays and the performance of officials, as well as may facilitate grading and evaluating performance.

Each video file for each play may contain video portions for each camera angle associated with the play. A video file associated with a particular play may be part of the video file for the entire game. Moreover, the video file for the entire game may be parsed such that each individual play is identified. Further, each individual play may be further parsed such that different camera angle recordings for the particular play can be identified. The hyperlinks may be added to the video file by any suitable means and by any suitable person. In various embodiments, a video administrator parses the full video file into individual plays, where each play may be accessed by an associated hyperlink. Additionally, a coach may add a hyperlink, or at least identify that hyperlink, to a particular video file for a particular play when requesting review of a particular play. Also, a grader may add a hyperlink to a particular video file in which there should have been a penalty, but a penalty was not called.

The hyperlink may point to a video file in the storage apparatus. Additionally, a hyperlink may point directly and/or indirectly to additional hyperlinks. The additional hyperlinks may provide access to video files of different camera angles for a particular play. Clicking on the link may allow a video or videos of the play to be accessed by a user or users. In various embodiments, the video or videos may be viewed on visual display. The video link may provide a link to a video file that may be stored locally or remotely on, for example, a video server. In various embodiments, the video file may include one video corresponding to the play. The video file can also include a plurality of videos for each play. For example, each of the videos may represent a different characteristic, including, but not limited to, camera angle, field of vision, magnification, zoom, length of video clip, etc. For example, each video file may contain as many as four to eight different videos, representing each camera characteristic available.

In all cases above, the hyperlink can be identified by a separate indicia or by making any suitable indicia on any of the data and information provided by the interface apparatus "hot," whereby clicking on the indicia will provide access to the video file. Accordingly, the system and method may facilitate identification and selection of plays for generation of training tapes for distribution to officiating staff. The training tapes may identify particular types of fouls and group them accordingly.

Based on evaluating and grading, each official, each crew, team, conference, etc. can be ranked, with the results of the ranking being available for display and printing. The system and method can compile the data and generate a report. In various embodiments, the report can be generated so that it is viewable online. The report can also be downloaded and/or printed. Numerous reports may be generated immediately for all users. An example of a report can be the Weekly Commissioner's Report, which may include, but is not limited to including, one or more of a conference summary "Quick Look," top level game summaries, a game duration report, a season foul summary, foul descriptions by team report, a fouls per week report, and a fouls per crew report. Another example of a report can be the Coordinator's Weekly Report, which can include, but is not limited to including, one or more of a conference summary "Quick Rep," a game foul reports for the week, a game duration report, a composite foul summary for the season, foul descriptions by team, a crew summary report, an officials' position report, officials' grades, replay officials' reports, coaches' plays for review, and foul summaries for fouls called against home and visitor teams. Another example of a report can be the Crew Chiefs and Officials Weekly Reports, which can include, but are not limited to including, one or more of crew summary reports, officials' position reports, and officials' grades. Yet another example of a report can be the Coaches Weekly Report, which can include, but is not limited to including, one or more of a conference summary "Quick Rep," a game summary "Quick Look," a game foul report, crew summary reports, a top level foul summary for the season, a detailed foul summary for the season, a weekly foul summary, fouls by players, and fouls per quarter. Another example of a report can be the End of Season Report, which can include a summary of one or more of the criteria capture in the aforementioned reports. Any of the aforementioned reports may be customized and tailored based on the specific user or users.

While the present invention has been described in conjunction with a number of embodiments, the invention is not to be limited to the description of the embodiments contained herein. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A computer program product having a plurality of executable instructions stored on a computer-readable memory and adapted to be executed to implement a method for reviewing and evaluating performance of at least one official involved in officiating a game, the method comprising:

storing data received through a website for the at least one official and the game in a file associated with the game in a database at the website;

storing post game foul reports and penalty data in the database;

storing stoppage reports related to one or more instant replay reviews of at least one or more plays with at least one dynamic link to a video clip for each instant replay review in the database;

storing technical assistance data in the database;

storing a list of calls for the at least one official that are to be reviewed for correctness in the database;

presenting the stored data related to the list of calls for the at least one official to be reviewed for grading and comment from the database through the website; and storing grades and comments for each call in the list of calls for the at least one official for the game in the database at the website.

2. The computer program product of claim 1 wherein the presenting the stored data related to the list of calls for the at least one official for grading and comment from the database through the website comprises:

presenting the stored data related to each call in the list of calls for the at least one official with the at least one dynamic link to a video clip for each instant replay review from the database through the website.

3. The computer program product of claim 1 wherein storing the list of calls that are to be reviewed for correctness further comprises:

storing a list of calls that are to be reviewed for correctness from at least one of the coaches of the teams involved in the game.

4. The computer program product of claim 3 further comprising:

storing an assessment with a response for each call in the list of calls in the database from a coordinator of officials user.

5. The computer program product of claim 4 wherein the receiving and storing an assessment for each call in the list of calls in the database further comprises:

receiving data, including game information, rosters and assignments at a website;

receiving post game foul reports, including penalty data; and receiving stoppage reports related to an instant replay review of a play; and receiving related technical assistance data from one or more technical assistants assigned to help the referees and other officials.

6. The computer program product of claim 5 wherein the receiving post game foul reports, including penalty data further comprises:

receiving the post game foul reports, including penalty data from the at least one official.

7. The computer program product of claim 5 wherein the receiving stoppage reports related to an instant replay review of a play further comprises:

receiving the stoppage reports related to an instant replay review of a play from a replay official.

8. The computer program product of claim 5 wherein the receiving post game foul reports, including penalty data further comprises:

receiving the post game foul reports, including penalty data with at least one dynamic link to a video clip for each foul report.

9. The computer program product of claim 5 wherein the storing stoppage reports related to an instant replay review of a play further comprises:

receiving the stoppage reports related to the instant replay review of a play with at least one dynamic link to a video clip for each instant replay review.

10. The computer program product of claim 5 wherein the storing a list of calls for the at least one official that are to be reviewed for correctness further comprises:

receiving the list of calls that are to be reviewed for correctness with at least one dynamic link to a video clip for each call in the list of calls to be reviewed.

11. A computer program product having a plurality of executable instructions stored on a computer-readable memory and adapted to be executed to implement a method for reviewing and evaluating performance of at least one official involved in officiating a game, the method comprising:

storing data, including game information, rosters and assignments in a database at a website;

storing post game foul reports, including penalty data in the database;

storing stoppage reports for one or more instant replay reviews of at least one or more plays with at least one dynamic link to a video clip for each instant replay review in the database;

storing related technical assistance data from one or more technical assistants assigned to help the referees and other officials in the database;

storing a list of calls that are to be reviewed for correctness;

providing access to the database though the website to permit a_review of the list of calls and to receive and store grades and comments related to the list of calls in the database; and providing access to the database through the website to permit at least the at least one official to review the individual grades and comments for the at least one official.

12. The computer program product of claim 11 wherein the method further comprises:

providing access to the database to permit the list of calls to be reviewed for correctness to be reviewed; and storing an assessment for each call in the list of calls in the database.

13. The computer program product of claim 12 wherein the storing an assessment for each call in the list of calls in the database further comprises:

receiving the assessment for each call in the list of calls in the database from a coordinator of officials user.

14. The computer program product of claim 13 further comprising:

storing the assessment from the coordinator of officials user with a response for each call in the list of calls in the database.

15. The computer program product of claim 12 wherein the storing an assessment for each call in the list of calls in the database further comprises:

receiving the assessment for each call in the list of calls in the database that are to be reviewed for correctness from at least one of the coaches of the teams involved in the game.

16. The computer program product of claim 11 wherein providing access to the database through the website further comprises:

providing a plurality of levels of predetermined access to the database through the website to permit a coordinator of officials user, a commissioner/staff user, and a head coach user to review customized reports about each game to which they have access.

17. The computer program product of claim 11 wherein storing post game foul reports, including penalty data further comprises:

storing post game foul reports, including penalty data with at least one dynamic link to a video clip for each foul report.

18. The computer program product of claim 11 wherein storing stoppage reports related to an instant replay review of a play further comprises:

storing the stoppage reports related to the instant replay review of a play with at least one dynamic link to a video clip for each instant replay review.

19. The computer program product of claim 11 wherein storing a list of calls that are to be reviewed for correctness further comprises:

storing the list of calls that are to be reviewed for correctness with at least one dynamic link to a video clip for each call in the list of calls to be reviewed.

20. A computer program product having a plurality of executable instructions stored on a computer-readable memory and adapted to be executed to implement a method for reviewing and evaluating performance of at least one official involved in officiating a game, the method comprising:

storing data, including game information, rosters and assignments in a database at a website;

storing post game foul reports, including penalty data in the database;

storing stoppage reports for one or more instant replay reviews of at least one or more plays with at least one dynamic link to a video clip for each instant replay review in the database;

storing a list of calls that are to be reviewed for correctness;

providing access to the database though the website to permit a_review of the list of calls and to receive and store grades and comments related to the list of calls in the database; and providing access to the database through the website to permit at least the at least one official to review the individual grades and comments for the at least one official.

* * * * *